US012626633B2

(12) United States Patent
Dong et al.

(10) Patent No.: US 12,626,633 B2
(45) Date of Patent: May 12, 2026

(54) DISPLAY PANEL WITH EVEN AND ODD-NUMBERED ROW PIXEL DRIVING, A PLURALITY OF MULTIPLEXING CIRCUITS FOR DATA LINE DRIVING AND METHOD FOR DRIVING THE SAME

(71) Applicant: BOE TECHNOLOGY GROUP CO., LTD., Beijing (CN)

(72) Inventors: Tian Dong, Beijing (CN); Can Zheng, Beijing (CN); Li Wang, Beijing (CN); Long Han, Beijing (CN); Yu Feng, Beijing (CN); Hao Zhang, Beijing (CN); Jiangnan Lu, Beijing (CN); Jie Zhang, Beijing (CN); Bo Wang, Beijing (CN); Jingquan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 15 days.

(21) Appl. No.: 18/655,073

(22) Filed: May 3, 2024

(65) Prior Publication Data

US 2024/0290244 A1 Aug. 29, 2024

Related U.S. Application Data

(62) Division of application No. 17/594,771, filed as application No. PCT/CN2020/125363 on Oct. 30, 2020, now Pat. No. 12,008,943.

(51) Int. Cl.
*G09G 3/20* (2006.01)

(52) U.S. Cl.
CPC ... *G09G 3/2092* (2013.01); *G09G 2310/0297* (2013.01); *G09G 2310/061* (2013.01)

(58) Field of Classification Search
None
See application file for complete search history.

(56) References Cited

U.S. PATENT DOCUMENTS

| | | | | |
|---|---|---|---|---|
| 10,997,891 | B1 | 5/2021 | Zhang et al. | |
| 2009/0225009 | A1* | 9/2009 | Ka | G09G 3/3233 345/76 |

(Continued)

FOREIGN PATENT DOCUMENTS

| | | | |
|---|---|---|---|
| CN | 103529610 | A | 1/2014 |
| CN | 104849890 | A | 8/2015 |

(Continued)

OTHER PUBLICATIONS

CN109102768A, Xinhua Wang (Year: 2018).*

(Continued)

*Primary Examiner* — Benjamin C Lee
*Assistant Examiner* — Nathan P Brittingham
(74) *Attorney, Agent, or Firm* — McCoy Russell LLP

(57) ABSTRACT

The display panel includes a plurality of rows and a plurality of columns of pixel circuits, a plurality of rows of gate lines, a plurality rows of reset control lines, and a plurality of columns of data lines, a same row of pixel circuits corresponds to two rows of gate lines, and one/the other row of gate line is electrically connected to odd/even-numbered columns of pixel circuits in the row of pixel circuits, and provides a corresponding gate driving signal for the odd/even-numbered columns of pixel circuits; a same column of pixel circuits corresponds to two columns of data lines, and one/the other column of data line of the two columns of data lines is electrically connected to odd/even-numbered rows of pixel circuits, and provides a corresponding data voltage for the odd/even-numbered rows of pixel circuits.

9 Claims, 21 Drawing Sheets

(56) References Cited

U.S. PATENT DOCUMENTS

| | | | |
|---|---|---|---|
| 2009/0303164 | A1 | 12/2009 | Kajiyama et al. |
| 2010/0053042 | A1 | 3/2010 | Kajiyama et al. |
| 2012/0313903 | A1 | 12/2012 | Pyon et al. |
| 2014/0009458 | A1 | 1/2014 | Nam et al. |
| 2017/0148404 | A1 | 5/2017 | Xing et al. |
| 2019/0164495 | A1 | 5/2019 | Kubota |
| 2020/0058250 | A1 | 2/2020 | Dong et al. |

FOREIGN PATENT DOCUMENTS

| | | | | |
|---|---|---|---|---|
| CN | 109036281 | A | 12/2018 | |
| CN | 109102768 | A | * 12/2018 | ............. G09G 3/006 |
| CN | 110808005 | A | 2/2020 | |
| CN | 110931543 | A | 3/2020 | |
| CN | 111243441 | A | 6/2020 | |
| CN | 210667751 | U | 6/2020 | |
| CN | 111627393 | A | 9/2020 | |
| KR | 20190128801 | A | 11/2019 | |

OTHER PUBLICATIONS

ISA China National Intellectual Property Administration, International Search Report and Written Opinion Issued in Application No. PCT/CN2020/125363, Jul. 26, 2021, WIPO, 16 pages.

United States Patent and Trademark Office, Restriction Requirement Issued in U.S. Appl. No. 17/594,771, filed Jul. 26, 2023, 10 pages.

United States Patent and Trademark Office, Notice of Allowance Issued in U.S. Appl. No. 17/594,771, filed Feb. 7, 2024, 30 pages.

* cited by examiner

DISPLAY PANEL WITH EVEN AND ODD-NUMBERED ROW PIXEL DRIVING, A PLURALITY OF MULTIPLEXING CIRCUITS FOR DATA LINE DRIVING AND METHOD FOR DRIVING THE SAME

CROSS-REFERENCE TO RELATED APPLICATIONS

The present application is a divisional of U.S. patent application Ser. No. 17/594,771, entitled "DISPLAY PANEL, METHOD FOR DRIVING THE SAME, AND DISPLAY DEVICE", filed on Oct. 28, 2021, which is the U.S. National Phase of PCT Application No. PCT/CN2020/125363, entitled "DISPLAY PANEL, METHOD FOR DRIVING THE SAME, AND DISPLAY DEVICE', filed on Oct. 30, 2020, which is incorporated herein by reference in its entirety.

TECHNICAL FIELD

The present disclosure relates to the field of display technology, in particular to a display panel, a method for driving the same and a display device.

BACKGROUND

Currently, Virtual Reality (VR) displays and gaming phones that are in greater demand on the market require a higher refresh rate of display panel. When the refresh rate of the display panel is increased to a predetermined speed, the conventional driving method has the problem of insufficient threshold voltage compensation capability, which will cause uneven display of the display panel.

SUMMARY

In a first aspect, the present disclosure provides in some embodiments a display panel including a plurality of rows and a plurality of columns of pixel circuits, a plurality of rows of gate lines, a plurality rows of reset control lines, and a plurality of columns of data lines, wherein a same row of pixel circuits corresponds to two rows of gate lines, and one row of gate line of the two rows of gate lines is electrically connected to odd-numbered columns of pixel circuits in the row of pixel circuits, and is configured to provide a corresponding gate driving signal to for the odd-numbered columns of pixel circuits in the row of pixel circuits; the other row of gate line of the two rows of gate lines is electrically connected to even-numbered columns of pixel circuits in the row of pixel circuits, and is configured to provide a corresponding gate driving signal for the even-numbered columns of pixel circuits in the row of pixel circuits; the same row of pixel circuits corresponds to a row of reset control line, and the reset control lines provide a corresponding reset control signal for the row of pixel circuits; a same column of pixel circuits corresponds to two columns of data lines, and one column of data line of the two columns of data lines is electrically connected to odd-numbered rows of pixel circuits in the column of pixel circuits, and is configured to provide a corresponding data voltage for the odd-numbered rows of pixel circuits in the column of pixel circuits; and the other column of data line of the two columns of data lines is electrically connected to even-numbered rows of pixel circuits in the column of pixel circuits, and is configured to provide a corresponding data voltage for the even-numbered row of pixel circuits in the column of pixel circuits.

Optionally, a gate driving signal on a row of gate line is delayed by H/2 from a gate driving signal on an adjacent previous row of gate line, and H is a row period.

Optionally, the display panel further includes a plurality of multiplexing circuits, the multiplexing circuit is configured to control a data voltage provided by a p-th data input terminal to be input to four columns of data lines in a time-division manner under the control of a multiplexing control signal provided by a multiplexing control line; p is a positive integer.

Optionally, the multiplexing control line includes a first multiplexing control line, a second multiplexing control line, a first column gate control line, and a second column gate control line; a p-th multiplexing circuit includes a p-th row of multiplexing sub-circuit and a p-th of column multiplexing sub-circuit; the p-th column of multiplexing sub-circuit is respectively electrically connected to the p-th data input terminal, the first column gate control line, the second column gate control line, a (2p−1)th writing-in node and a 2p-th writing-in node, configured for controlling to connect or disconnect the p-th data input terminal and the (2p−1)th writing-in node, and connect or disconnect the p-th data input terminal and the 2p-th writing-in node under the control of the first column gate control signal provided by the first column gate control line and the second column gate control signal provided by the second column gate control line; the p-th row of multiplexing sub-circuit is electrically respectively connected to the (2p−1)th writing-in node, the 2p-th writing-in node, the first multiplexing control line, the second multiplexing control line, the first column of data line, the second column of data line, the third column of data line and the fourth column of data line, and configured for controlling the (2p−1)th writing-in node to connect to the first column of data line or the second column of data line, and the 2p-th writing-in node to connect to the third column of data line or the fourth column of data line under the control of the first multiplexing control signal provided by the first multiplexing control line and the second multiplexing control signal provided by the second multiplexing control line.

Optionally, the p-th column of multiplexing sub-circuit includes a p-th first column of multiplexing transistor and a p-th second column of multiplexing transistor, a control electrode of the p-th first column of multiplexing transistor is electrically connected to the first column gate control line, and a first electrode of the p-th first column of multiplexing transistor is electrically connected to the p-th data input terminal, a second electrode of the p-th first column of multiplexing transistors is electrically connected to the (2p−1)th writing-in node; a control electrode of the p-th second column of multiplexing transistors is electrically connected to the second column gate control line, and a first electrode of the p-th second column of multiplexing transistors is electrically connected to the p-th data input terminal, a second electrode of the p-th second column of multiplexing transistors is electrically connected to the 2p-th writing-in node.

Optionally, the p-th row of multiplexing sub-circuit includes a p-th first row of multiplexing transistor, a p-th second row of multiplexing transistor, a p-th third row of multiplexing transistor, and a p-th fourth row of multiplexing transistor, a control electrode of the p-th first row of multiplexing transistor is electrically connected to the first multiplexing control line, and a first electrode of the p-th first row of multiplexing transistor is electrically connected to the (2p−1)th writing-in node, a second electrode of the p-th first row of multiplexing transistor is electrically connected to the first column of data line; a control electrode of the p-th second row of multiplexing transistors is electrically connected to the second multiplexing control line, and a first electrode of the p-th second row of multiplexing transistors is electrically connected to the (2p−1)th writing-in node, a second electrode of the p-th second row of multiplexing transistor is electrically connected to the second column of data line; a control electrode of the p-th third row of multiplexing transistors is electrically connected to the second multiplexing control line, and a first electrode of the p-th third row of multiplexing transistor is electrically connected to the 2p-th writing-in node, a second electrode of the p-th third row of multiplexing transistor is electrically connected to the third column of data line; a control electrode of the p-th fourth row of multiplexing transistors is electrically connected to the first multiplexing control line, and a first electrode of the p-th fourth row of multiplexing transistors is electrically connected to the 2p-th writing-in node, a second electrode of the p-th fourth row of multiplexing transistor is electrically connected to the fourth column of data line.

Optionally, the multiplexing control line includes a first multiplexing control line, a second multiplexing control line, a third multiplexing control line, and a fourth multiplexing control line, and a p-th multiplexing circuit includes a p-th first multiplexing sub-circuit, a p-th second multiplexing sub-circuit, a p-th third multiplexing sub-circuit, and a p-th fourth multiplexing sub-circuit, wherein, the p-th first multiplexing sub-circuit is electrically connected to the first multiplexing control line, the p-th data input terminal, and the first column of data line, respectively, and controls to connect or disconnect the p-th data input terminal and the first column of data line under the control of a first multiplexing control signal provided on the first multiplexing control line; the p-th second multiplexing sub-circuit is electrically connected to the third multiplexing control line, the p-th data input terminal, and the second column of data line, respectively, and controls to connect or disconnect the p-th data input terminal and the second column of data line under the control of a third multiplexing control signal provided on the third multiplexing control line; the p-th third multiplexing sub-circuit is electrically connected to the fourth multiplexing control line, the p-th data input terminal, and the third column of data line, respectively, and controls to connect or disconnect the p-th data input terminal and the third column of data line under the control of a fourth multiplexing control signal provided on the fourth multiplexing control line; the p-th fourth multiplexing sub-circuit is electrically connected to the second multiplexing control line, the p-th data input terminal, and the fourth column of data line, respectively, and controls to connect or disconnect the p-th data input terminal and the fourth column of data line under the control of a second multiplexing control signal provided on the second multiplexing control line.

Optionally, the p-th first multiplexing sub-circuit includes a p-th first multiplexing transistor, the p-th second multiplexing sub-circuit includes a p-th second multiplexing transistor, and the p-th third multiplexing sub-circuit includes a p-th third multiplexing transistor, and the p-th fourth multiplexing sub-circuit includes a p-th fourth multiplexing transistor; a control electrode of the p-th first multiplexing transistor is electrically connected to the first multiplexing control line, and a first electrode of the p-th first multiplexing transistor is electrically connected to the p-th data input terminal, a second electrode of the p-th first multiplexing transistor is electrically connected to the first column of data line; a control electrode of the p-th second multiplexing transistor is electrically connected to the third multiplexing control line, and a first electrode of the p-th second multiplexing transistor is electrically connected to the p-th data input terminal, a second electrode of the p-th second multiplexing transistor is electrically connected to the second column of data line; a control electrode of the p-th third multiplexing transistor is electrically connected to the fourth multiplexing control line, and a first electrode of the p-th third multiplexing transistor is electrically connected to the p-th data input terminal, a second electrode of the p-th third multiplexing transistor is electrically connected to the third column of data line; a control electrode of the p-th fourth multiplexing transistor is electrically connected to the second multiplexing control line, and a first electrode of the p-th fourth multiplexing transistor is electrically connected to the p-th data input terminal, a second electrode of the p-th fourth multiplexing transistor is electrically connected to the fourth column of data line.

Optionally, the display panel further includes a plurality of rows of light-emitting control lines, wherein the same row of pixel circuits are electrically connected to a same row of reset control line and a same row of light-emitting control line, the same row of reset control line is configured to provide a reset control signal for the same row of pixel circuits, and the same row of light-emitting control line is configured to provide a light emitting control line for the same row of pixel circuits.

In a second aspect, an embodiment of the present disclosure provides a driving method of a display panel, applied to the display panel, the method includes: providing, by a same row of reset control line, a reset control signal for the same row of pixel circuits; providing, by one row of gate line of the two rows of gate lines corresponding to the same row of pixel circuits, a corresponding gate driving signal for the odd-numbered column of pixel circuits in the same row of pixel circuits, and providing, by the other row of gate line of the two rows of gate lines corresponding to the same row of pixel circuits, corresponding a gate driving signal for the even-numbered column of pixel circuits in the same row of pixel circuits; and providing, by one column of data line of the two columns of data lines corresponding to the same column of pixel circuits, a corresponding data voltage for the odd-numbered row of pixel circuits in the same column of pixel circuits, and providing, by the other column of data line of the two columns of data lines corresponding to the same column of pixel circuits, a corresponding data voltage for the even-numbered row of pixel circuits in the same column of pixel circuits, wherein a gate driving signal on a row of gate line is delayed by H/2 from a gate driving signal on an adjacent previous row of gate line, and H is a row period.

Optionally, the display panel further comprises a plurality of rows of light-emitting control lines; the driving method of the display panel further includes: providing, by a same row of the light-emitting control line, a light-emitting control signal for the same row of pixel circuits.

Optionally, an n-th row display period includes an n-th reset period, an n-th data writing-in period, and an n-th light-emitting control period that are sequentially set; n is a positive integer; in the n-th reset period, the n-th row of reset control signal line provides a valid n-th row of reset control signal; in a (2n−1)th row of writing-in period included in the n-th data writing-in period, a (2n−1)th row of gate line provides a valid gate driving signal; in an 2n-th row of writing time period included in the n-th data writing-in time period, a 2n-th row of gate line provides a valid gate driving signal; in the n-th light-emitting control period, the n-th row of light-emitting control signal line provides a valid light emitting control signal; the 2n-th row of writing-in period is delayed by H/2 from the (2n−1)th row of the writing-in period.

Optionally, the display panel further comprises a plurality of multiplexing circuits; the method further includes: controlling, by the multiplexing circuit, a data voltage provided by the data input terminal to be input to four columns of data lines in a time-division manner under the control of a multiplexing control signal provided by a multiplexing control line.

Optionally, the multiplexing control line comprises a first multiplexing control line, a second multiplexing control line, a first column gate control line, and a second column gate control line; the p-th multiplexing circuit includes a p-th row of multiplexing sub-circuit and a p-th column of multiplexing sub-circuit; a data providing period includes a first data providing period, a second data providing period, a third data providing period, and a fourth data providing period arranged in sequence; p is a positive integer; the controlling, by the multiplexing circuit, a data voltage provided by the data input terminal to be input to four columns of data lines in a time-division manner under the control of a multiplexing control signal provided by a multiplexing control line includes: in the first data providing period and the third data providing period, the p-th column of multiplexing sub-circuit controlling to connect the p-th data input terminal and the (2p−1)th writing-in node and controlling to disconnect the p-th data input terminal from the 2p-th writing-in node under the control of the first column gate control signal provided by the first column gate control line and the second column gate control signal provided by the second column gate control line; in the second data providing period and the fourth data providing period, the p-th column of multiplexing sub-circuit controlling to disconnect the p-th data input terminal from the (2p−1)th writing-in node and controlling to connect the p-th data input terminal to the 2p-th writing-in node under the control of the first column gate control signal and the second column gate control signal; in the first data providing period and the second data providing period, the p-th row of multiplexing sub-circuit controlling to connect the (2p−1)th writing-in node and the first column of data line and controlling to connect the 2p-th writing-in node and the fourth column of data line under the control of the first multiplexing control signal provided by the first multiplexing control line and the second multiplexing control signal provided by the second multiplexing control line; in the third data providing period and the fourth data providing period, the p-th row multiplexing sub-circuit controlling to connect the (2p−1)th writing-in node and the second column of data line and controlling to connect the 2p-th writing-in node and the third column of data line under the control of the first multiplexing control signal and the second multiplexing control signal.

Optionally, the multiplexing control line comprises a first multiplexing control line, a second multiplexing control line, a third multiplexing control line, and a fourth multiplexing control line, and the p-th multiplexing circuit includes a p-th first multiplexing sub-circuit, a p-th second multiplexing sub-circuit, a p-th third multiplexing sub-circuit, and a p-th fourth multiplexing sub-circuit; a data providing period includes a first data providing period, a second data providing period, a third data providing period and a fourth data providing period; p is a positive integer; the controlling, by the multiplexing circuit, a data voltage provided by the data input terminal to be input to four columns of data lines in a time-division manner under the control of a multiplexing control signal provided by a multiplexing control line includes: in the first data providing period, the p-th first multiplexing sub-circuit controlling to connect the p-th data input terminal and the first column of data line under the control of the first multiplexing control signal provided by the first multiplexing control line; in the second data providing period, the p-th fourth multiplexing sub-circuit controlling to connect the p-th data input terminal and the fourth column of data line under the control of the second multiplexing control signal provided by the second multiplexing control line; in the third data providing period, the p-th second multiplexing sub-circuit controlling to connect the p-th data input terminal and the second column of data line under the control of the third multiplexing control signal provided by the third multiplexing control line; in the fourth data providing period, the p-th third multiplexing sub-circuit controlling to connect the p-th data input terminal and the third column of data line under the control of the fourth multiplexing control signal provided by the fourth multiplexing control line.

In a third aspect, an embodiment of the present disclosure provides a display device including the above display panel.

Optionally, the display device further includes a first gate driving circuit, a second gate driving circuit, a third gate driving circuit, and a fourth gate driving circuit; wherein the first gate driving circuit is configured to provide a first row of gate driving signal for the first row of gate line; the second gate driving circuit is configured to provide a second row of gate driving signal for the second row of gate line; the third gate driving circuit is configured to provide a third row of gate driving signal for the third row of gate line; the fourth gate driving circuit is configured to provide a fourth row of gate driving signal for the fourth row of gate line.

Optionally, the first gate driving circuit comprises a plurality of stages of first shift register units; a gate driving signal output terminal of an a-th stage of first shift register unit is electrically connected to the first row of gate line, and an input terminal of a (a+1)th stage of first shift register unit is electrically connected to the first row of gate line, a gate driving signal output terminal of the (a+1)th stage of the first shift register unit is electrically connected to the fifth row of gate line; a reset terminal of the a-th stage of first shift register unit is electrically connected to the fifth row of gate line; the second gate driving circuit includes a plurality of stages of second shift register units; a gate driving signal output terminal of an a-th stage of second shift register unit is electrically connected to the second row of gate line, and an input terminal of a (a+1)th stage of the second shift register unit is electrically connected to the second row of gate line, a gate driving signal output terminal of the (a+1)th stage of second shift register unit is electrically connected to the sixth row of gate line; a reset terminal of the a-th stage of second shift register unit is electrically connected to the sixth row of gate line; the third gate driving circuit includes a plurality of stages of third shift register units; a gate driving signal output terminal of an a-th stage of third shift register unit is electrically connected to the third row of gate line, and an input terminal of a (a+1)th stage of second shift register unit is electrically connected to the third row of gate line, a gate driving signal output terminal of the (a+1)th stage of third shift register unit is electrically connected to the seventh row of gate line; a reset terminal of the a-th stage of third shift register unit is electrically connected to the seventh row of gate line, the fourth gate driving circuit includes a plurality of stages of fourth shift register units; a gate driving signal output terminal of an a-th stage of fourth shift register unit is electrically connected to the fourth row of gate line, and an input terminal of a (a+1)th stage of fourth shift register unit is electrically connected to the fourth row of gate line; a gate driving signal output terminal of the (a+1)th stage of fourth shift register unit is electrically connected to the eighth row of gate line; a reset terminal of the a-th stage of fourth shift register unit is electrically connected to the eighth row of gate line.

Optionally, the display panel further comprises a plurality of rows of reset control lines; the display device further comprises a reset control signal generating circuit, the reset control signal generating circuit is configured to provide a corresponding reset control signal for each row of reset control line.

Optionally, the display panel further comprises a plurality of rows of light emitting control lines; the display device further comprises a light emitting control signal generation circuit; the light emitting control signal generation circuit is configured to provide a corresponding light-emitting control signal for each row of light-emitting control line.

DETAILED DESCRIPTION

Figure 1:
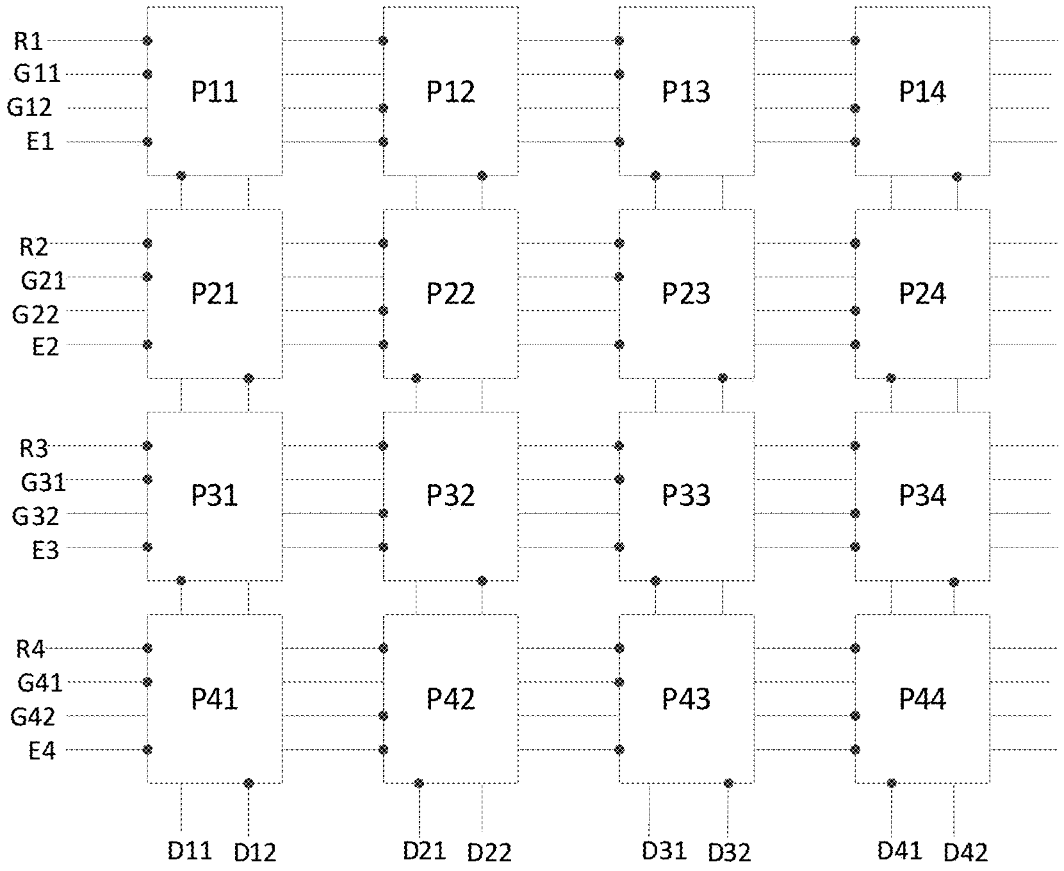
FIG. 1 is a schematic structural diagram of a pixel circuit of four rows and four columns, eight rows of gate lines, and eight columns of data lines included in a display panel according to at least one embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor other than the control electrode, one of the electrodes is referred to as the first electrode, and the other electrode is referred to as the second electrode.

In actual operation, when the transistor is a triode, the control electrode can be a base, the first electrode can be a collector, and the second electrode can be an emitter; or, the control electrode can be a base, the first electrode may be an emitter, and the second electrode may be a collector.

In actual operation, when the transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

The display panel according to at least one embodiment of the present disclosure includes multiple rows and multiple columns of pixel circuits, multiple rows of gate lines, multiple rows of reset control lines, and multiple columns of data lines.

The same row of pixel circuits corresponds to two rows of gate lines, and one of the two rows of gate lines is electrically connected to odd-numbered columns of pixel circuits in the row of pixel circuits, and is used to provide corresponding gate driving signals to for odd-numbered columns of pixel circuits in the row of pixel circuits.

The other of the two rows of gate lines is electrically connected to even-numbered columns of pixel circuits in the row of pixel circuits, and is used to provide corresponding gate driving signals for the even-numbered columns of pixel circuits in the row of pixel circuits.

The same row of pixel circuits corresponds to a row of reset control line, and the reset control lines provide a corresponding reset control signal for the corresponding row of pixel circuits.

The same column of pixel circuits corresponds to two columns of data lines, and one of the two columns of data lines is electrically connected to odd-numbered rows of pixel circuits in the column of pixel circuits, and is used to provide corresponding data voltage to the odd-numbered rows of pixel circuits in the column of pixel circuits.

The other of the two columns of data lines is electrically connected to the even-numbered row of pixel circuits in the column of pixel circuits, and is used to provide corresponding data voltages for the even-numbered row of pixel circuits in the column of pixel circuits.

In the display panel according to at least one embodiment of the present disclosure, one row of pixel circuits is electrically connected to two rows of gate lines, and one column of pixel circuits is electrically connected to two columns of data lines, so that the compensation time can reach twice the row period, which can have enough time to compensate the threshold voltage of the driving transistor in the pixel circuit to ensure the display effect and at the same time achieve a higher data refresh speed.

In at least one embodiment of the present disclosure, each row of pixel circuits corresponds to one row of the reset control line, a reset control signal is provided to each row of the reset control line individually, instead of multiplexing adjacent rows of the gate driving signals to provide the reset control signal for one row of the pixel circuits.

Optionally, the gate driving signal on the gate line is delayed by H/2 from the gate driving signal on the adjacent previous row of gate line, and H is the row period.

In at least one embodiment of the present disclosure, the row period refers to the data writing-in time of each row of pixel circuits, but it is not limited to this.

In at least one embodiment of the present disclosure, the display panel may include a regular area and a special-shaped area.

The special-shaped area may include: edge area, irregular area, camera area, and area around the camera; wherein the area around the camera can be displayed, and for the design of the under-screen camera, in order to improve transmittance of the area around the camera, the area around the camera may not be displayed. In specific implementation, the camera area may be a circular area, and the area around the camera may generally be a ring-shaped area surrounding the camera area. In the area around the camera, signal lines in the left and right sides of the camera area may be connected by way of wounding wires (the signal lines can be, for example, gate lines, light-emitting control lines, and reset control lines, but not limited to this).

In a specific implementation, in the special-shaped area, a normal frequency scheme may be used, or a high frequency scheme in at least one embodiment of the present disclosure may be used.

In at least one embodiment of the present disclosure, in the regular area, a driving circuit is provided on both sides of the AA area (effective display area) (the drive circuit may include, for example, a gate driving circuit, a light emitting control signal generation circuit, and a reset control signal generation circuit), the driving circuit is arranged on the left and right sides of the AA area in a mirror-image way, but not limited to this.

FIG. 1 shows four rows and four columns of pixel circuits, eight rows of gate lines, and eight columns of data lines included in a display panel according to at least one embodiment of the present disclosure;

In FIG. 1, the display panel includes a pixel circuit in first row and first column P11, a pixel circuit in first row and second column P12, a pixel circuit in first row and third column P13, a pixel circuit in first row and fourth column P14, a pixel circuit in second row and first column P21, a pixel circuit in second row and second column P22, a pixel circuit in second row and third column P23, a pixel circuit in second row and fourth column P24, a pixel circuit in third row and first column P31, a pixel circuit in third row and second column P32, a pixel circuit in third row and third column P33, a pixel circuit in third row and fourth column P34, a pixel circuit in fourth row and first column P41, a pixel circuit in fourth row and second column P42, a pixel circuit in fourth row and third column P43 and a pixel circuit in fourth row and fourth column P44.

The display panel includes a first row of gate line G11, a second row of gate line G12, a third row of gate line G21, a fourth row of gate line G22, a fifth row of gate line G31, a sixth row of gate line G32, a seventh row of gate line G41, an eighth row of gate line G42, a first column of data line D11, a second column of data line D12, a third column of data line D21, a fourth column of data line D22, a fifth column of data line D31, a sixth column of data line D32, a seventh column of data line D41 and an eighth column of data line D42.

G11 is electrically connected to P11 and P13, and G12 is electrically connected to P12 and P14;

G21 is electrically connected to P21 and P23, and G22 is electrically connected to P22 and P24;

G31 is electrically connected to P31 and P33, and G32 is electrically connected to P32 and P34;

G41 is electrically connected to P41 and P43, and G42 is electrically connected to P42 and P44;

D11 is electrically connected to P11 and P31, and D12 is electrically connected to P21 and P41;

D21 is electrically connected to P22 and P42, and D22 is electrically connected to P12 and P32;

D31 is electrically connected to P13 and P33, and D32 is electrically connected to P23 and P43;

D41 is electrically connected to P24 and P44, and D42 is electrically connected to P14 and P34.

In at least one embodiment of the present disclosure, the display panel may include multiple rows of gate lines, multiple columns of data lines, and multiple rows and multiple columns of pixel circuits. FIG. 1 shows only part of the pixel circuits, part of the gate lines and part of the data lines included in the display panel.

Figure 2:
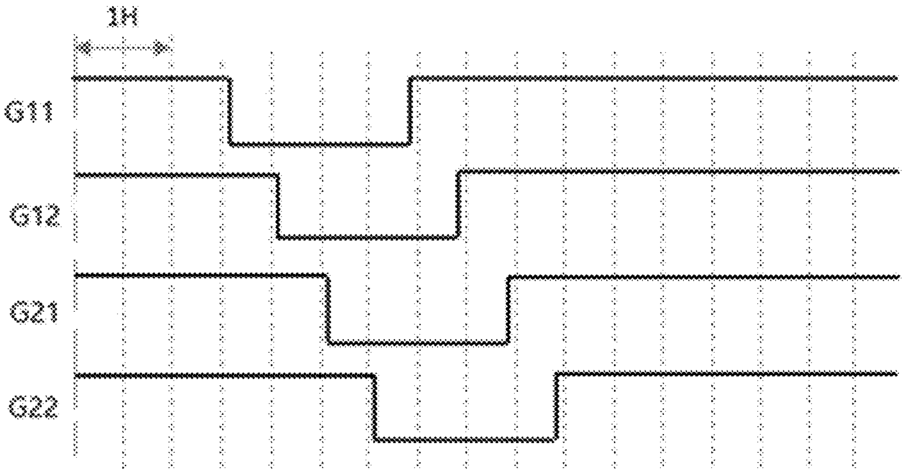
FIG. 2 is a waveform diagram of gate driving signals on gate lines in four rows of a display panel according to at least one embodiment of the present disclosure.

When the display panel shown in FIG. 1 of at least one embodiment of the present disclosure is in operation, as shown in FIGS. 2, G11, G12, G21, G22, G31, G32, G41, and G42 sequentially change from the OFF state to the ON state, and the second row of gate driving signal provided by G12 is delayed by H/2 (H is the row period) from the first row of gate driving signal provided by G11, the third row of gate driving signal provided by G21 is delayed by H/2 from the second row of gate driving signal provided by G12, the fourth row of gate driving signal provided by G22 is delayed by H/2 from the third row of gate driving signal provided by G21, the fifth row of gate driving signal provided by G31 is delayed by H/2 from the fourth row of gate driving signal provided by G22, the sixth row of gate driving signal provided by G32 is delayed by H/2 from the fifth row of gate driving signal provided by G31, the seventh row of gate driving signal provided by G41 is delayed by H/2 from the sixth row of gate driving signal provided by G32, the eighth row of gate driving signal provided by G42 is delayed by H/2 from the seventh row of gate driving signal provided by G41.

As shown in FIG. 2, when at least one embodiment of the display panel shown in FIG. 1 of the present disclosure is in operation, during the time period when G11 is turned on (that is, the time period when G11 outputs a low voltage), the data writing-in transistor and the compensation transistor in the pixel circuits in the first row and odd-numbered columns are turned on; during the time period when G12 is turned on (that is, the time period when G12 outputs a low voltage), the data writing-in transistor and the compensation transistor in the pixel circuit of the first row and the even-numbered columns are turned on; during the time period when G21 is turned on (that is, the time period G21 outputs a low voltage), the data writing-in transistor and the compensation transistor in the pixel circuit of the second row and odd-numbered columns are turned on; during the time period when G22 is turned on (that is, the time period G22 outputs a low voltage), the data writing-in transistor and the compensation transistor in the pixel circuit of the second row and even-numbered columns are turned on.

That is, even if there are overlapped time periods between the time period when G11 is turned on, the time period when G12 is turned on, the time period when G21 is turned on, and the time period when G22 is turned on, the charging and compensation of each pixel circuit will not be adversely affected (the compensation refers to the compensation on the threshold voltage of the driving transistor in the pixel circuit), so the compensation time can be increased (the compensation time may be the time that a row of gate line is continuously on), and the compensation time can be increased to twice the row period.

In specific implementation, the display panel described in at least one embodiment of the present disclosure further includes a plurality of multiplexing circuits; the multiplexing circuit is used to control the data voltage provided by the data input terminal to be input to the four columns of data lines in a time-division manner under the control of the multiplexing control signal provided by the multiplexing control line.

The display panel according to at least one embodiment of the present disclosure adopts a multiplexing circuit to provide data voltages for four columns of data lines through one data input terminal in a time-division manner, thereby reducing the number of channel for which data driving Integrated Circuit (IC) need to be used, and reducing the cost of the display panel.

Figure 3:
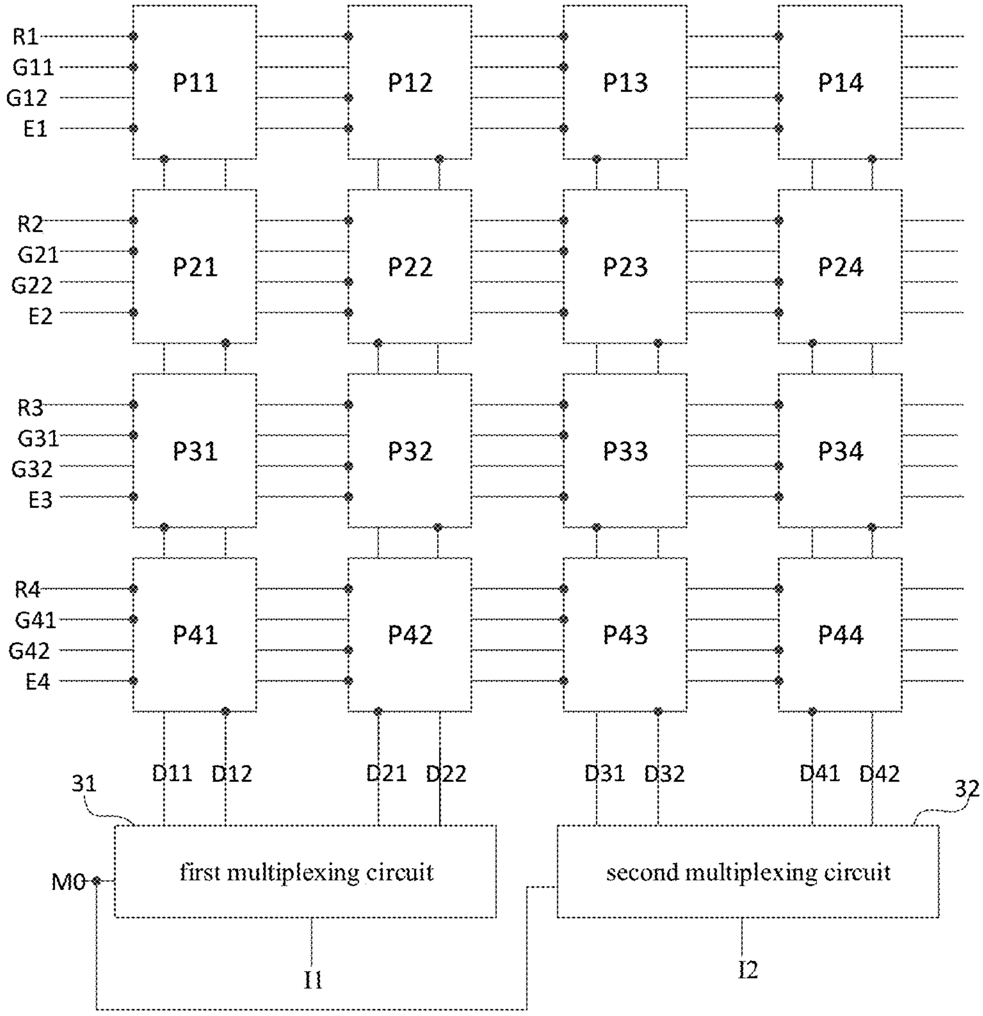
FIG. 3 is a structural diagram of a display panel according to at least one embodiment of the present disclosure.

As shown in FIG. 3, based on at least one embodiment of the display panel shown in FIG. 1, the display panel according to at least one embodiment of the present disclosure further includes a first multiplexing circuit 31 and a second multiplexing circuit 32.

The first multiplexing circuit 31 is electrically connected to the multiplexing control line M0, the first data input terminal I1, the first column of data line D11, the second column of data line D12, the third column of data line D21, and the fourth column of data line D22, respectively, used for controlling the data voltage provided by the first data input terminal I1 to be provided to D11, D12, D21, and D22 in a time-division manner under the control of the multiplexing control signal provided by the multiplexing control line M0.

The second multiplexing circuit 32 is electrically connected to the multiplexing control line M0, the second data input terminal I2, the fifth column of data line D31, the sixth column of data line D32, the seventh column of data line D41, and the eighth column of data line D42, used for controlling the data voltage provided by the second data input terminal I2 to be provided to D31, D32, D41, and D42 in a time-division manner under the control of the multiplexing control signal provided by the multiplexing control line M0.

According to a specific embodiment, the multiplexing control line includes a first multiplexing control line, a second multiplexing control line, a first column gate control line, and a second column gate control line; the p-th multiplexing circuit includes the p-th row of multiplexing sub-circuit and the p-th of column multiplexing sub-circuit; p is a positive integer;

The p-th column of multiplexing sub-circuit is respectively electrically connected to the p-th data input terminal, the first column gate control line, the second column gate control line, the 2p−1th writing-in node and the 2p-th writing-in node, used for controlling to connect or disconnect the p-th data input terminal and the (2p−1)th writing-in node, and connect or disconnect the p-th data input terminal and the 2p-th writing-in node under the control of the first column gate control signal provided by the first column gate control line and the second column gate control signal provided by the second column gate control line.

The p-th row of multiplexing sub-circuit is electrically respectively connected to the (2p−1)th writing-in node, the 2p-th writing-in node, the first multiplexing control line, the second multiplexing control line, the (4p−3)th column of data line, the (4p−2)th column of data line, the (4p−1)th column of data line and the 4p-th column of data line, and used for controlling the (2p−1)th writing-in node to connect to the (4p−3)th column of data line or the (4p−2)th column of data line, and the 2p-th writing-in node to connect to the (4p−1)th column of data lines or the 4p-th column of data lines under the control of the first multiplexing control signal provided by the first multiplexing control line and the second multiplexing control signal provided by the second multiplexing control line.

In specific implementation, the multiplexing control line may include a first multiplexing control line, a second multiplexing control line, a first column gate control line, and a second column gate control line; the p-th multiplexing circuit includes a p-th row of multiplexing sub-circuit and a p-th column of multiplexing sub-circuit. The p-th column of multiplexing sub-circuit is used to control the the p-th data input terminal to connect to the (2p−1)th writing-in node or the 2p-th writing-in node, the p-th row of multiplexing sub-circuit controls the (2p−1)th writing-in node to connect to the (4p−3)th column of data line or the (4p−2)th column of data line, and control the 2p-th writing-in node to connect to the (4p−1)th column of data line or the 4p-th column of data line, so as to provide the data voltage provided by the p-th data input terminal to the (4p−3)th column of data line, the (4p−2)th column of data line, (4p−1)th column of data line and 4p-th column of data line in a time-division manner.

Figure 4:
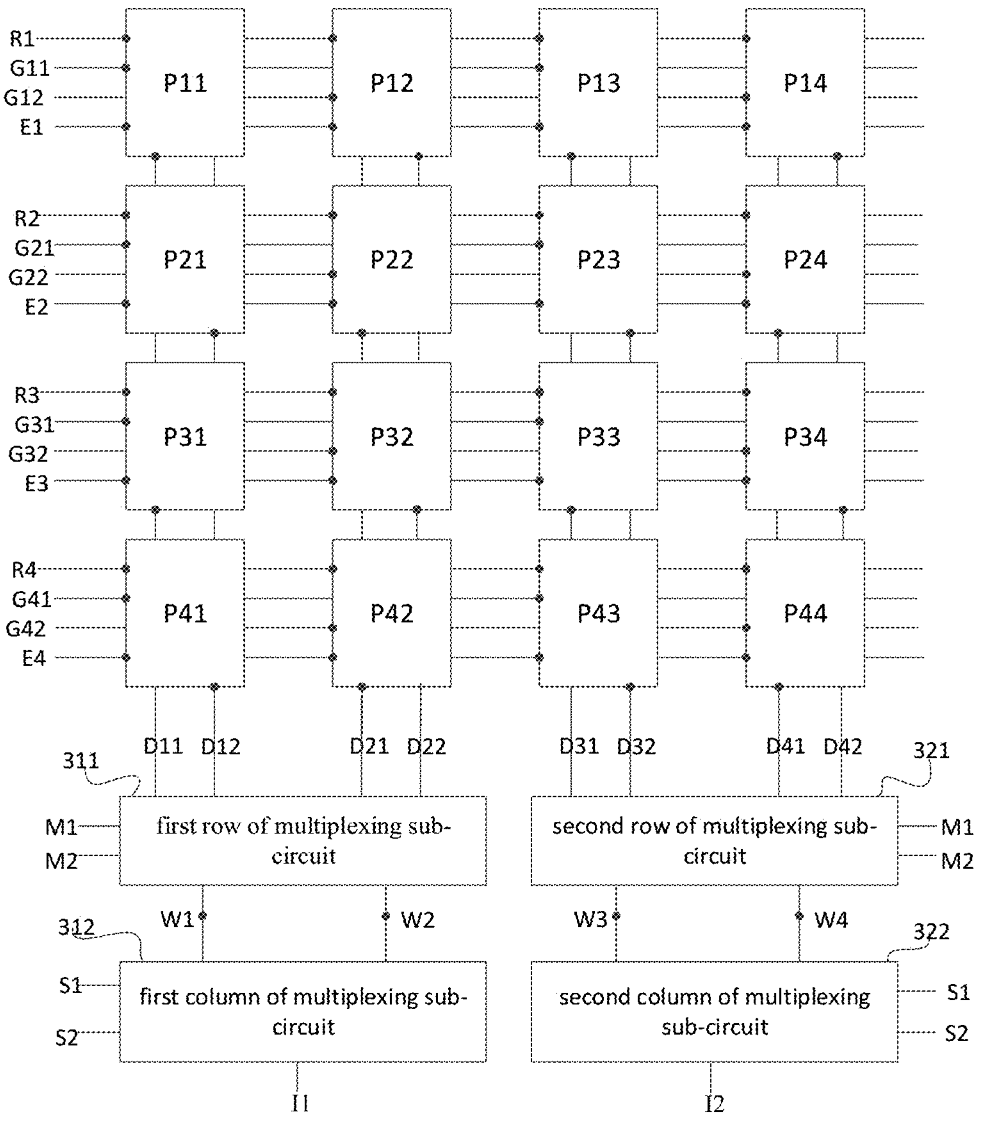
FIG. 4 is a structural diagram of a display panel according to at least one embodiment of the present disclosure.

As shown in FIG. 4, based on at least one embodiment of the display panel shown in FIG. 3, the multiplexing control line includes a first multiplexing control line M1, a second multiplexing control line M2, a first column gate control line S1 and second column gate control line S2; the first multiplexing circuit includes a first row of multiplexing sub-circuit 311 and a first column of multiplexing sub-circuit 312; the second multiplexing circuit includes a second row of multiplexing sub-circuit 321 and second column of multiplexing sub-circuit 322.

The first column of multiplexing sub-circuit 312 is electrically connected to the first data input terminal I1, the first column gate control line S1, the second column gate control line S2, the first writing-in node W1, and the second writing-in node W2, used connect or disconnect the first data input terminal I1 and the first writing-in node W1, and connect or disconnect the first data input terminal I1 and the second writing-in node W1 under the control of the first column gate control signal provided by the first column gate control line S1 and the second column gate control signal provided by the second column gate control line S2.

The first row of multiplexing sub-circuit 311 is respectively electrically connected to the first writing-in node W1, the second writing-in node W2, the first multiplexing control line M1, the second multiplexing control line M2, and the second multiplexing control line M2, the first column of data line D11, the second column of data line D12, the third column of data line D21, and the fourth column of data line D22, are used for connecting the first writing-in node W1 to the first column of data line D11 or the second multiplexing control signal, and connecting the second writing-in node W2 to the third column of data lines D21 or the fourth column of data lines D22 under the control of the first multiplexing control signal provided by the first multiplexing control line M1 and the second multiplexing control signal provided by the second multiplexing control line M2.

The second column of multiplexing sub-circuit 322 is electrically connected to the second data input terminal 12, the first column gate control line S1, the second column gate control line S2, and the third writing-in node W3, and a fourth writing-in node W4, and controls to connect or disconnect the second data input terminal I2 and the third writing-in node W3, and connect or disconnect the second data input terminal I2 and the fourth writing-in node W3 under the control of the first column gate control signal provided by the first column gate control line S1 and the second column gate control signal provided by the second column gate control line S2.

The second row of multiplexing sub-circuit 321 is respectively electrically connected to the third writing-in node W3, the fourth writing-in node W4, the first multiplexing control line M1, the second multiplexing control line M2, the fifth column of data line D31, the sixth column of data line D32, the seventh column of data line D41, and the eighth column of data line D42, and are used for connecting the third writing-in node W1 to the fifth column of data line D31 or the sixth column of data lines D32, and connecting the fourth writing-in node W4 to the seventh column of data line D41 or the eighth column of data line D42 under the control of the first multiplexing control signal provided first multiplexing control signal line M1 and the second multiplexing control signal provided by the second multiplexing control line M2.

In specific implementation, the multiplexing control line may include a first multiplexing control line M1, a second multiplexing control line M2, a first column gate control line S1, and a second column gate control line S2; the first multiplexing circuit includes a first row of multiplexing sub-circuit 311 and a first column of multiplexing sub-circuit 312. The first column of multiplexing sub-circuit 312 is used to control to connect the first data input terminal I1 to the first writing-in node W1 or the second writing-in nodes W2, and the first row of multiplexing sub-circuit 311 controls to connect the first writing-in node W1 to the first column of data line D11 or the second column of data line D12, and controls to connect the second writing-in node W2 to the third column of data line D21 or the fourth column of data line D22, so as to provide the data voltage provided by the first data input terminal I1 to the first column of data line D11, the second column of data line D12, the third column of data line D21 and the fourth column of data line D22 in a time-division manner.

The second multiplexing circuit includes a second row of multiplexing sub-circuit 321 and a second column of multiplexing sub-circuit 322. The second column of multiplexing sub-circuit 322 is used to control to connect the second data input terminal I2 to the third writing-in node W3 or the fourth writing-in node W4, the second row of multiplexing sub-circuit 321 controls to connect the third writing-in node W3 to the fifth column of data line D31 or the sixth column of data line D32, and controls to connect the fourth writing-in node W4 to the seventh column of data line D41 or the eighth column of data line D42, so as to provide the data voltage provided by the second data input terminal I2 to the fifth column of the data line D31, the sixth column of data line D32, the seventh column of data line D41, and the eighth column of data line D42 in a time-division manner.

Optionally, the p-th column of multiplexing sub-circuit includes a p-th first column of multiplexing transistor and a p-th second column of multiplexing transistor.

The control electrode of the p-th first column of multiplexing transistor is electrically connected to the first column gate control line, and the first electrode of the p-th first column of multiplexing transistor is electrically connected to the p-th data input terminal, the second electrode of the p-th first column of multiplexing transistors is electrically connected to the (2p−1)th writing-in node.

The control electrode of the p-th second column of multiplexing transistors is electrically connected to the second column gate control line, and the first electrode of the p-th second column of multiplexing transistors is electrically connected to the p-th data input terminal, the second electrode of the p-th second column of multiplexing transistors is electrically connected to the 2p-th writing-in node.

Optionally, the p-th row of multiplexing sub-circuit includes a p-th first row of multiplexing transistor, a p-th second row of multiplexing transistor, a p-th third row of multiplexing transistor, and a p-th fourth row of multiplexing transistors.

The control electrode of the p-th first row of multiplexing transistor is electrically connected to a first multiplexing control line, and the first electrode of the p-th first row of multiplexing transistor is electrically connected to the (2p−1)th writing-in node, the second electrode of the p-th first row of multiplexing transistor is electrically connected to the (4p−3)th column of data line;

The control electrode of the p-th second row of multiplexing transistors is electrically connected to a second multiplexing control line, and the first electrode of the p-th second row of multiplexing transistors is electrically connected to the (2p−1)th writing-in node, the second electrode of the p-th second row of multiplexing transistor is electrically connected to the (4p−2)th column of data line.

The control electrode of the p-th third row of multiplexing transistors is electrically connected to a second multiplexing control line, and the first electrode of the p-th third row of multiplexing transistors is electrically connected to the 2p-th writing-in node, the second electrode of the p-th third row of multiplexing transistor is electrically connected to the (4p−1)th column of data line;

The control electrode of the p-th fourth row of multiplexing transistors is electrically connected to a first multiplexing control line, and the first electrode of the p-th fourth row of multiplexing transistors is electrically connected to the 2p-th writing-in node, the second electrode of the p-th fourth row of multiplexing transistor is electrically connected to the 4p-th column of data line.

Figure 5:
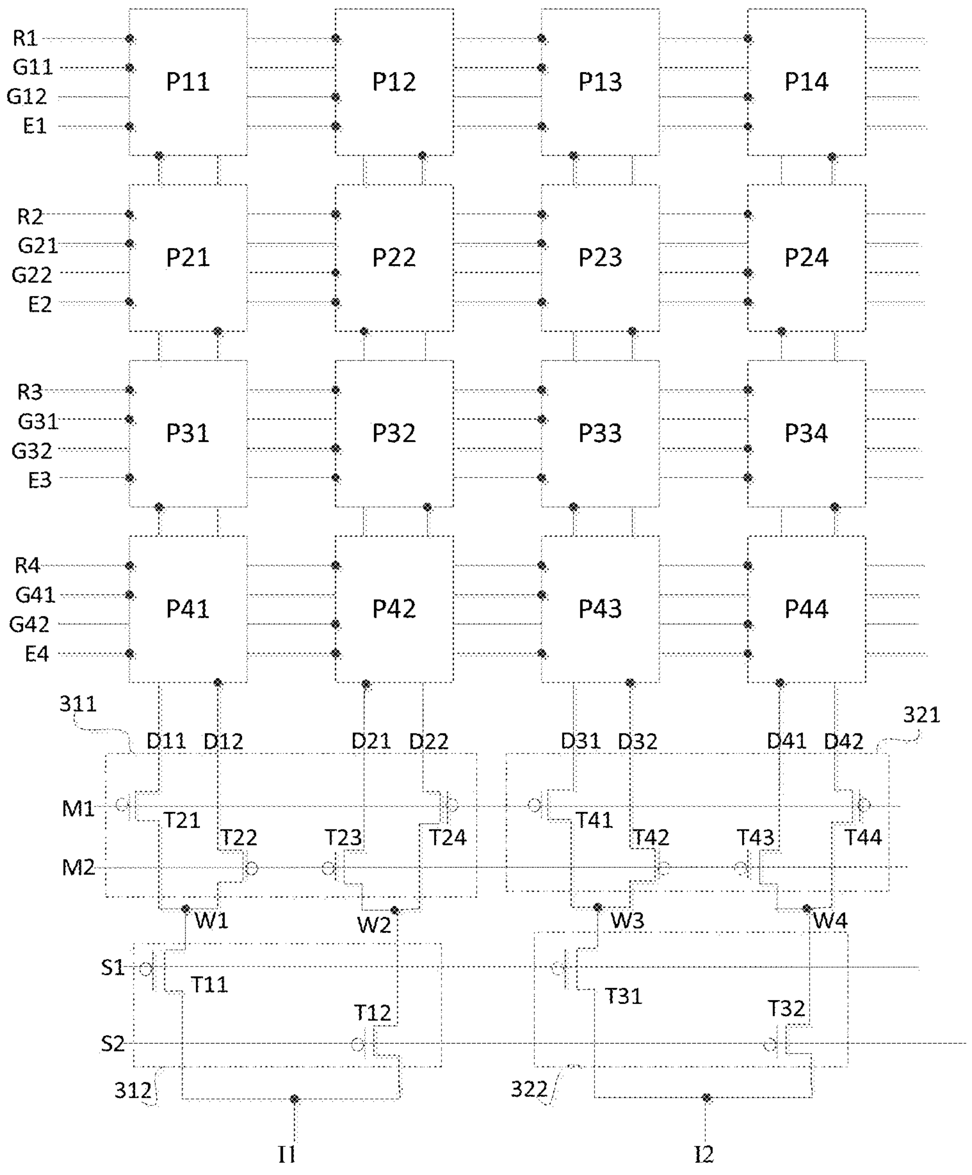
FIG. 5 is a circuit diagram of the display panel according to at least one embodiment of the present disclosure.

As shown in FIG. 5, based on at least one embodiment of the display panel shown in FIG. 4, the first column of multiplexing sub-circuit 312 includes a first first column of multiplexing transistor T11 and a first second column of multiplexing transistor T12, in which, The gate electrode of the first first column of multiplexing transistor T11 is electrically connected to the first column gate control line S1, and the source electrode of the first first column of multiplexing transistor T11 is electrically connected to the first data input terminal I1, and the drain electrode of the first first column of multiplexing transistor T11 is electrically connected to the first writing-in node W1;

The gate electrode of the first second column of multiplexing transistor T12 is electrically connected to the second column gate control line S2, and the source electrode of the first second column of multiplexing transistor T12 is electrically connected to the first data input terminal I1, and the drain electrode of the first second column of multiplexing transistor T12 is electrically connected to the second writing-in node W2;

The first row of multiplexing sub-circuit 311 includes a first first row of multiplexing transistor T21, a first second row of multiplexing transistor T22, a first third row of multiplexing transistor T23, and a first fourth row of multiplexing transistor T24;

The gate electrode of the first first row multiplexing transistor T21 is electrically connected to the first multiplexing control line M1, and the source electrode of the first first row of multiplexing transistor T21 is electrically connected to the first writing-in node W1, the drain electrode of the first first row of multiplexing transistor T21 is electrically connected to the first column of data line D11;

The gate electrode of the first second row of multiplexing transistor T22 is electrically connected to the second multiplexing control line M2, and the source electrode of the first second row of multiplexing transistor T22 is electrically connected to the first writing-in node W1, the drain electrode of the first second row of multiplexing transistor T22 is electrically connected to the second column of data line D12;

The gate electrode of the first third row of multiplexing transistor T23 is electrically connected to the second multiplexing control line M2, and the source electrode of the first third row of multiplexing transistor T23 is electrically connected to the second writing-in node W2, the drain electrode of the first third row of multiplexing transistor T23 is electrically connected to the third column of data line D21;

The gate electrode of the first fourth row of multiplexing transistor T24 is electrically connected to the first multiplexing control line M1, and the source electrode of the first fourth row of multiplexing transistor T24 is electrically connected to the second writing-in node W2, the drain electrode of the first fourth row of multiplexing transistor T24 is electrically connected to the fourth column of data line D22;

The second column of multiplexing sub-circuit 322 includes a second first column of multiplexing transistor T31 and a second second column of multiplexing transistor T32, wherein, The gate electrode of the second first column of multiplexing transistor T31 is electrically connected to the first column gate control line S1, and the source electrode of the second first column of multiplexing transistor T31 is electrically connected to the second data input terminal I2, and the drain electrode of the second first column of multiplexing transistor T31 is electrically connected to the third writing-in node W3;

The gate electrode of the second second column of multiplexing transistor T32 is electrically connected to the second column gate control line S2, and the source electrode of the second second column of multiplexing transistor T32 is electrically connected to the second data input terminal I2, and the drain electrode of the second second column of multiplexing transistor T32 is electrically connected to the fourth writing-in node W4;

The second row of multiplexing sub-circuit 321 includes a second first row of multiplexing transistor T41, a second second row of multiplexing transistor T42, a second third row of multiplexing transistor T43, and a second fourth row of multiplexing transistor T44;

The gate electrode of the second first row of multiplexing transistor T41 is electrically connected to the first multiplexing control line M1, and the source electrode of the second first row of multiplexing transistor T41 is electrically connected to the third writing-in node W3, the drain electrode of the second first row of multiplexing transistor T41 is electrically connected to the fifth column of data line D31;

The gate electrode of the second second row of multiplexing transistor T42 is electrically connected to the second multiplexing control line M2, and the source electrode of the second second row of multiplexing transistor T42 is electrically connected to the third writing-in node W3, the drain electrode of the second second row of multiplexing transistor T42 is electrically connected to the sixth column of data line D32;

The gate electrode of the second third row of multiplexing transistor T43 is electrically connected to the second multiplexing control line M2, and the source electrode of the second third row of multiplexing transistor T43 is electrically connected to the fourth writing-in node W4, the drain electrode of the second third row of multiplexing transistor T43 is electrically connected to the seventh column of data line D41;

The gate electrode of the second fourth row of multiplexing transistor T44 is electrically connected to the first multiplexing control line M1, and the source electrode of the second fourth row of multiplexing transistor T44 is electrically connected to the fourth writing-in node W4, the drain electrode of the first fourth row of multiplexing transistor T44 is electrically connected to the eighth column of data line D42;

In at least one embodiment of the display panel shown in FIG. 5, all the transistors are p-type thin film transistors, but not limited to this.

Figure 6A:
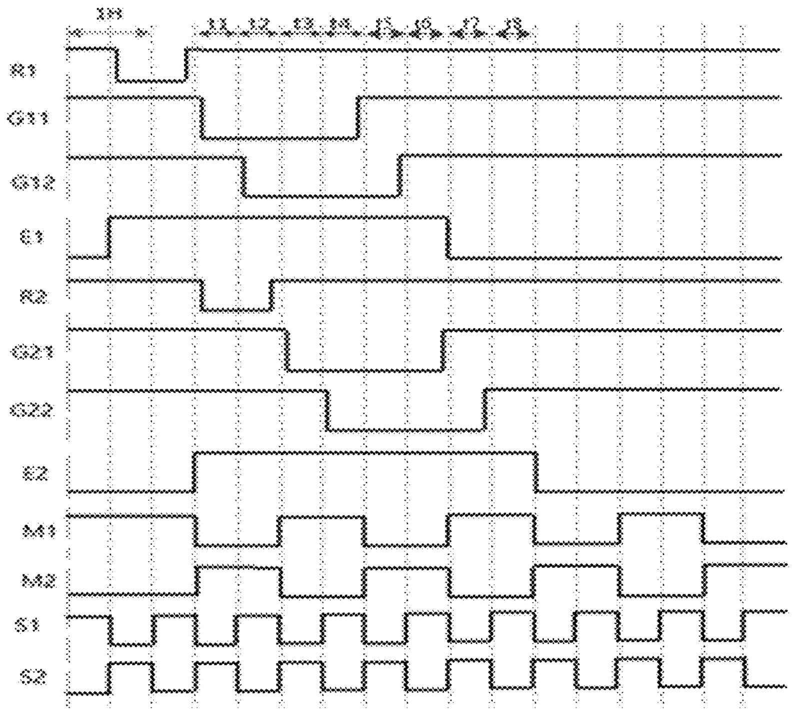
FIG. 6A is a working time sequence diagram of the display panel shown in FIG. 5 of at least one embodiment of the present disclosure.

As shown in FIG. 6A, when at least one embodiment of the display panel shown in FIG. 5 of the present disclosure is in operation, the data providing period includes a first data providing phase t1, a second data providing phase t2, a third data providing phase t3, a fourth data providing phase t4, a fifth data providing phase t5, a sixth data providing phase t6, a seventh data providing phase t7, and an eighth data providing phase t8 set in sequence.

In the first data providing phase t1, S1 provides a low voltage, S2 provides a high voltage, M1 provides a low voltage, M2 provides a high voltage, T11 is turned on, T12 is turned off, T31 is turned on, T32 is turned off, and T21 and T24 are turned on, T22 and T23 are turned off, T41 and T44 are turned on, T42 and T43 are turned off, I1 and W1 are connected, W1 and D11 are connected, I1 provides data voltage for D11; I2 and W3 are connected, W3 and D31 are connected, I2 provides data voltage for D31;

In the second data providing phase t2, S1 provides a high voltage, S2 provides a low voltage, M1 provides a low voltage, M2 provides a high voltage, T11 is turned off, T12 is turned on, T31 is turned off, T32 is turned on, and T21 and T24 are turned on, T22 and T23 are turned off, T41 and T44 are turned on, T42 and T43 are turned off, I1 and W2 are connected, W2 and D22 are connected, I1 provides data voltage for D22; I2 and W4 are connected, W4 and D42 are connected, I2 provides data voltage for D42;

In the third data providing phase t3, S1 provides a low voltage, S2 provides a high voltage, M1 provides a high voltage, M2 provides a low voltage, T11 is turned on, T12 is turned off, T31 is turned on, T32 is turned off, T21 and T24 are turned off, T22 and T23 are turned on, T41 and T44 are turned off, T42 and T43 are turned on, I1 and W1 are connected, W1 and D12 are connected, I1 provides data voltage for D12, I2 and W3 are connected, and W3 and D32 are connected, I2 provides data voltage for D32;

In the fourth data providing phase t4, S1 provides a high voltage, S2 provides a low voltage, M1 provides a high voltage, M2 provides a low voltage, T11 is turned off, T12 is turned on, T31 is turned off, T32 is turned on, and T21 and T24 are turned off, T22 and T23 are turned on, T41 and T44 are turned off, T42 and T43 are turned on, I1 and W2 are connected, W2 and D21 are connected, I1 provides data voltage for D21; I2 and W4 are connected, W4 and D41 are connected, I2 provides data voltage for D41;

In the fifth data providing phase t5, S1 provides a low voltage, S2 provides a high voltage, M1 provides a low voltage, M2 provides a high voltage, T11 is turned on, T12 is turned off, T31 is turned on, T32 is turned off, and T21 and T24 are turned on, T22 and T23 are turned off, T41 and T44 are turned on, T42 and T43 are turned off, I1 and W1 are connected, W1 and D11 are connected, I1 provides data voltage for D11; I2 and W3 are connected, W3 and D31 are connected, I2 provides data voltage for D31;

In the sixth data providing phase t6, S1 provides a high voltage, S2 provides a low voltage, M1 provides a low voltage, M2 provides a high voltage, T11 is turned off, T12 is turned on, T31 is turned off, T32 is turned on, and T21 and T24 are turned on, T22 and T23 are turned off, T41 and T44 are turned on, T42 and T43 are turned off, I1 and W2 are connected, W2 and D22 are connected, I1 provides data voltage for D22; I2 and W4 are connected, W4 and D42 are connected, I2 provides data voltage for D42;

In the seventh data providing phase t7, S1 provides a low voltage, S2 provides a high voltage, M1 provides a high voltage, M2 provides a low voltage, T11 is turned on, T12 is turned off, T31 is turned on, T32 is turned off, T21 and T24 are turned off, T22 and T23 are turned on, T41 and T44 are turned off, T42 and T43 are turned on, I1 and W1 are connected, W1 and D12 are connected, I1 provides data voltage for D12, I2 and W3 are connected, and W3 and D32 are connected, I2 provides data voltage for D32;

In the eighth data providing phase t8, S1 provides a high voltage, S2 provides a low voltage, M1 provides a high voltage, M2 provides a low voltage, T11 is turned off, T12 is turned on, T31 is turned off, T32 is turned on, and T21 and T24 are turned off, T22 and T23 are turned on, T41 and T44 are turned off, T42 and T43 are turned on, I1 and W2 are connected, W2 and D21 are connected, I1 provides data voltage for D21; I2 and W4 are connected, W4 and D41 are connected, I2 provides data voltage for D41.

As shown in FIG. 6A, at t1, t2, t3, and t4, G11 provides a low voltage, and G11 is turned on;

At t2, t3, t4 and t5, G12 provides a low voltage and G12 is turned on;

At t3, t4, t5 and t6, G21 provides a low voltage and G21 is turned on;

At t4, t5, t6 and t7, G22 provides a low voltage and G22 is turned on.

As shown in FIG. 6A, the second row gate driving signal provided by G12 is delayed by H/2 from the first row gate driving signal provided by G11, the third row gate driving signal provided by G21 is delayed by H/2 from the second row gate driving signal provided by G12, the fourth row gate driving signal provided by G22 is delayed by H/2 from the first row gate driving signal provided by G21.

When the display panel shown in FIG. 5 of at least one embodiment of the present disclosure is in operation, as shown in FIG. 6A, At t1, I1 provides a data voltage for D11, I2 provides a data voltage for D31, and G11 is turned on, so that the data voltage provided by each data writing-in terminal can be written into the first row of odd-numbered column of pixel circuits;

At t2, I1 provides the data voltage for D22, I2 provides the data voltage for D42, and G12 is turned on, so that the data voltage provided by each data writing-in terminal can be written into the first row of even-numbered column of pixel circuits;

At t3, I1 provides data voltage for D12, I2 provides data voltage for D32, and G13 is turned on, so that the data voltage provided by each data writing-in terminal can be written into the second row of odd-numbered column of pixel circuits;

At t4, I1 provides the data voltage for D21, I2 provides the data voltage for D41, and G14 is turned on, so that the data voltage provided by each data writing-in terminal can be written into the second row of even-numbered column of pixel circuits.

Since the display panel shown in FIG. 5 of at least one embodiment of the present disclosure uses a multiplexing circuit to provide data voltages for four data lines in a time-division manner through a data writing-in terminal, and one row of pixel circuits corresponds to two rows of gate lines, and one column of pixel circuits correspond to two columns of data lines. Therefore, in order to provide corresponding data voltages to pixel circuits in odd-numbered rows and odd-numbered columns, pixel circuits in odd-numbered rows and even-numbered columns, pixel circuits in even-numbered rows and odd-numbered columns, and pixel circuits in even-numbered rows and even-numbered columns, it is necessary to set the gate driving signals on adjacent rows of gate lines to be spaced H/2 apart from each other.

In specific implementation, one stage of light-emitting control signal generating unit in the light-emitting control signal generating circuit may provide light-emitting control signals for the two rows of pixel circuits through the two row of light-emitting control lines. For example, in at least one embodiment shown in FIG. 5, the first-stage of light-emitting control signal generation circuit may provide light-emitting control signals for E1 and E2, and the second-stage of light-emitting control signal generation circuit may provide light-emitting control signals for E3 and E4.

Figure 6B:
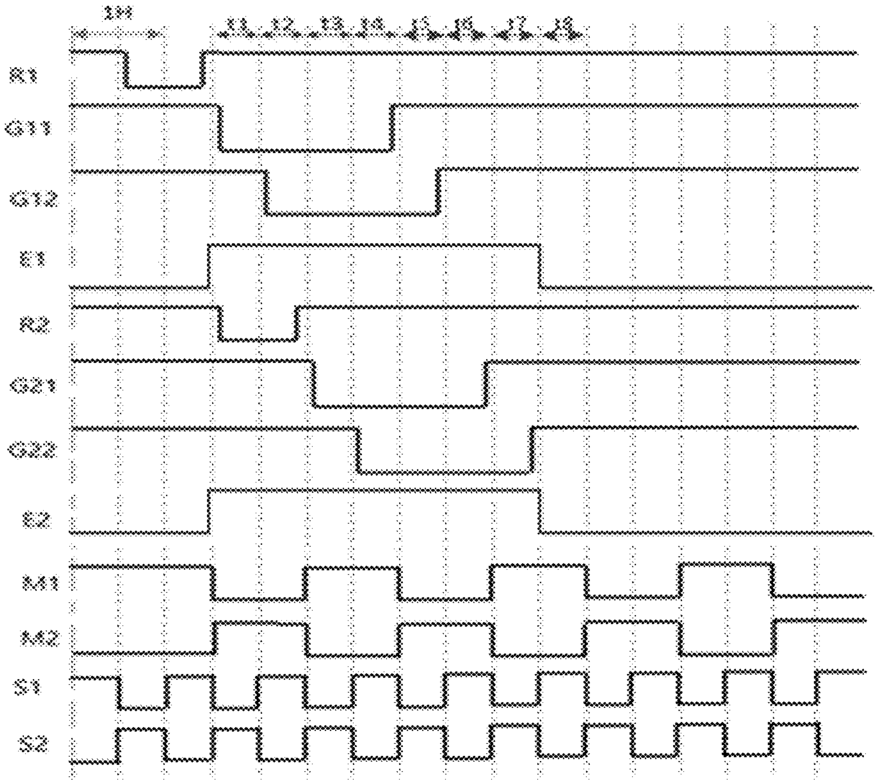
FIG. 6B is a working time sequence diagram of the display panel shown in FIG. 5 of at least one embodiment of the present disclosure.

FIG. 6B is another working timing diagram of the display panel shown in FIG. 5. The difference between FIG. 6B and FIG. 6A is that the light-emitting control signal on E1 is the same as the light-emitting control signal on E2.

Figure 7A:
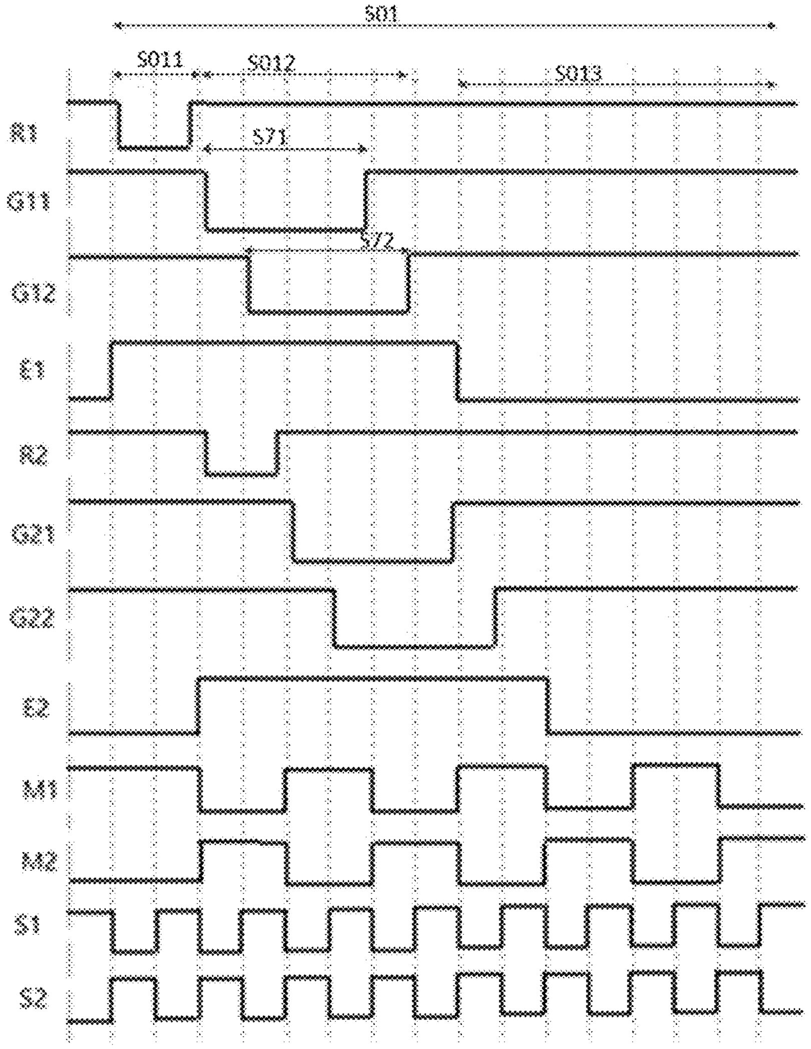
FIG. 7A is a working time sequence diagram of the display panel shown in FIG. 5 of at least one embodiment of the present disclosure.

As shown in FIG. 7A, when the display panel shown in FIG. 5 of at least one embodiment of the present disclosure is in operation, the first row display period S01 may include a first reset period S011, a first data writing-in period S012 and the first light emitting control period S013 set in sequence;

In the first reset period S011, the first row of reset control line R1 provides a valid first row reset control signal;

In the first row writing-in period S71 included in the first data writing-in period S012, the first row of gate line G11 provides a valid gate driving signal;

In the second row writing-in period S72 included in the first data writing-in period S012, the second row of gate line G12 provides a valid gate driving signal;

In the first light emitting control period S013, the first row of light emitting control line E1 provides a valid light emitting control signal;

The second row writing-in period S72 is delayed by H/2 from the first row writing-in period S71.

Figure 7B:
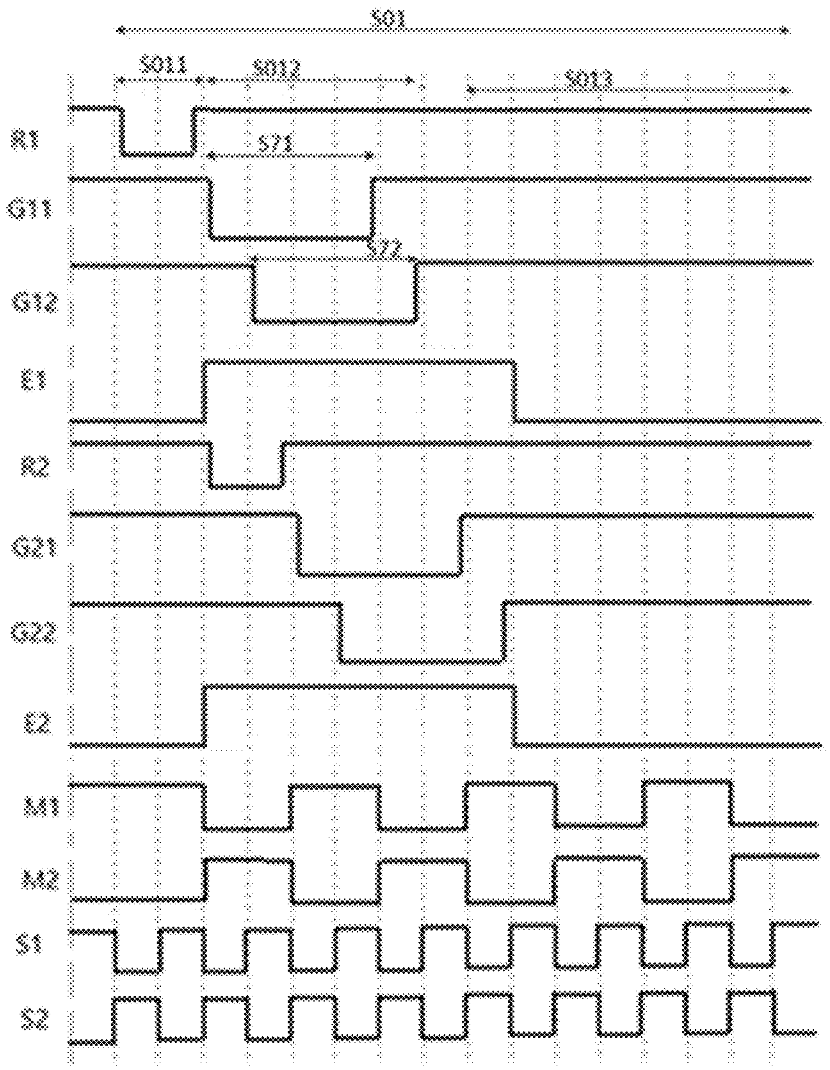
FIG. 7B is a working time sequence diagram of the display panel shown in FIG. 5 of at least one embodiment of the present disclosure.

FIG. 7B is another working timing diagram of the display panel shown in FIG. 5. The difference between FIG. 7B and FIG. 7A is that the light-emitting control signal on E1 is the same as the light-emitting control signal on E2.

Figure 8A:
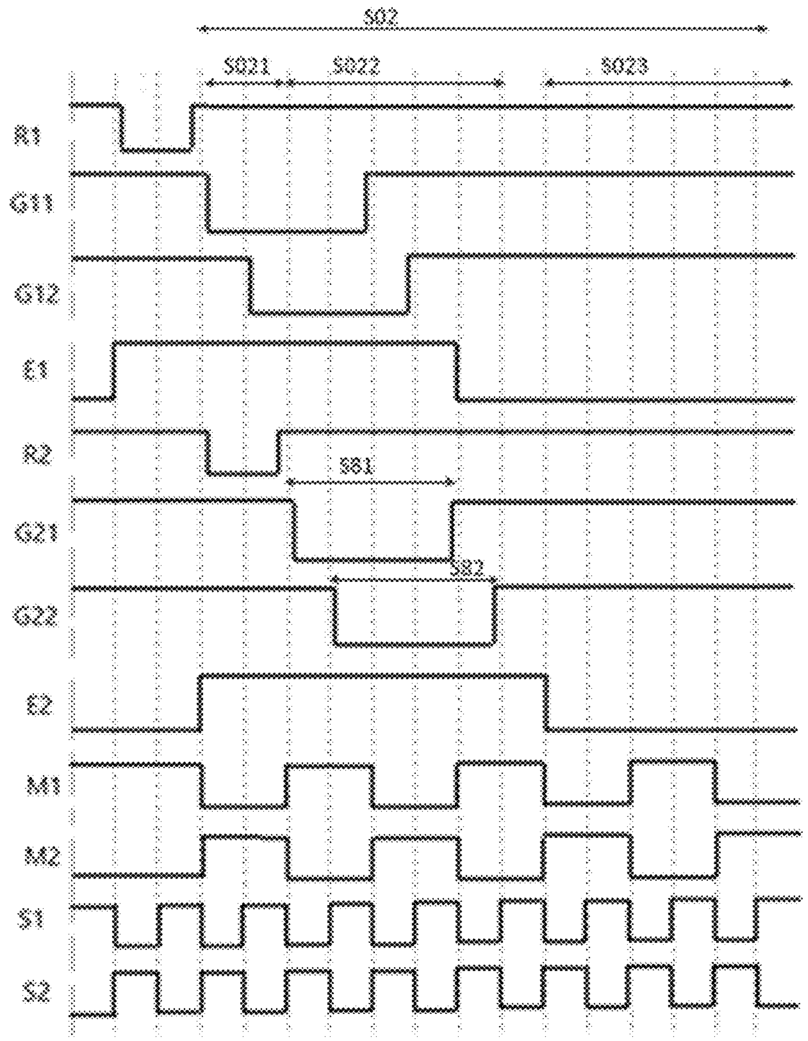
FIG. 8A is a working time sequence diagram of the display panel shown in FIG. 5 of at least one embodiment of the present disclosure.

As shown in FIG. 8A, when the display panel shown in FIG. 5 of at least one embodiment of the present disclosure is in operation, the second row display stage S02 may include a second reset period S021, a second data writing-in period S022 and the second light emitting control period S023 set in sequence;

In the second reset period S021, the second row of reset control line R2 provides a valid second row reset control signal;

In the third row writing-in period S81 included in the second data writing-in period S022, the third row of gate line G21 provides a valid gate driving signal;

In the fourth row writing-in period S82 included in the second data writing-in period S022, the fourth row of gate line G22 provides a valid gate driving signal;

In the second light emitting control period S023, the second row of light emitting control line E2 provides a valid light emitting control signal;

The fourth row writing-in period S82 is delayed by H/2 from the third row writing-in period S81.

Figure 8B:
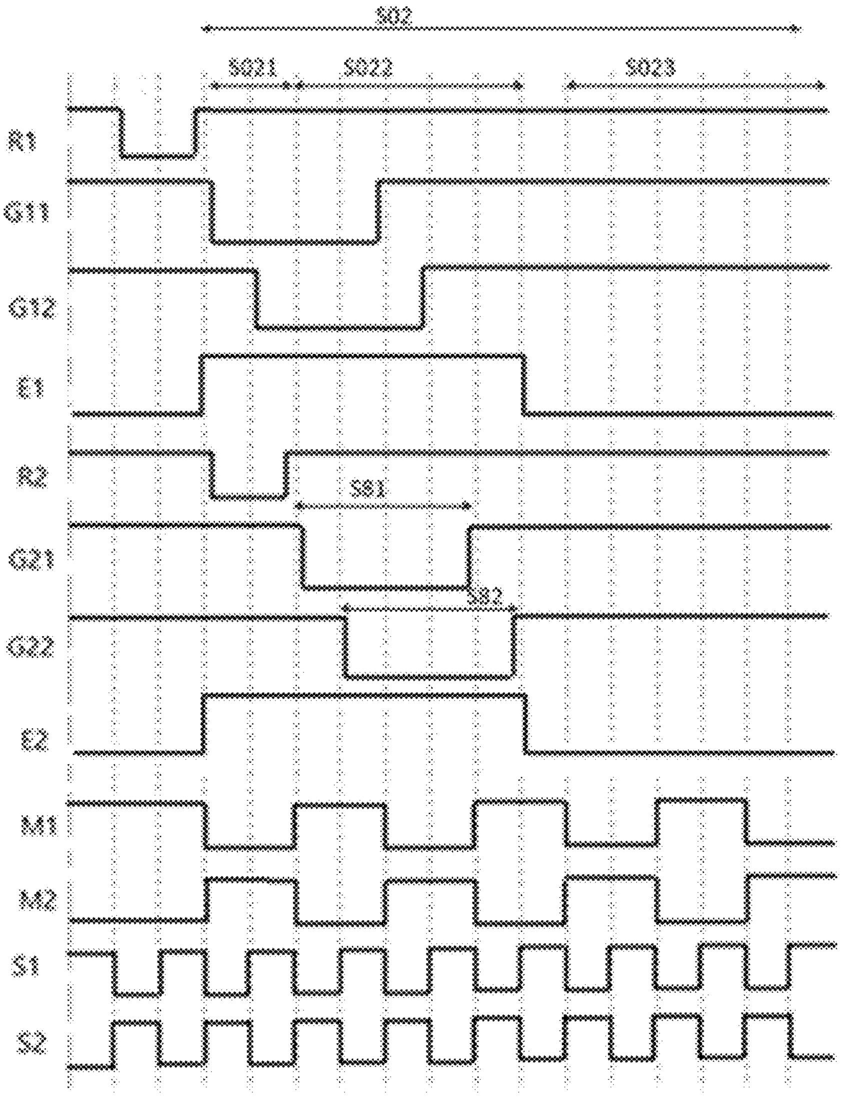
FIG. 8B is a working time sequence diagram of the display panel shown in FIG. 5 of at least one embodiment of the present disclosure.

FIG. 8B is another working timing diagram of the display panel shown in FIG. 5. The difference between FIG. 8B and FIG. 8A is that the light-emitting control signal on E1 is the same as the light-emitting control signal on E2.

According to another specific embodiment, the multiplexing control line includes a first multiplexing control line, a second multiplexing control line, a third multiplexing control line, and a fourth multiplexing control line, and the p-th multiplexing circuit includes the p-th first multiplexing sub-circuit, the p-th second multiplexing sub-circuit, the p-th third multiplexing sub-circuit, and the p-th fourth multiplexing sub-circuit, wherein, The p-th first multiplexing sub-circuit is electrically connected to the first multiplexing control line, the p-th data input terminal, and the (4p−3)th column of data line, respectively, and controls to connect or disconnect the p-th data input terminal and the (4p−3)th column of data line under the control of a first multiplexing control signal provided on the first multiplexing control line;

The p-th second multiplexing sub-circuit is electrically connected to the third multiplexing control line, the p-th data input terminal, and the (4p−2)th column of data line, respectively, and controls to connect or disconnect the p-th data input terminal and the (4p−2)th column of data line under the control of a third multiplexing control signal provided on the third multiplexing control line;

The p-th third multiplexing sub-circuit is electrically connected to the fourth multiplexing control line, the p-th data input terminal, and the (4p−1)th column of data line, respectively, and controls to connect or disconnect the p-th data input terminal and the (4p−1)th column of data line under the control of a fourth multiplexing control signal provided on the fourth multiplexing control line;

The p-th fourth multiplexing sub-circuit is electrically connected to the second multiplexing control line, the p-th data input terminal, and the 4p-th column of data line, respectively, and controls to connect or disconnect the p-th data input terminal and the 4p-th column of data line under the control of a second multiplexing control signal provided on the second multiplexing control line.

In specific implementation, the multiplexing control line may include a first multiplexing control line, a second multiplexing control line, a third multiplexing control line, and a fourth multiplexing control line, and the p-th multiplexing circuit may include the p-th first multiplexing sub-circuit, the p-th second multiplexing sub-circuit, the p-th third multiplexing sub-circuit, and the p-th fourth multiplexing sub-circuit. The p-th first multiplexing sub-circuit, the p-th second multiplexing sub-circuit, the p-th third multiplexing sub-circuit, and the p-th fourth multiplexing sub-circuit control the p-th data input terminal to provide data voltages to the (4p−3)th column of data line, the (4p−2)th column of data lines, (4p−1)th column of data lines and 4p-th column of data lines in a time-division manner.

Figure 9:
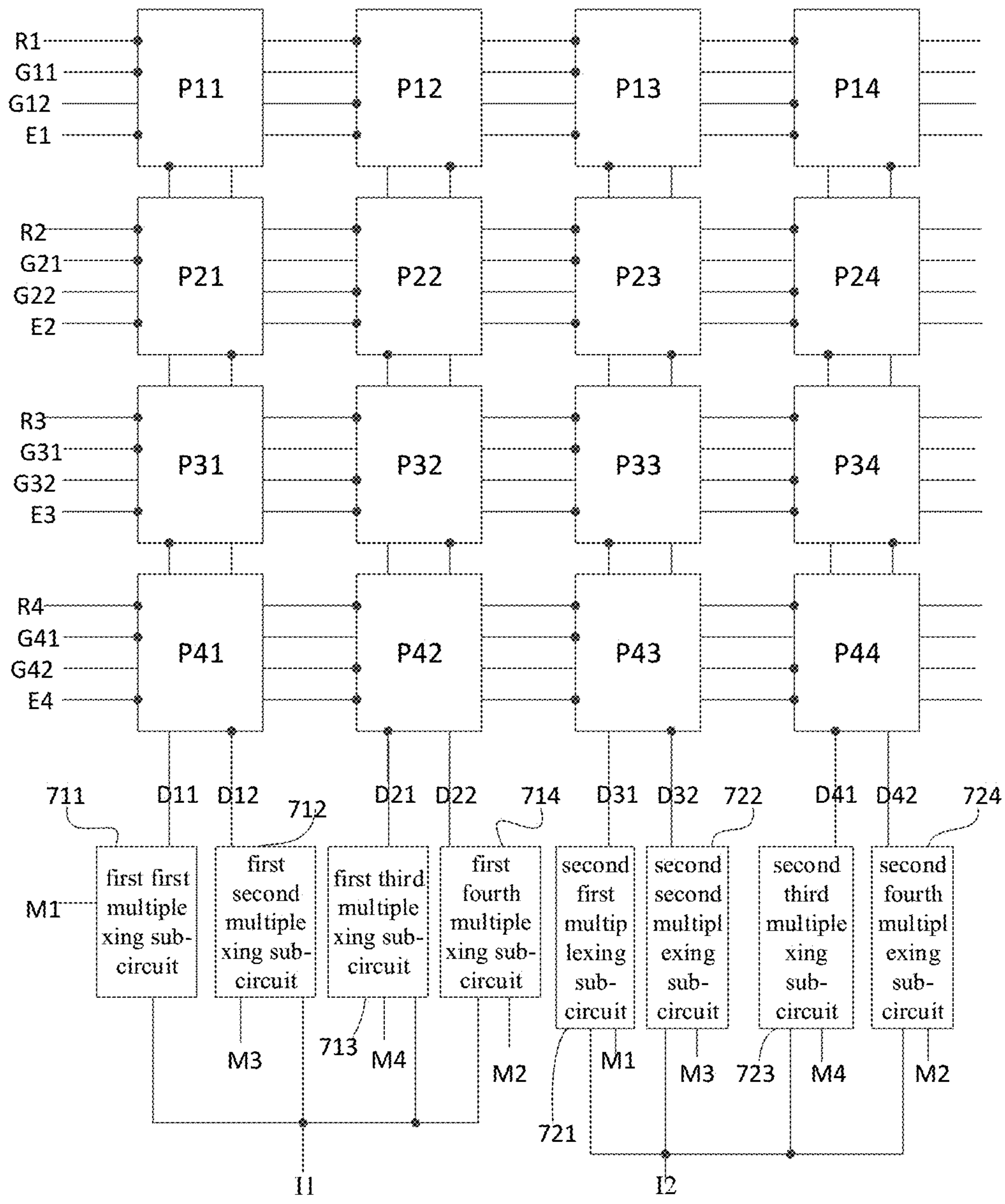
FIG. 9 is a structural diagram of a display panel according to at least one embodiment of the present disclosure.

As shown in FIG. 9, based on at least one embodiment of the display panel shown in FIG. 3, the multiplexing control line includes a first multiplexing control line M1, a second multiplexing control line M2, a third multiplexing control line M3 and the fourth multiplexing control line M4. The first multiplexing circuit includes a first first multiplexing sub-circuit 711, a first second multiplexing sub-circuit 712, and a first third multiplexing sub-circuit 713 and the first fourth multiplexing sub-circuit 714, in which, The first first multiplexing sub-circuit 711 is electrically connected to the first multiplexing control line M1, the first data input terminal I1, and the first column of data line D11, respectively, and is used to connect or disconnect the first data input terminal I1 and the first column of data line D11 under the control of the first multiplexing control signal provided by the first multiplexing control line M1.

The first second multiplexing sub-circuit 712 is electrically connected to the third multiplexing control line M3, the first data input terminal I1, and the second column of data line D12, respectively, and is used to connect or disconnect the first data input terminal I1 and the second column of data line D12 under the control of the third multiplexing control signal provided by the third multiplexing control line M3;

The first third multiplexing sub-circuit 713 is electrically connected to the fourth multiplexing control line M4, the first data input terminal I1, and the third column of data line D21, respectively, and is used to connect or disconnect the first data input terminal I1 and the third column of data line D21 under the control of the fourth multiplexing control signal provided by the fourth multiplexing control line M4;

The first fourth multiplexing sub-circuits 714 are electrically connected to the second multiplexing control line M2, the first data input terminal I1, and the fourth column of data line D22, respectively, is used to connect or disconnect the first data input terminal I1 and the first fourth of data line D22 under the control of the second multiplexing control signal provided by the second multiplexing control line M2;

The second multiplexing circuit includes a second first multiplexing sub-circuit 721, a second second multiplexing sub-circuit 722, a second third multiplexing sub-circuit 723, and a second fourth multiplexing sub-circuit 724, in which, The second first multiplexing sub-circuit 721 is electrically connected to the first multiplexing control line M1, the second data input terminal I2, and the fifth column of data line D31, respectively, and is used to connect or disconnect the second data input terminal I2 and the fifth column of data line D31 under the control of the first multiplexing control signal provided by the first multiplexing control line M1;

The second second multiplexing sub-circuit 722 is electrically connected to the third multiplexing control line M3, the second data input terminal I2, and the sixth column of data line D32, respectively, and is used to connect or disconnect the second data input terminal I2 and the sixth column of data line D32 under the control of the third multiplexing control signal provided by the third multiplexing control line M3;

The second and third multiplexing sub-circuits 723 are electrically connected to the fourth multiplexing control line M4, the second data input terminal I2, and the seventh column of data line D41, respectively, and is used to connect or disconnect the second data input terminal I2 and the seventh column of data line D41 under the control of the fourth multiplexing control signal provided by the fourth multiplexing control line M4;

The second fourth multiplexing sub-circuits 724 are electrically connected to the second multiplexing control line M2, the second data input terminal I2, and the eighth column of data line D42, respectively, and is used to connect or disconnect the second data input terminal I2 and the eighth column of data line D42 under the control of the second multiplexing control signal provided by the second multiplexing control line M2.

In specific implementation, the multiplexing control line may include a first multiplexing control line M1, a second multiplexing control line M2, a third multiplexing control line M3, and a fourth multiplexing control line M4. The first multiplexing circuit may include a first first multiplexing sub-circuit 711, a first second multiplexing sub-circuit 712, a first third multiplexing sub-circuit 713, and a first fourth multiplexing sub-circuit 714. The first first multiplexing sub-circuit 711, the first second multiplexing sub-circuit 712, the first third multiplexing sub-circuit 713, and the first fourth multiplexing sub-circuit 714 control the first data input terminal I1 to provide data voltages to D11, D12, D21 and D22 in a time-division manner; the second multiplexing circuit may include a second first multiplexing sub-circuit 721, a second second multiplexing sub-circuit 722, a second third multiplexing sub-circuit 723 and a second fourth multiplexing sub-circuit 724. The second first multiplexing sub-circuit 721, the second second multiplexing sub-circuit 722, the second third multiplexing sub-circuit 723, and the second fourth multiplexing sub-circuit 724 controls the second data input terminal I2 to provide data voltages to D31, D32, D41, and D42 in a time-division manner.

Optionally, the p-th first multiplexing sub-circuit includes a p-th first multiplexing transistor, the p-th second multiplexing sub-circuit includes a p-th second multiplexing transistor, and the p-th third multiplexing sub-circuit includes a p-th third multiplexing transistor, and the p-th fourth multiplexing sub-circuit includes a p-th fourth multiplexing transistor;

The control electrode of the p-th first multiplexing transistor is electrically connected to the first multiplexing control line, and the first electrode of the p-th first multiplexing transistor is electrically connected to the p-th data input terminal, the second electrode of the p-th first multiplexing transistor is electrically connected to the (4p−3)th column of data line;

The control electrode of the p-th second multiplexing transistor is electrically connected to the third multiplexing control line, and the first electrode of the p-th second multiplexing transistor is electrically connected to the p-th data input terminal, the second electrode of the p-th second multiplexing transistor is electrically connected to the (4p−2)th column of data line;

The control electrode of the p-th third multiplexing transistor is electrically connected to the fourth multiplexing control line, and the first electrode of the p-th third multiplexing transistor is electrically connected to the p-th data input terminal, the second electrode of the p-th third multiplexing transistor is electrically connected to the (4p−1)th column of data line;

The control electrode of the p-th fourth multiplexing transistor is electrically connected to the second multiplexing control line, and the first electrode of the p-th fourth multiplexing transistor is electrically connected to the p-th data input terminal, the second electrode of the p-th fourth multiplexing transistor is electrically connected to the 4p-th column of data line.

Figure 10:
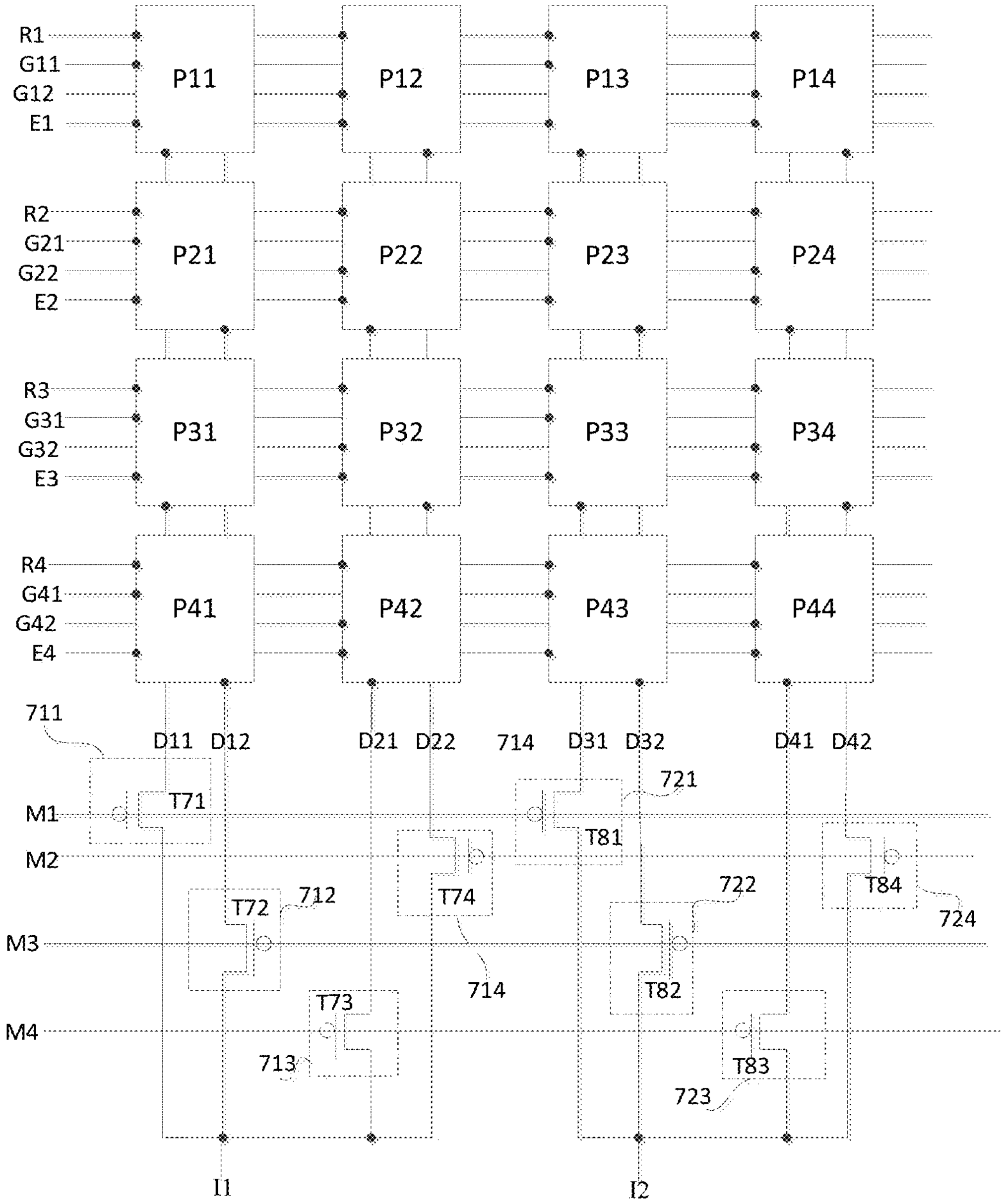
FIG. 10 is a circuit diagram of a display panel according to at least one embodiment of the present disclosure.

As shown in FIG. 10, based on at least one embodiment of the display panel shown in FIG. 9, The first first multiplexing sub-circuit 711 includes a first first multiplexing transistor T71, the first second multiplexing sub-circuit 712 includes a first second multiplexing transistor T72, and the first third multiplexing sub-circuit 713 includes a first third multiplexing transistor T73, and the first fourth multiplexing sub-circuit 714 includes a first fourth multiplexing transistor T74;

The gate electrode of the first first multiplexing transistor T71 is electrically connected to the first multiplexing control line M1, and the source electrode of the first first multiplexing transistor T71 is electrically connected to the first data input terminal I1, the drain electrode of the first first multiplexing transistor T71 is electrically connected to the first column of data line D11;

The gate electrode of the first second multiplexing transistor T72 is electrically connected to the third multiplexing control line M3, and the source electrode of the first second multiplexing transistor T72 is electrically connected to the first data input terminal I1, the drain electrode of the first second multiplexing transistor T72 is electrically connected to the second column of data line D12;

The gate electrode of the first third multiplexing transistor T73 is electrically connected to the fourth multiplexing control line M4, and the source electrode of the first third multiplexing transistor T73 is electrically connected to the first data input terminal I1, the drain electrode of the first third multiplexing transistor T73 is electrically connected to the third column of data line D21;

The gate electrode of the first and fourth multiplexing transistor T74 is electrically connected to the second multiplexing control line M2, and the source electrode of the first and fourth multiplexing transistor T74 is electrically connected to the first data input terminal I1, the drain electrode of the first fourth multiplexing transistor T74 is electrically connected to the fourth column of data line D22;

The second first multiplexing sub-circuit 721 includes a second first multiplexing transistor T81, the second second multiplexing sub-circuit 722 includes a second second multiplexing transistor T82, and the second third multiplexing sub-circuit 723 includes a second third multiplexing transistor T83, and the second fourth multiplexing sub-circuit 724 includes a second fourth multiplexing transistor T84;

The gate electrode of the second first multiplexing transistor T81 is electrically connected to the first multiplexing control line M1, and the source electrode of the second first multiplexing transistor T81 is electrically connected to the second data input terminal I2, the drain electrode of the second first multiplexing transistor T81 is electrically connected to the fifth column of data line D31;

The gate electrode of the second second multiplexing transistor T82 is electrically connected to the third multiplexing control line M3, and the source electrode of the second second multiplexing transistor T82 is electrically connected to the second data input terminal I2, the drain electrode of the second second multiplexing transistor T82 is electrically connected to the sixth column of data line D32;

The gate electrode of the second third multiplexing transistor T83 is electrically connected to the fourth multiplexing control line M4, and the source electrode of the second third multiplexing transistor T83 is electrically connected to the second data input terminal I2, the drain electrode of the second third multiplexing transistor T83 is electrically connected to the seventh column of data line D41;

The gate electrode of the second fourth multiplexing transistor T84 is electrically connected to the second multiplexing control line M2, and the source electrode of the second fourth multiplexing transistor T84 is electrically connected to the second data input terminal I2, the drain electrode of the second fourth multiplexing transistor T84 is electrically connected to the eighth column of data line D42.

In at least one embodiment shown in FIG. 10, all the transistors are p-type thin film transistors, but not limited to this.

Figure 11A:
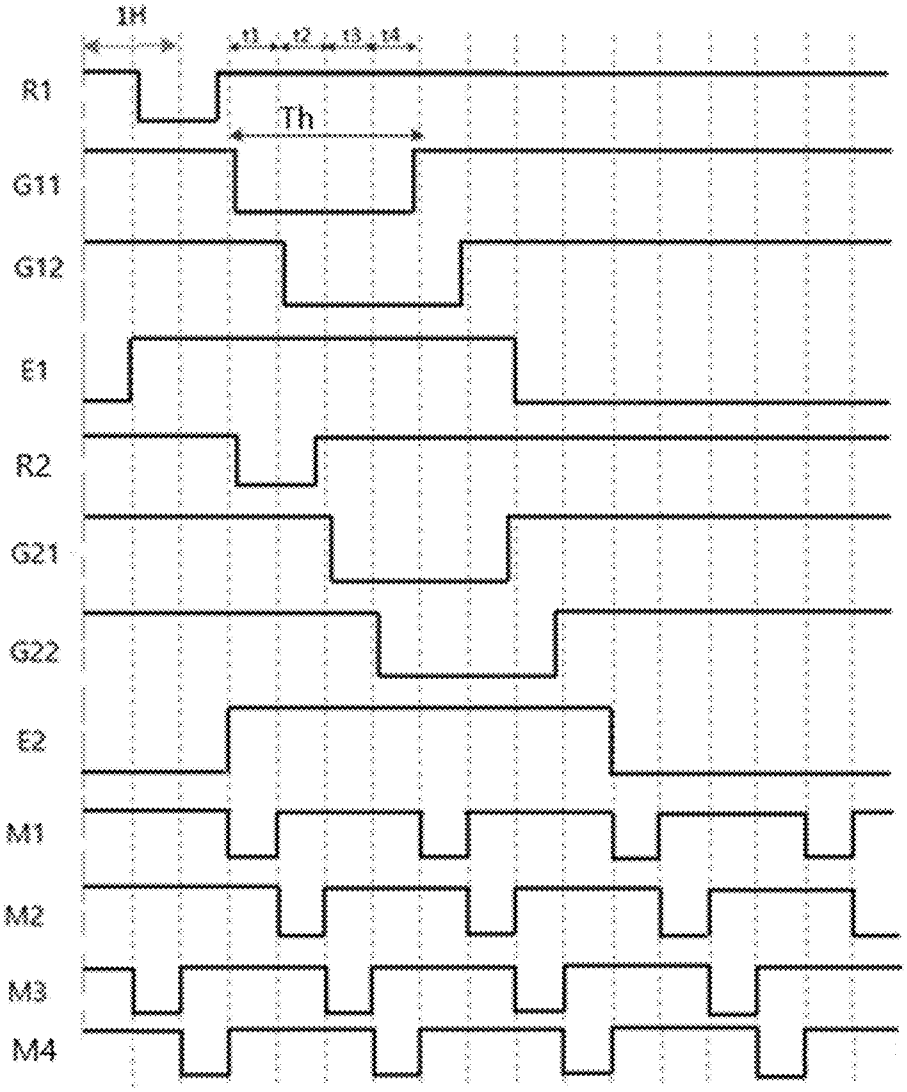
FIG. 11A is a working time sequence diagram of the display panel shown in FIG. 10 of at least one embodiment of the present disclosure.

As shown in FIG. 11A, when at least one embodiment of the display panel shown in FIG. 10 is in operation, the data providing period includes a first data providing phase t1, a second data providing phase t2, a third data providing phase t3, and a fourth data providing phase t4;

In the first data providing phase t1, M1 provides a low voltage, M2, M3, and M4 all provide a high voltage, T71 is turned on, T72, T73, and T74 are all turned off, and the first data input terminal I1 is electrically connected to the first column of data line D11. I1 provides data voltage for D11; T81 is turned on, T82, T83 and T84 are turned off, the second data input terminal I2 is electrically connected to the fifth column of data line D31, and I2 provides data voltage for D31;

In the second data providing phase t2, M2 provides a low voltage, M1, M3, and M4 all provide a high voltage, T74 is turned on, T71, T72, and T73 are all turned off, and the first data input terminal I1 is electrically connected to the fourth column of data line D22. I1 provides data voltage for D22; T84 is turned on, T81, T82 and T83 are turned off, the second data input terminal I2 is electrically connected to the eighth column of data line D42, and I2 provides data voltage for D42;

In the third data providing phase t3, M3 provides a low voltage, M1, M2, and M4 all provide a high voltage, T72 is turned on, T71, T73, and T74 are all turned off, and the first data input terminal I1 is electrically connected to the second column of data line D12. I1 provides data voltage for D12; T82 is turned on, T81, T83, and T84 are turned off, the second data input terminal I2 is electrically connected to the sixth column of data line D32, and I2 provides data voltage for D32;

In the fourth data providing phase t4, M4 provides a low voltage, M1, M2, and M3 all provide a high voltage, T73 is turned on, T71, T72, and T74 are all turned off, and the first data input terminal I1 is electrically connected to the third column of data line D21, I1 provides data voltage for D21; T83 is turned on, T81, T82, and T84 are turned off, the second data input terminal I2 is electrically connected to the seventh column of data line D41, and I2 provides data voltage for D41;

In specific implementation, the display panel described in at least one embodiment of the present disclosure further includes multiple rows of reset control lines and multiple rows of light-emitting control lines;

The same row of pixel circuits are electrically connected to the same row of reset control line and the same row of light-emitting control line, the same row of reset control line is used to provide a reset control signal for the same row of pixel circuits, and the same row of light-emitting control line is used to provide a light emitting control line for the same row of pixel circuits.

In at least one embodiment of the present disclosure, the display panel further includes multiple rows of reset control lines and multiple rows of light-emitting control lines, and each row of pixel circuits are electrically connected to the corresponding row of reset control line and the corresponding row of light-emitting control line.

As shown in FIG. 1, the display panel according to at least one embodiment of the present disclosure further includes a first row of reset control line R1, a second row of reset control line R2, a third row reset of control line R3, and a fourth row of reset control line R4, a first row of light-emitting control line E1, a second row of light-emitting control line E2, a third row of light-emitting control line E3, and a fourth row of light-emitting control line E4;

P11, P12, P13, and P14 are all electrically connected to R1, and P11, P12, P13, and P14 are all electrically connected to E1;

P21, P22, P23 and P24 are all electrically connected to R2, and P21, P22, P23 and P24 are all electrically connected to E2;

P31, P32, P33 and P34 are all electrically connected to R3, and P31, P32, P33 and P34 are all electrically connected to E3;

P41, P42, P43 and P44 are all electrically connected to R4, and P41, P42, P43 and P44 are all electrically connected to E4;

E1 provides the first row light-emitting control signal for P11, P12, P13, and P14, and R1 provides the first row reset control signal for P11, P12, P13, and P14;

E2 provides the second row light-emitting control signal for P21, P22, P23 and P24, and R2 provides the second row reset control signal for P11, P12, P13 and P14;

E3 provides the third row light-emitting control signal for P31, P32, P33 and P34, and R3 provides the third row reset control signal for P31, P32, P33 and P34;

E4 provides the fourth row light-emitting control signal for P41, P42, P43, and P44, and R4 provides the fourth row reset control signal for P41, P42, P43, and P44.

In FIGS. 6A and 11A, R1 is the first row of the reset control line, E1 is the first row of the light-emitting control line, R2 is the second row of the reset control line, and E2 is the second row of light-emitting control line.

In the display panel described in at least one embodiment of the present disclosure, four gate driving circuits may provide gate driving signals for multiple rows of pixel circuits in the display panel; wherein, The first gate driving circuit is used to provide the (4a−3)th row gate driving signal for the 4a−3th row of gate line;

The second gate driving circuit is used to provide the (4a−2)th row of gate driving signal for the (4a−2)th row of gate line;

The third gate driving circuit is used to provide the (4a−1)th row of gate driving signal for the (4a−1)th row of gate line;

The fourth gate driving circuit is used to provide the 4a-th row gate driving signal for the 4a-th row of gate line;

a is a positive integer, 4a is less than or equal to 2N; N is a positive integer.

As shown in FIG. 11A, the pulse width of the first row gate driving signal provided by G11, the pulse width of the second row gate driving signal provided by G12, the pulse width of the third row gate driving signal provided by G21, and the pulse width of the fourth row gate driving signal provided by G22 are all Th, and the phase difference of adjacent row gate driving signals is Th/4, but the phase difference between the gate driving signals outputted by adjacent rows of shift register units included in the same gate driving circuit is Th. Therefore, at least one embodiment of the present disclosure may use four gate driving circuits to provide gate driving signals for multiple rows of pixel circuits in the display panel.

In at least one embodiment of the present disclosure, the pulse width Th of the each row gate driving signal may be 2H, where H is the row period, and the phase difference between adjacent row gate driving signals may be H/2.

In at least one embodiment of the present disclosure, if the reset control signal is provided by the gate driving circuit, since one row of pixel circuits corresponds to two rows of gate driving signals, there are also two reset control signals provided for one row of pixel circuits, in order to save the layout space of the display panel, one row of pixel circuits corresponds to only one row of reset control line. Therefore, in at least one embodiment of the present disclosure, a separate reset control signal generating circuit is used to provide a corresponding reset control signal for each row of reset control line, The reset control signal is not provided by the gate driving circuit.

In at least one embodiment of the present disclosure, the light-emitting control signal generating circuit may provide corresponding light-emitting control signals for the multiple rows of pixel circuits.

Figure 11B:
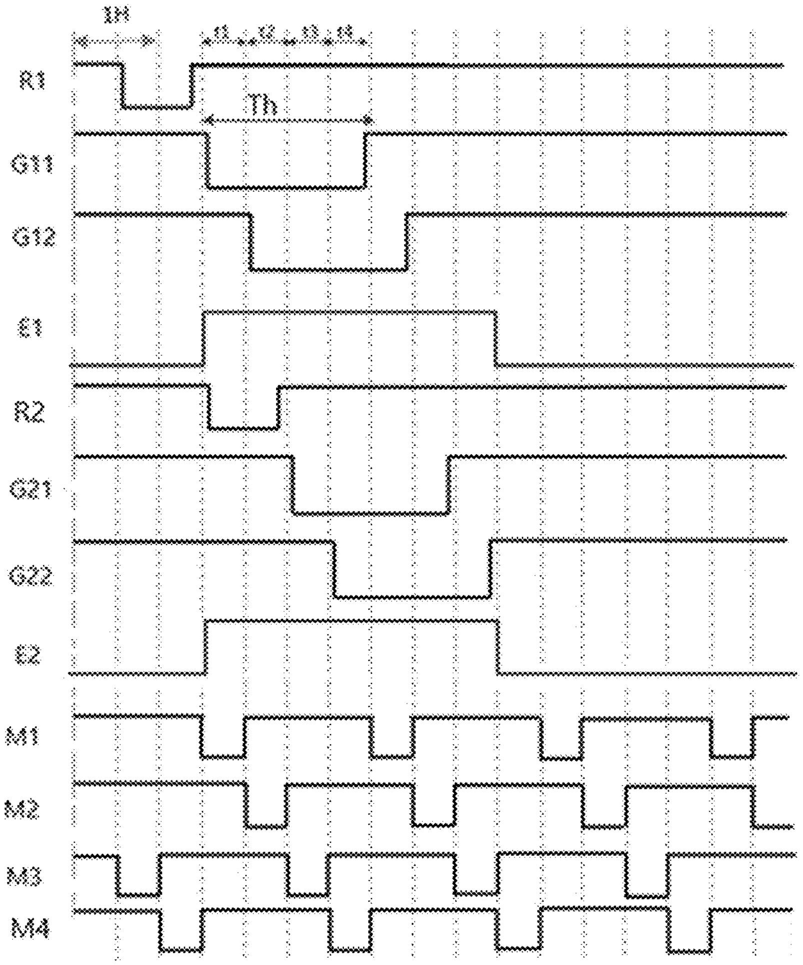
FIG. 11B is a working sequence diagram of the display panel shown in FIG. 10 of at least one embodiment of the present disclosure.

In specific implementation, one stage light-emitting control signal generating unit in the light-emitting control signal generating circuit may provide light-emitting control signals for the two rows of pixel circuits through the two row of light-emitting control lines. For example, in at least one embodiment shown in FIG. 10, the first-stage of light-emitting control signal generating circuit may provide light-emitting control signals for E1 and E2, and the second-stage of light-emitting control signal generating circuit may provide light emitting control signals for E3 and E4. FIG. 11B is another working timing diagram of the display panel shown in FIG. 10. As shown in FIG. 11B, the light-emitting control signal on E1 is the same as the light-emitting control signal on E2.

Figure 12:
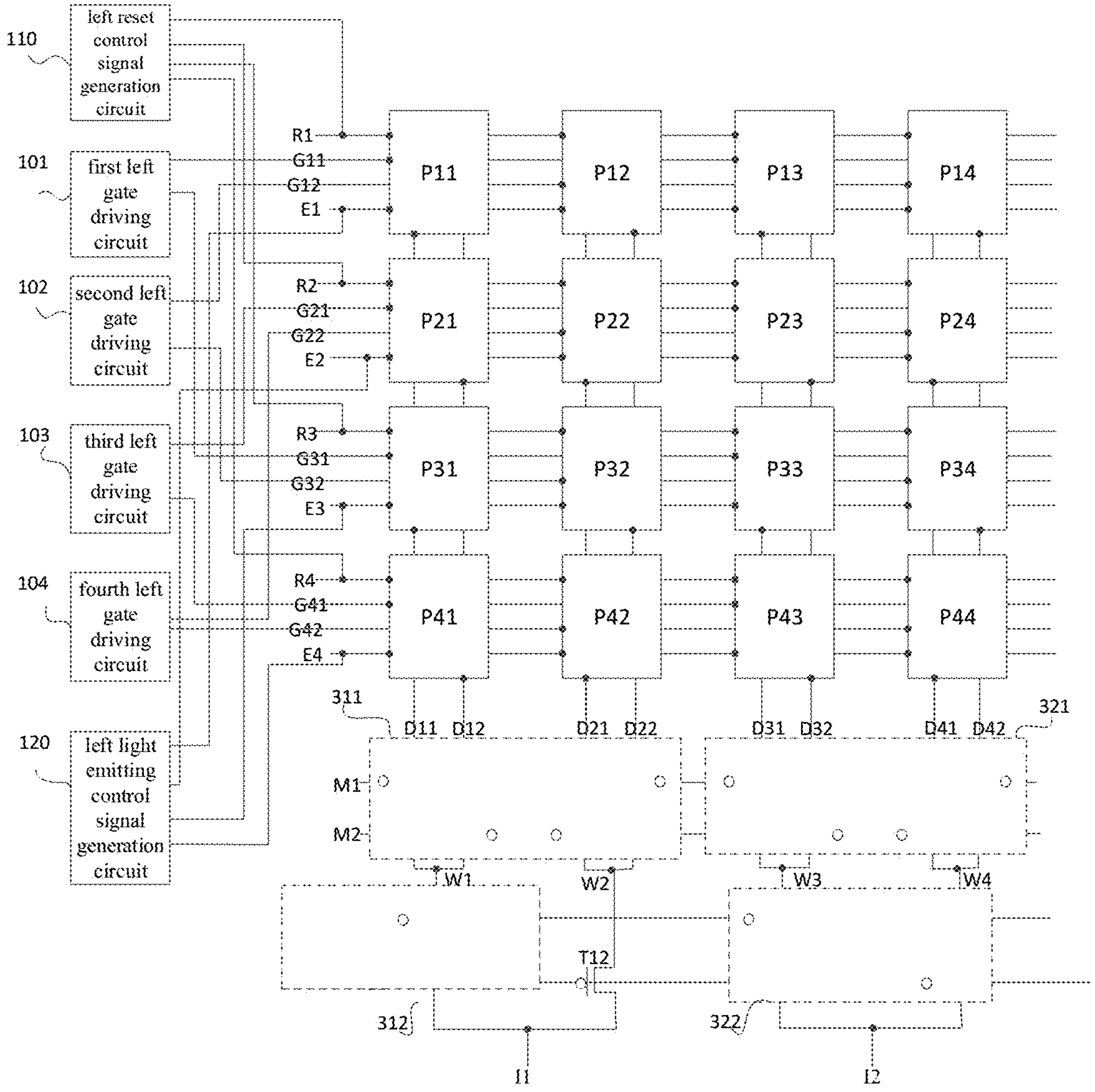
FIG. 12 is a structural diagram of a display panel according to at least one embodiment of the present disclosure.

As shown in FIG. 12, based on the display panel shown in FIG. 5, the display device according to at least one embodiment of the present disclosure further includes a first left gate driving circuit 101, a second left gate driving circuit 102, a third left gate driving circuit 103 and a fourth left gate driving circuit 104, a left reset control signal generation circuit 110, and a left light emitting control signal generation circuit 120;

The first left gate driving circuit 101 is electrically connected to G11 and G31, respectively, for providing corresponding gate driving signals for G11 and G31, respectively;

The second left gate driving circuit 102 is electrically connected to G12 and G32, respectively, for providing corresponding gate driving signals for G12 and G32, respectively;

The third left gate driving circuit 103 is electrically connected to G21 and G41, respectively, for providing corresponding gate driving signals for G21 and G41, respectively;

The fourth left gate driving circuit 104 is electrically connected to G22 and G42, respectively, for providing corresponding gate driving signals for G22 and G42, respectively;

The left reset control signal generating circuit 110 is electrically connected to the first row of reset control line R1, the second row of reset control line R2, the third row of reset control line R3, and the fourth row of reset control line R4, respectively, for providing the corresponding reset control signals for the first row of reset control line R1, the second row of reset control line R2, the third row of reset control line R3, and the fourth row of reset control line R4;

The left light-emitting control signal generating circuit 120 is electrically connected to the first row of light-emitting control lines E1, the second row of light-emitting control lines E2, the third row of light-emitting control lines E3, and the fourth row of light-emitting control lines E4, for providing the corresponding light emitting control signals for the first row of light emitting control lines E1, the second row of light emitting control lines E2, the third row of light emitting control lines E3, and the fourth row of light emitting control lines E4.

Figure 13:
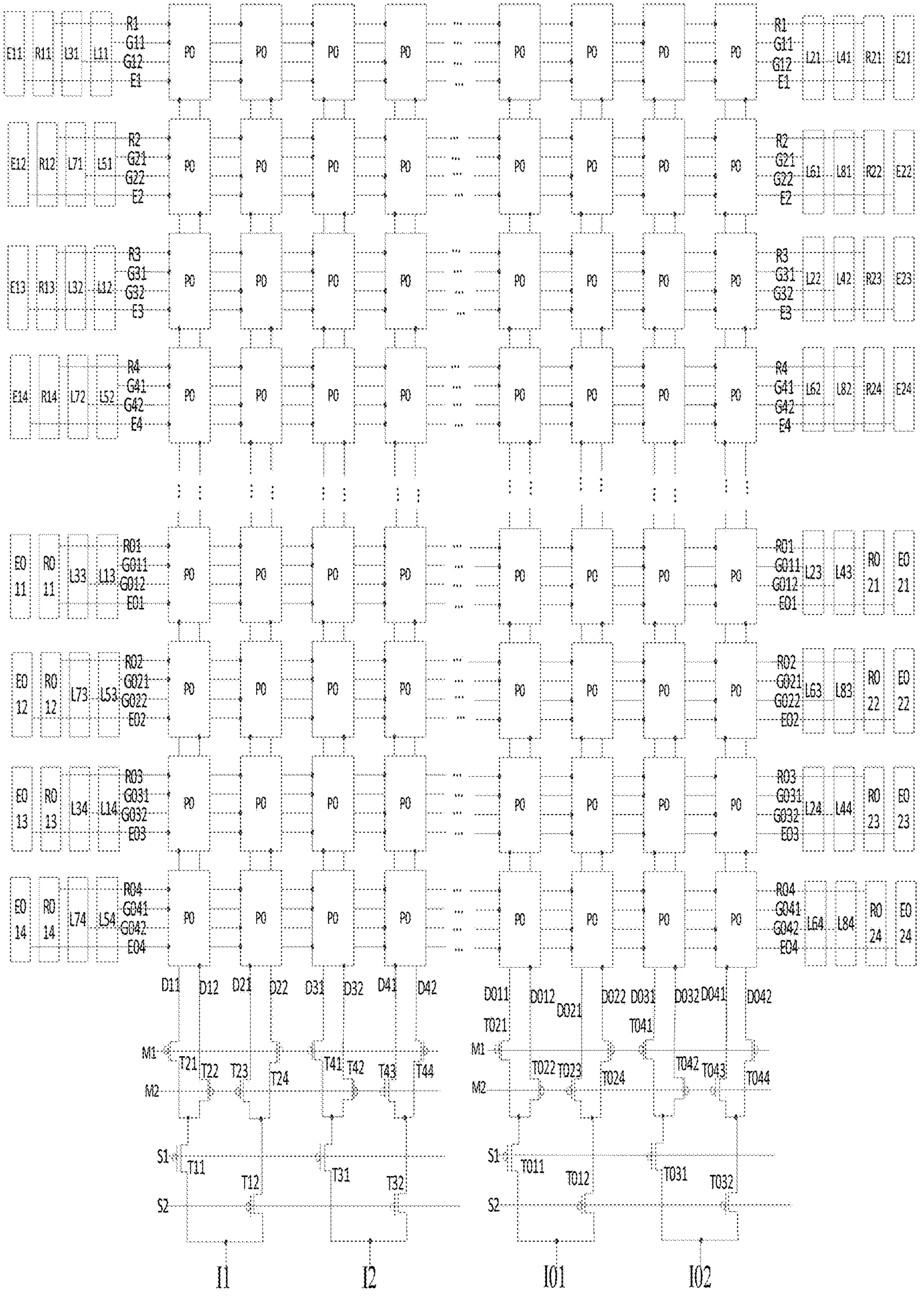
FIGS. 13 and 14 are structural diagrams of the display panel according to at least one embodiment of the present disclosure based on FIG. 12.

FIG. 13 is an overall configuration diagram based on FIG. 12. In specific implementation, as shown in FIG. 13, a gate driving circuit, a reset control signal generating circuit, and a light emitting control signal generating circuit may be provided on the left and right sides of the pixel circuit, respectively.

As shown in FIG. 13, the display panel includes multiple rows and multiple columns of pixel circuits P0;

The first row of pixel circuits are electrically connected to the first row of gate line G11 and the second row of gate line G12;

The second row of pixel circuits are electrically connected to the third row of gate line G21 and the fourth row of gate line G22;

The third row of pixel circuits are electrically connected to the fifth row of gate line G31 and the sixth row of gate line G32;

The fourth row of pixel circuits are electrically connected to the seventh row of gate line G41 and the eighth row of gate line G42;

The (N−3)th row of pixel circuits are electrically connected to the (2N−7)th row of gate line G011 and the (2N−6)th row of the gate line G012;

The (N−2)th row of pixel circuits are electrically connected to the (2N−5)th row of gate line G021 and the (2N−4)th row of the gate line G022;

The (N−1)th row of pixel circuits are electrically connected to the (2N−3)th row of gate line G031 and the (2N−2)th row of the gate line G032;

The N-th row of pixel circuits are electrically connected to the (2N−1)th row of gate line G041 and the 2N-th row of the gate line G042;

The first column of pixel circuits are electrically connected to the first column of data line D11 and the second column of data line D12;

The second column of pixel circuits are electrically connected to the third column of data line D21 and the fourth column of data line D22;

The third column of pixel circuits are electrically connected to the fifth column of data line D31 and the sixth column of data line D32;

The fourth column of pixel circuits are electrically connected to the seventh column of data line D41 and the eighth column of data line D42;

The (M−3)th column of pixel circuit is electrically connected to the (2M−7)th column of the data line D011 and the (2M−6)th column of the data line D012;

The (M−2)th column of pixel circuit is electrically connected to the (2M−5)th column of the data line D021 and the (2M−4)th column of the data line D022;

The (M−1)th column of pixel circuit is electrically connected to the (2M−3)th column of the data line D031 and the (2M−2)th column of the data line D032;

The M-th column of pixel circuit is electrically connected to the (2M−1)th column of the data line D041 and the 2M-th column of the data line D042;

The first row of pixel circuits are electrically connected to the first row of reset control line R1 and the first row of light-emitting control line E1 respectively;

The second row of pixel circuits are respectively electrically connected to the second row of reset control line R2 and the second row of light-emitting control line E2;

The third row of pixel circuits are respectively electrically connected to the third row of reset control line R3 and the third row of light-emitting control line E3;

The fourth row of pixel circuits are respectively electrically connected to the fourth row of reset control line R4 and the fourth row of light-emitting control line E4;

The (N−3)th row of pixel circuits are electrically connected to the (N−3)th row of the reset control line R01 and the (N−3)th row of the light-emitting control line E01, respectively;

The (N−2)th row of pixel circuits are electrically connected to the (N−2)th row of the reset control line R02 and the (N−2)th row of the light-emitting control line E02, respectively;

The (N−1)th row of pixel circuits are electrically connected to the (N−1)th row of the reset control line R03 and the (N−1)th row of the light-emitting control line E03, respectively;

The N-th row of pixel circuits are electrically connected to the N-th row of the reset control line R04 and the N-th row of the light-emitting control line E04, respectively;

The display device according to at least one embodiment of the present disclosure further includes a first left gate driving circuit, a second left gate driving circuit, a third left gate driving circuit, a fourth left gate driving circuit, a first right gate driving circuit, a second right gate driving circuit, a third right gate driving circuit, a fourth right gate driving circuit, a left reset control signal generation circuit, a right reset control signal generation circuit, a left light-emitting control signal generating circuit and a right light-emitting control signal generating circuit;

The first-stage of left shift register unit L11 included in the first left gate driving circuit, the second-stage of left shift register unit L12 included in the first left gate driving circuit, and the third-stage of left shift register unit L13 included in the first left gate driving circuit and the fourth-stage of left shift register unit L14 included in the first left gate driving circuit are electrically connected to G11, G31, G011, and G031, respectively, for providing corresponding gate driving signals for G11, G31, G011 and G031;

The first-stage of right shift register unit L21 included in the first right gate driving circuit, the second-stage of right shift register unit L22 included in the first right gate driving circuit, and the third-stage of right shift register unit L23 included in the first right gate driving circuit and the fourth-stage of right shift register unit L24 included in the first right gate driving circuit are electrically connected to G11, G31, G011, and G031, respectively, for providing corresponding gate driving signals for G11, G31, G011 and G031;

The first-stage of left shift register unit L31 included in the second left gate driving circuit, the second-stage of left shift register unit L32 included in the second left gate driving circuit, and the third-stage of left shift register unit L33 included in the second left gate driving circuit and the fourth-stage of left shift register unit L34 included in the second left gate driving circuit are electrically connected to G12, G32, G012, and G032, respectively, for providing corresponding gate driving signals for G12, G32, G012 and G032;

The first-stage of right shift register unit L41 included in the second right gate driving circuit, the second-stage of right shift register unit L42 included in the second right gate driving circuit, and the third-stage of right shift register unit L43 included in the second right gate driving circuit and the fourth-stage of right shift register unit L44 included in the second right gate driving circuit are electrically connected to G12, G32, G011, and G032, respectively, for providing corresponding gate driving signals for G12, G32, G011, and G032;

The first-stage of left shift register unit L51 included in the third left gate driving circuit, the second-stage of left shift register unit L52 included in the third left gate driving circuit, and the third-stage of left shift register unit L53 included in the third left gate driving circuit and the fourth-stage of left shift register unit L54 included in the third left gate driving circuit are electrically connected to G21, G41, G021, and G041, respectively, for providing corresponding gate driving signals for G21, G41, G021, and G041;

The first-stage of right shift register unit L61 included in the third right gate driving circuit, the second-stage of right shift register unit L62 included in the third right gate driving circuit, and the third-stage of right shift register unit L63 included in the third right gate driving circuit and the fourth-stage of right shift register unit L64 included in the third right gate driving circuit are electrically connected to G21, G41, G021, and G041, respectively, for providing corresponding gate driving signals for G21, G41, G021, and G041;

The first-stage of left shift register unit L71 included in the fourth left gate driving circuit, the second-stage of left shift register unit L72 included in the fourth left gate driving circuit, and the third-stage of left shift register unit L73 included in the fourth left gate driving circuit and the fourth-stage of left shift register unit L74 included in the fourth left gate driving circuit are electrically connected to G22, G42, G022, and G042, respectively, for providing corresponding gate driving signals for G22, G42, G022, and G042;

The first-stage of right shift register unit L81 included in the fourth right gate driving circuit, the second-stage of right shift register unit L82 included in the fourth right gate driving circuit, and the third-stage of right shift register unit L83 included in the fourth right gate driving circuit and the fourth-stage of right shift register unit L84 included in the fourth right gate driving circuit are electrically connected to G22, G42, G022, and G042, respectively, for providing corresponding gate driving signals for G22, G42, G022, and G042.

A first stage of left reset control signal generating unit R11 included in the left reset control signal generating circuit, a second stage of left reset control signal generating unit R12 included in the left reset control signal generating circuit, a third stage of left reset control signal generating unit R13 included in the left reset control signal generating circuit, a fourth stage of left reset control signal generating unit R14 included in the left reset control signal generating circuit, a (N−3)th stage of left reset control signal generating unit R011 included in the left reset control signal generating circuit, a (N−2)th stage of left reset control signal generating unit R012 included in the left reset control signal generating circuit, a (N−1)th stage of left reset control signal generating unit R013 included in the left reset control signal generating circuit, a N-th stage of left reset control signal generating unit R014 included in the left reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of right reset control signal generating unit R21 included in the right reset control signal generating circuit, a second stage of right reset control signal generating unit R22 included in the right reset control signal generating circuit, a third stage of right reset control signal generating unit R23 included in the right reset control signal generating circuit, a fourth stage of right reset control signal generating unit R24 included in the right reset control signal generating circuit, a (N−3)th stage of right reset control signal generating unit R021 included in the right reset control signal generating circuit, a (N−2)th stage of right reset control signal generating unit R022 included in the right reset control signal generating circuit, a (N−1)th stage of right reset control signal generating unit R023 included in the right reset control signal generating circuit, a N-th stage of right reset control signal generating unit R024 included in the right reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of left light emitting control signal generating unit E11 included in the left light emitting control signal generating circuit, a second stage of left light emitting control signal generating unit E12 included in the left light emitting control signal generating circuit, a third stage of left light emitting control signal generating unit E13 included in the left light emitting control signal generating circuit, a fourth stage of left light emitting control signal generating unit E14 included in the left light emitting control signal generating circuit, a (N−3)th stage of left light emitting control signal generating unit E011 included in the left light emitting control signal generating circuit, a (N−2)th stage of left light emitting control signal generating unit E012 included in the left light emitting control signal generating circuit, a (N−1)th stage of left light emitting control signal generating unit E013 included in the left light emitting control signal generating circuit, a N-th stage of left light emitting control signal generating unit E014 included in the left light emitting control signal generating circuit are electrically connected to the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively, and is used to provide corresponding light emitting control signals for the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively;

A first stage of right light emitting control signal generating unit E21 included in the right light emitting control signal generating circuit, a second stage of right light emitting control signal generating unit E22 included in the right light emitting control signal generating circuit, a third stage of right light emitting control signal generating unit E23 included in the right light emitting control signal generating circuit, a fourth stage of right light emitting control signal generating unit E24 included in the right light emitting control signal generating circuit, a (N−3)th stage of right light emitting control signal generating unit E021 included in the right light emitting control signal generating circuit, a (N−2)th stage of right light emitting control signal generating unit E022 included in the right light emitting control signal generating circuit, a (N−1)th stage of right light emitting control signal generating unit E023 included in the right light emitting control signal generating circuit, a N-th stage of right light emitting control signal generating unit E024 included in the right light emitting control signal generating circuit are electrically connected to the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively, and is used to provide corresponding light emitting control signals for the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively;

As shown in FIG. 13, the multiplexing control line includes a first multiplexing control line M1, a second multiplexing control line M2, a first column gate control line S1, and a second column gate control line S2.

In FIG. 13, I1 is the first data writing-in terminal, I2 is the second data writing-in terminal, I01 is the (P−1)th data writing-in terminal, and I02 is the P-th data writing-in terminal. P is an integer greater than 3.

In FIG. 13, T11 is a first first column of multiplexing transistor, T12 is a first second column of multiplexing transistor; T21 is a first first row of multiplexing transistor, T22 is a first second row of multiplexed transistor, T23 is a first third row of multiplexed transistor, and T24 is a first fourth row of multiplexed transistor; T31 is a second first column of multiplexing transistor, T32 is a second second column of multiplexing transistor; T41 is a second first row of multiplexing transistor, and T42 is a second second row of multiplexing transistor, T43 is a second third row of multiplexing transistor, and T44 is the second fourth row of multiplexing transistor;

In FIG. 13, T011 is the (P−1)th first column of multiplexed transistor, T012 is the (P−1)th second column of multiplexed transistor; T021 is the (P−1)th second column of multiplexed transistor, T022 is the (P−1)th second row of multiplexed transistors, T023 is the (P−1)th third row of multiplexed transistors, and T024 is the (P−1)th row fourth row of multiplexed transistor; T031 is the P-th first column of multiplexed transistors, T032 is the P-th second column of multiplexed transistor, T041 is the P-th first row of multiplexed transistor, T042 is the P-th second row of multiplexed transistor, T043 is the P-th third row of multiplexed transistor, and T044 is the P-th fourth row of multiplexed transistor;

The left light emitting control signal generating circuit and the right light emitting control signal generating circuit are connected to the first light emitting control clock signal and the second light emitting control clock signal;

The left reset control signal generating circuit and the right reset control signal generating circuit are connected to the first reset control clock signal and the second reset control clock signal;

The first left gate driving circuit and the first right gate driving circuit are connected to the first clock signal and the second clock signal;

The second left gate driving circuit and the second right gate driving circuit are connected to the third clock signal and the fourth clock signal;

The third left gate driving circuit and the third right gate driving circuit are connected to the fifth clock signal and the sixth clock signal;

The fourth left gate driving circuit and the fourth right gate driving circuit are connected to the seventh clock signal and the eighth clock signal.

As shown in FIG. 13, the first left gate driving circuit, the second left gate driving circuit, the third left gate driving circuit, the fourth left gate driving circuit, the left reset control signal generation circuit and the left light emitting control signal generating circuit are arranged on the left side of the display panel;

The first right gate driving circuit, the second right gate driving circuit, the third right gate driving circuit, the fourth right gate driving circuit, the right reset control signal generation circuit, and the right light emitting control signal generating circuit are arranged on the right side of the display panel.

Figure 14:
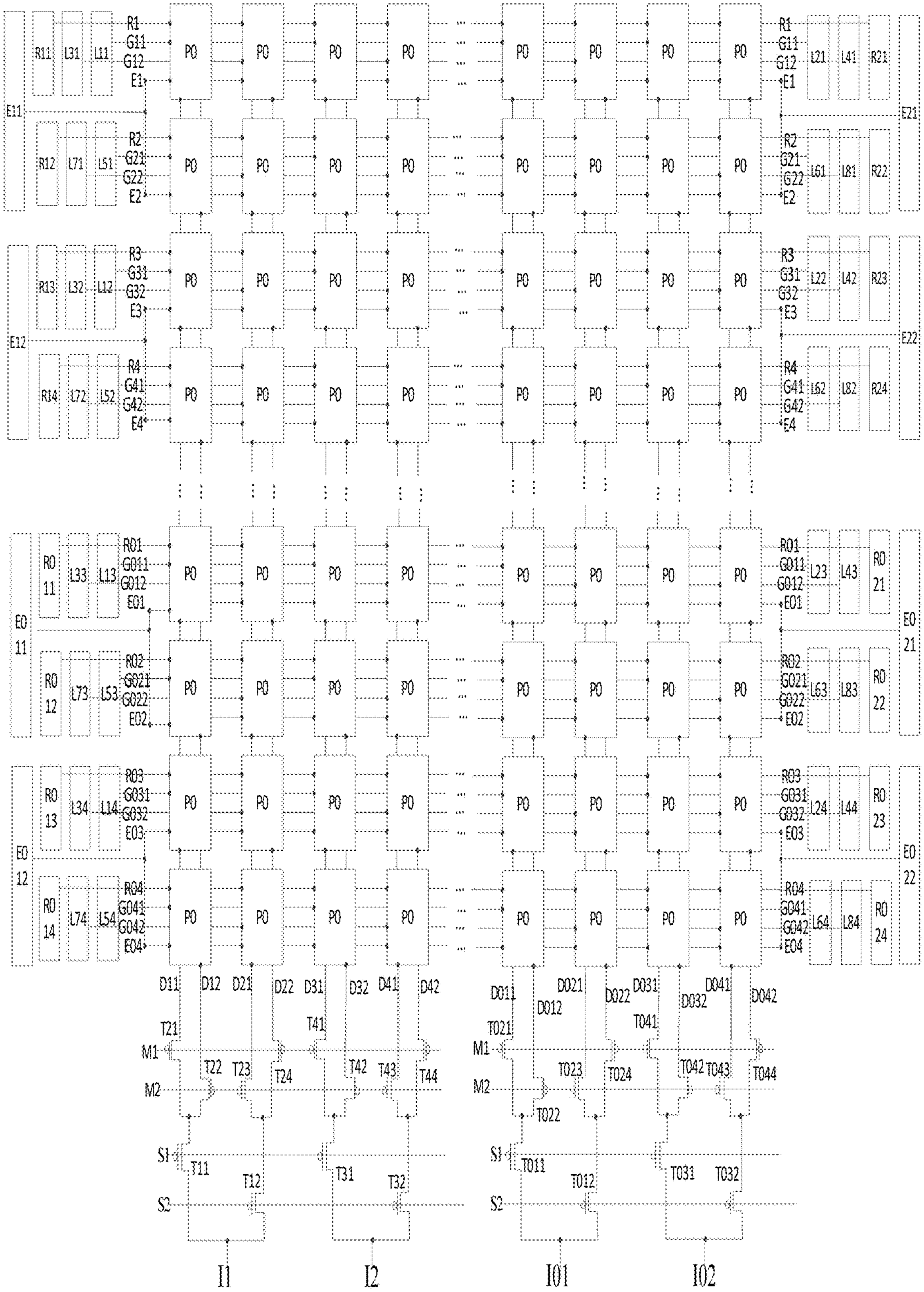

FIG. 14 is an overall configuration diagram based on FIG. 12. In a specific implementation, as shown in FIG. 14, a gate driving circuit, a reset control signal generating circuit, and a light emitting control signal generating circuit can be provided on the left and right sides of the pixel circuit, respectively.

As shown in FIG. 14, the display panel includes multiple rows and multiple columns of pixel circuits P0;

The first row of pixel circuits are electrically connected to the first row of gate line G11 and the second row of gate line G12;

The second row of pixel circuits are electrically connected to the third row of gate line G21 and the fourth row of gate line G22;

The third row of pixel circuits are electrically connected to the fifth row of gate line G31 and the sixth row of gate line G32;

The fourth row of pixel circuits are electrically connected to the seventh row of gate line G41 and the eighth row of gate line G42;

The (N−3)th row of pixel circuits are electrically connected to the (2N−7)th row of gate line G011 and the (2N−6)th row of gate line G012;

The (N−2)th row of pixel circuits are electrically connected to the (2N−5)th row of gate line G021 and the (2N−4)th row of gate line G022;

The (N−1)th row of pixel circuits are electrically connected to the (2N−3)th row of gate line G031 and the (2N−2)th row of gate line G032;

The N-th row of pixel circuits are electrically connected to the (2N−1)th row of gate line G041 and the 2N-th row of gate line G042;

The first column of pixel circuits are electrically connected to the first column of data line D11 and the second column of data line D12;

The second column of pixel circuits are electrically connected to the third column of data line D21 and the fourth column of data line D22;

The third column of pixel circuits are electrically connected to the fifth column of data line D31 and the sixth column of data line D32;

The fourth column of pixel circuits are electrically connected to the seventh column of data line D41 and the eighth column of data line D42;

The (M−3)th column of pixel circuits are electrically connected to the (2M−7)th column of data line D011 and the (2M−6)th column of data line D012;

The (M−2)th column of pixel circuits are electrically connected to the (2M−5)th column of data line D021 and the (2M−4)th column of data line D022;

The (M−1)th column of pixel circuits are electrically connected to the (2M−3)th column of data line D031 and the (2M−2)th column of data line D022;

The M-th column of pixel circuits are electrically connected to the (2M−1)th column of data line D041 and the 2M-th column of data line D042;

The first row of pixel circuits are electrically connected to the first row of reset control line R1 and the first row of light-emitting control line E1 respectively;

The second row of pixel circuits are respectively electrically connected to the second row of reset control line R2 and the second row of light-emitting control line E2;

The third row of pixel circuits are respectively electrically connected to the third row of reset control line R3 and the third row of light-emitting control line E3;

The fourth row of pixel circuits are respectively electrically connected to the fourth row of reset control line R4 and the fourth row of light-emitting control line E4;

The (N−3)th row of pixel circuits are electrically connected to the (N−3)th row of reset control line R01 and the (N−3)th row of the light-emitting control line E01, respectively;

The (N−2)th row of pixel circuits are electrically connected to the (N−2)th row of reset control line R02 and the (N−2)th row of the light-emitting control line E02, respectively;

The (N−1)th row of pixel circuits are electrically connected to the (N−1)th row of reset control line R03 and the (N−1)th row of the light-emitting control line E03, respectively;

The N-th row of pixel circuits are electrically connected to the N-th row of reset control line R04 and the N-th row of the light-emitting control line E04, respectively;

The display device according to at least one embodiment of the present disclosure further includes a first left gate driving circuit, a second left gate driving circuit, a third left gate driving circuit, a fourth left gate driving circuit, a first right gate driving circuit, a second right gate driving circuit, a third right gate driving circuit, a fourth right gate driving circuit, a left reset control signal generation circuit, a right reset control signal generation circuit, a left side light-emitting control signal generating circuit and a right side light-emitting control signal generating circuit;

The first-stage of left shift register unit L11 included in the first left gate driving circuit, the second-stage of left shift register unit L12 included in the first left gate driving circuit, and the third-stage of left shift register unit L13 included in the first left gate driving circuit and the fourth-stage of left shift register unit L14 included in the first left gate driving circuit are electrically connected to G11, G31, G011, and G031, respectively, provide corresponding gate driving signals for G11, G31, G011 and G031;

A first-stage of right shift register unit L21 included in the first right gate driving circuit, a second-stage of right shift register unit L22 included in the first right gate driving circuit, the third-stage of right shift register unit L23 included in the first right gate driving circuit and the fourth-stage of right shift register unit L24 included in the first right gate driving circuit are electrically connected to G11, G31, G011, and G031, respectively, provide corresponding gate driving signals for G11, G31, G011 and G031;

The first-stage of left shift register unit L31 included in the second left gate driving circuit, the second-stage of left shift register unit L32 included in the second left gate driving circuit, the third-stage of left shift register unit L33 included in the second left gate driving circuit, and the fourth-stage of left shift register unit L34 included in the second left gate driving circuit are electrically connected to G12, G32, G012, and G032, respectively, provide corresponding gate driving signals for G12, G32, G012 and G032;

A first-stage of right shift register unit L41 included in the second right gate driving circuit, a second-stage of right shift register unit L42 included in the second right gate driving circuit, the third-stage of right shift register unit L43 included in the second right gate driving circuit and the fourth-stage of right shift register unit L44 included in the second right gate driving circuit are electrically connected to G12, G32, G012, and G032, respectively, provide corresponding gate driving signals for G12, G32, G012 and G032;

The first-stage of left shift register unit L51 included in the third left gate driving circuit, the second-stage of left shift register unit L52 included in the third left gate driving circuit, the third-stage of left shift register unit L53 included in the third left gate driving circuit and the fourth-stage of left shift register unit L54 included in the third left gate driving circuit are electrically connected to G21, G41, G021, and G041, respectively, provide corresponding gate driving signals for G21, G41, G021 and G041;

The first-stage of right shift register unit L61 included in the third right gate driving circuit, the second-stage of right shift register unit L62 included in the third right gate driving circuit, the third-stage of right shift register unit L63 included in the third right gate driving circuit and the fourth-stage of right shift register unit L64 included in the third right gate driving circuit are electrically connected to G21, G41, G021, and G041, respectively, provide corresponding gate driving signals for G21, G41, G021 and G041;

The first-stage of left shift register unit L71 included in the fourth left gate driving circuit, the second-stage of left shift register unit L72 included in the fourth left gate driving circuit, the third-stage of left shift register unit L73 included in the fourth left gate driving circuit and the fourth-stage of left shift register unit L74 included in the fourth left gate driving circuit are electrically connected to G22, G42, G022, and G042, respectively, provide corresponding gate driving signals for G22, G42, G022 and G042;

The first-stage of right shift register unit L81 included in the fourth right gate driving circuit, the second-stage of right shift register unit L82 included in the fourth right gate driving circuit, the third-stage of right shift register unit L83 included in the fourth right gate driving circuit and the fourth-stage of right shift register unit L84 included in the fourth right gate driving circuit are electrically connected to G22, G42, G022, and G042, respectively, provide corresponding gate driving signals for G22, G42, G022 and G042;

A first stage of left reset control signal generating unit R11 included in the left reset control signal generating circuit, a second stage of left reset control signal generating unit R12 included in the left reset control signal generating circuit, a third stage of left reset control signal generating unit R13 included in the left reset control signal generating circuit, a fourth stage of left reset control signal generating unit R14 included in the left reset control signal generating circuit, a (N−3)th stage of left reset control signal generating unit R011 included in the left reset control signal generating circuit, a (N−2)th stage of left reset control signal generating unit R012 included in the left reset control signal generating circuit, a (N−1)th stage of left reset control signal generating unit R013 included in the left reset control signal generating circuit, a N-th stage of left reset control signal generating unit R014 included in the left reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of right reset control signal generating unit R21 included in the right reset control signal generating circuit, a second stage of right reset control signal generating unit R22 included in the right reset control signal generating circuit, a third stage of right reset control signal generating unit R23 included in the right reset control signal generating circuit, a fourth stage of right reset control signal generating unit R24 included in the right reset control signal generating circuit, a (N−3)th stage of right reset control signal generating unit R021 included in the right reset control signal generating circuit, a (N−2)th stage of right reset control signal generating unit R022 included in the right reset control signal generating circuit, a (N−1)th stage of right reset control signal generating unit R023 included in the right reset control signal generating circuit, a N-th stage of right reset control signal generating unit R024 included in the right reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of left light emitting control signal generating unit E11 included in the left light emitting control signal generating circuit is electrically connected to the first row of light emitting control line E1 and the second row of light emitting control line E2, a second stage of left light emitting control signal generating unit E12 included in the left light emitting control signal generating circuit is electrically connected to the third row of light emitting control line E3 and the fourth row of light emitting control line E4, a (N−1)th stage of left light emitting control signal generating unit E011 included in the left light emitting control signal generating circuit is electrically connected to the (N−3)th row of light emitting control line E01 and the (N−2)th row of light emitting control line E02; a N-th stage of left light emitting control signal generating unit E012 included in the left light emitting control signal generating circuit are electrically connected to the (N−1)th row of light emitting control line E03 and N-th row of light emitting control line E04 respectively, E11 provides a light emitting control signal for E1 and E2, E12 provides a light emitting control signal for E3 and E4, E011 provides a light emitting control signal for E01 and E02, E012 provides a light emitting control signal for E03 and E04.

A first stage of right light emitting control signal generating unit E21 included in the right light emitting control signal generating circuit is electrically connected to the first row of light emitting control line E1 and the second row of light emitting control line E2, a second stage of right light emitting control signal generating unit E22 included in the right light emitting control signal generating circuit is electrically connected to the third row of light emitting control line E3 and the fourth row of light emitting control line E4, a (N−1)th stage of right light emitting control signal generating unit E021 included in the right light emitting control signal generating circuit is electrically connected to the (N−3)th row of light emitting control line E01 and the (N−2)th row of light emitting control line E02; a N-th stage of right light emitting control signal generating unit E022 included in the right light emitting control signal generating circuit are electrically connected to the (N−1)th row of light emitting control line E03 and N-th row of light emitting control line E04 respectively, E21 provides a light emitting control signal for E1 and E2, E22 provides a light emitting control signal for E3 and E4, E021 provides a light emitting control signal for E01 and E02, E022 provides a light emitting control signal for E03 and E04.

As shown in FIG. 14, the multiplexing control line includes a first multiplexing control line M1, a second multiplexing control line M2, a first column gate control line S1, and a second column gate control line S2;

In FIG. 14, I1 is the first data writing-in terminal, I2 is the second data writing-in terminal, I01 is the (P−1)th data writing-in terminal, and I02 is the P-th data writing-in terminal. P is an integer greater than 3;

In FIG. 14, T11 is the first first column of multiplexing transistor, T12 is the first second column of multiplexing transistor; T21 is the first first row of multiplexing transistor, T22 is the first second row of multiplexed transistor, T23 is the first third row of multiplexed transistor, and T24 is the first fourth row of multiplexed transistor; T31 is the second first column of multiplexing transistor, T32 is the second second column of multiplexing transistor; T41 is the second first row of multiplexing transistor, and T42 is the second second row of multiplexing transistor. T43 is the second third row of multiplexing transistor, and T44 is the second fourth row of multiplexing transistor;

In FIG. 14, T011 is the (P−1)th first column of multiplexed transistor, and T012 is the (P−1)th second column of multiplexed transistor; the T021 is the (P−1)th first row of multiplexed transistor, T022 is the (P−1)th second row of multiplexed transistors, T023 is the (P−1)th third row of multiplexed transistors, and T024 is the (P−1)th fourth row of multiplexed transistors; T031 is the P-th first column of multiplexed transistors; T032 is the P-th second column of multiplexed transistors; T041 is the P-th first row of multiplexed transistor, T042 is the P-th second row of multiplexed transistor, T043 is the P-th third row of multiplexed transistor, and T044 is the P-th fourth row of multiplexed transistor;

The left light emitting control signal generating circuit and the right light emitting control signal generating circuit are connected to the first light emitting control clock signal and the second light emitting control clock signal;

The left reset control signal generating circuit and the right reset control signal generating circuit are connected to the first reset control clock signal and the second reset control clock signal;

The first left gate driving circuit and the first right gate driving circuit are connected to the first clock signal and the second clock signal;

The second left gate driving circuit and the second right gate driving circuit are connected to the third clock signal and the fourth clock signal;

The third left gate driving circuit and the third right gate driving circuit are connected to the fifth clock signal and the sixth clock signal;

The fourth left gate driving circuit and the fourth right gate driving circuit are connected to the seventh clock signal and the eighth clock signal.

As shown in FIG. 14, the first left gate driving circuit, the second left gate driving circuit, the third left gate driving circuit, the fourth left gate driving circuit, the left reset control signal generation circuit and the left light emitting control signal generating circuit are arranged on the left side of the display panel;

The first right gate driving circuit, the second right gate driving circuit, the third right gate driving circuit, the fourth right gate driving circuit, the right reset control signal generation circuit, and the right light emitting control signal generating circuit are arranged on the right side of the display panel.

Figure 15:
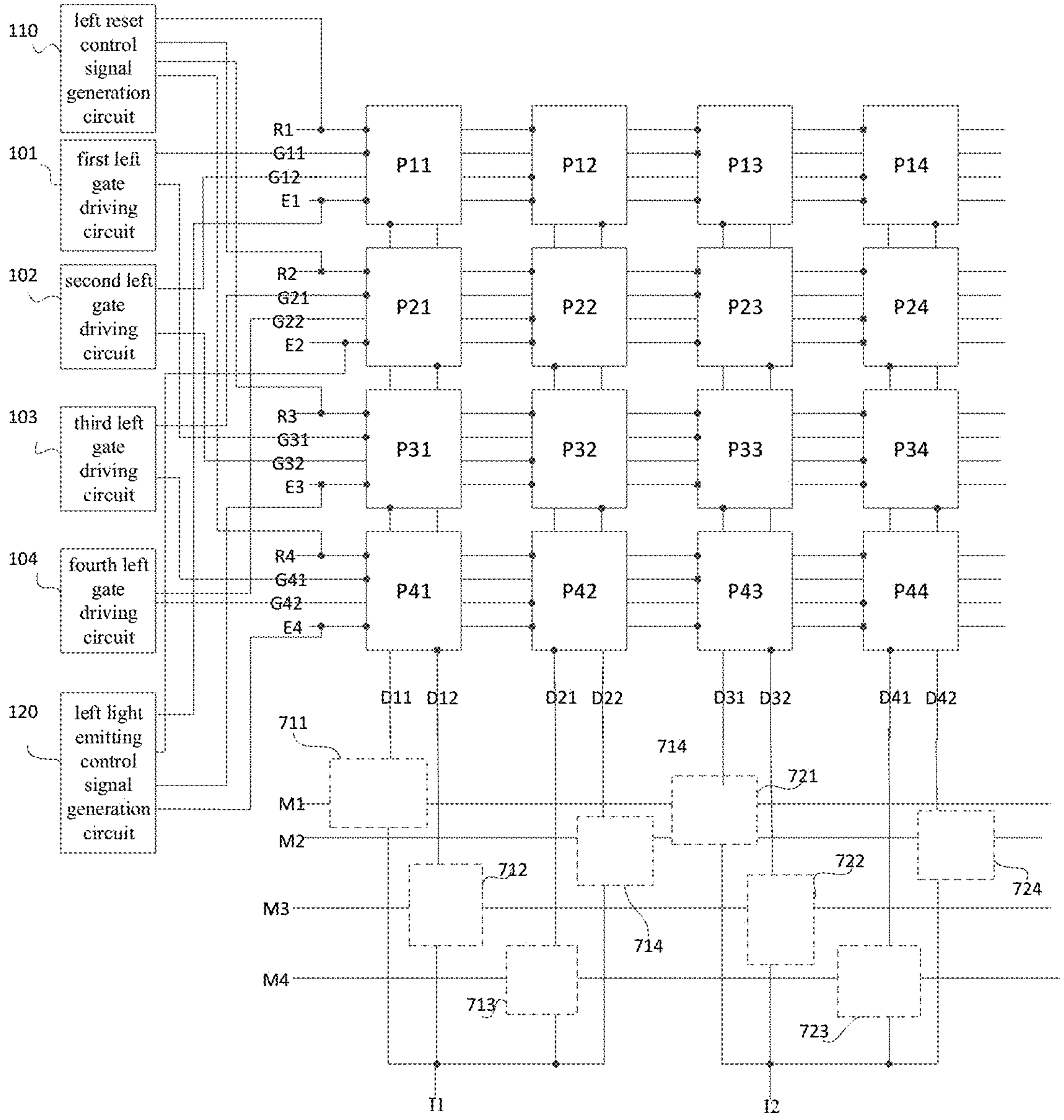
FIG. 15 is a structural diagram of a display panel according to at least one embodiment of the present disclosure.

As shown in FIG. 15, based on the display panel shown in FIG. 10, the display device according to at least one embodiment of the present disclosure further includes a first left gate driving circuit 101, a second left gate driving circuit 102, a third left gate driving circuit 103 and a fourth left gate driving circuit 104, a left reset control signal generation circuit 110, and a left light emitting control signal generation circuit 120;

The first left gate driving circuit 101 is electrically connected to G11 and G31, respectively, for providing corresponding gate driving signals for G11 and G31, respectively;

The second left gate driving circuit 102 is electrically connected to G12 and G32, respectively, for providing corresponding gate driving signals for G12 and G32, respectively;

The third left gate driving circuit 103 is electrically connected to G21 and G41, respectively, for providing corresponding gate driving signals for G21 and G41, respectively;

The fourth left gate driving circuit 104 is electrically connected to G22 and G42, respectively, for providing corresponding gate driving signals for G22 and G42, respectively;

The left reset control signal generating circuit 110 is electrically connected to the first row of reset control line R1, the second row of reset control line R2, the third row of reset control line R3, and the fourth row of reset control line R4, respectively, provide corresponding reset control signals for the first row of reset control line R1, the second row of reset control line R2, the third row of reset control line R3, and the fourth row of reset control line R4.

The left light-emitting control signal generating circuit 120 is electrically connected to the first row of light-emitting control lines E1, the second row of light-emitting control lines E2, the third row of light-emitting control lines E3, and the fourth row of light-emitting control lines E4, provide corresponding light emitting control signals for the first row of light emitting control lines E1, the second row of light emitting control lines E2, the third row of light emitting control lines E3, and the fourth row of light emitting control lines E4.

Figure 16:
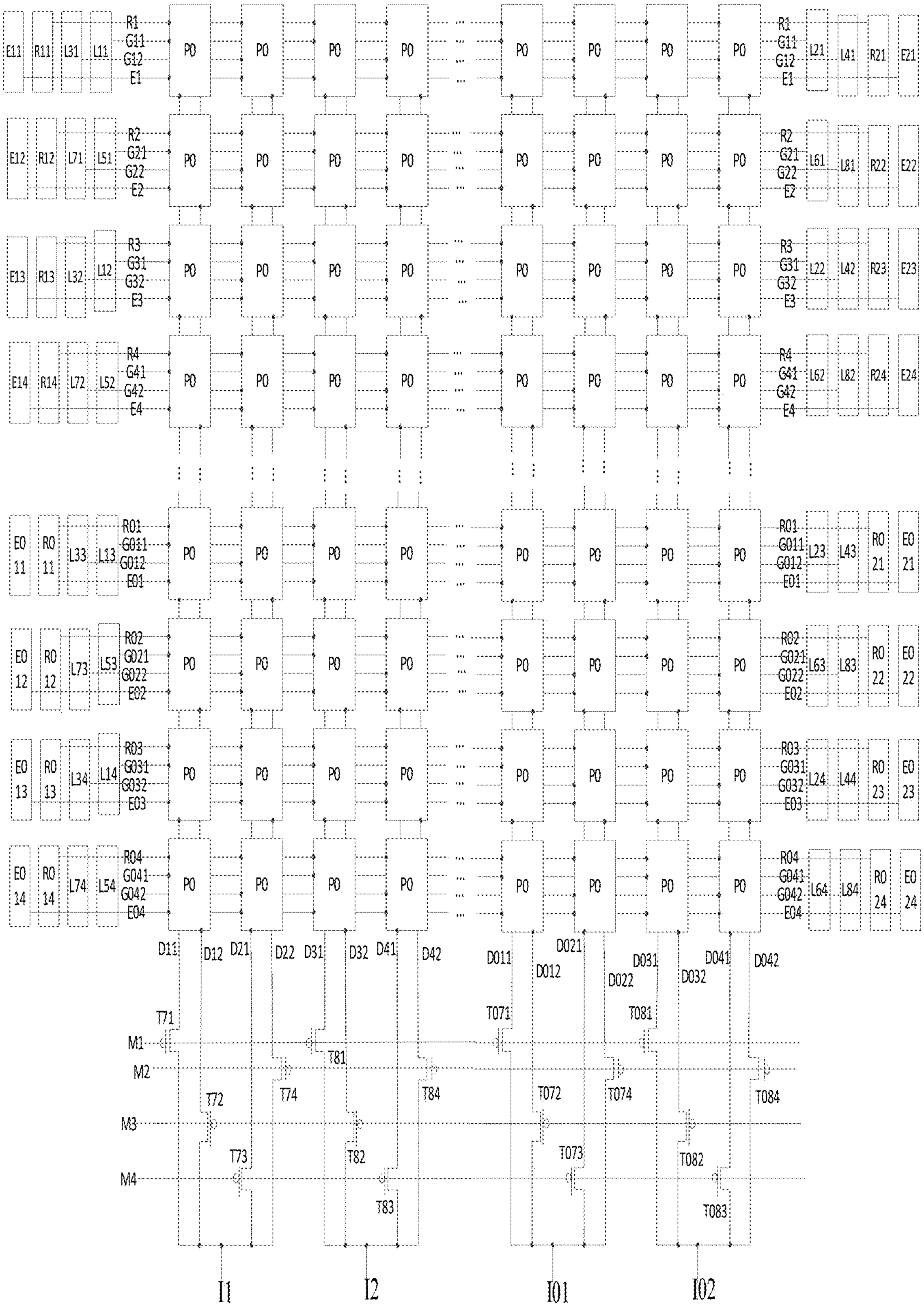
FIGS. 16 and 17 are structural diagrams of the display panel according to at least one embodiment of the present disclosure based on FIG. 15.

FIG. 16 is an overall configuration diagram based on FIG. 15. In a specific implementation, as shown in FIG. 16, a gate driving circuit, a reset control signal generating circuit, and a light emitting control signal generating circuit may be provided on the left and right sides of the pixel circuit, respectively.

As shown in FIG. 16, the display panel includes multiple rows and multiple columns of pixel circuits P0;

The first row of pixel circuits are electrically connected to the first row of gate line G11 and the second row of gate line G12;

The second row of pixel circuits are electrically connected to the third row of gate line G21 and the fourth row of gate line G22;

The third row of pixel circuits are electrically connected to the fifth row of gate line G31 and the sixth row of gate line G32;

The fourth row of pixel circuits are electrically connected to the seventh row of gate line G41 and the eighth row of gate line G42;

The (N−3)th row of pixel circuits are electrically connected to the (2N−7)th row of gate line G011 and the (2N−6)th row of gate line G012;

The (N−2)th row of pixel circuits are electrically connected to the (2N−5)th row of gate line G021 and the (2N−4)th row of gate line G022;

The (N−1)th row of pixel circuits are electrically connected to the (2N−3)th row of gate line G031 and the (2N−2)th row of gate line G032;

The N-th row of pixel circuits are electrically connected to the (2N−1)th row of gate line G041 and the 2N-th row of gate line G042;

The first column of pixel circuits are electrically connected to the first column of data line D11 and the second column of data line D12;

The second column of pixel circuits are electrically connected to the third column of data line D21 and the fourth column of data line D22;

The third column of pixel circuits are electrically connected to the fifth column of data line D31 and the sixth column of data line D32;

The fourth column of pixel circuits are electrically connected to the seventh column of data line D41 and the eighth column of data line D42;

The (M−3)th column of pixel circuits are electrically connected to the (2M−7)th column of data line D011 and the (2M−6)th column of data line D012;

The (M−2)th column of pixel circuits are electrically connected to the (2M−5)th column of data line D021 and the (2M−4)th column of data line D022;

The (M−1)th column of pixel circuits are electrically connected to the (2M−3)th column of data line D031 and the (2M−2)th column of data line D022;

The M-th column of pixel circuits are electrically connected to the (2M−1)th column of data line D041 and the 2M-th column of data line D042;

The first row of pixel circuits are electrically connected to the first row of reset control line R1 and the first row of light-emitting control line E1 respectively;

The second row of pixel circuits are respectively electrically connected to the second row of reset control line R2 and the second row of light-emitting control line E2;

The third row of pixel circuits are respectively electrically connected to the third row of reset control line R3 and the third row of light-emitting control line E3;

The fourth row of pixel circuits are respectively electrically connected to the fourth row of reset control line R4 and the fourth row of light-emitting control line E4;

The (N−3)th row of pixel circuits are electrically connected to the (N−3)th row of reset control line R01 and the (N−3)th row of the light-emitting control line E01, respectively;

The (N−2)th row of pixel circuits are electrically connected to the (N−2)th row of reset control line R02 and the (N−2)th row of the light-emitting control line E02, respectively;

The (N−1)th row of pixel circuits are electrically connected to the (N−1)th row of reset control line R03 and the (N−1)th row of the light-emitting control line E03, respectively;

The N-th row of pixel circuits are electrically connected to the N-th row of reset control line R04 and the N-th row of the light-emitting control line E04, respectively;

The display device according to at least one embodiment of the present disclosure further includes a first left gate driving circuit, a second left gate driving circuit, a third left gate driving circuit, a fourth left gate driving circuit, a first right gate driving circuit, a second right gate driving circuit, a third right gate driving circuit, a fourth right gate driving circuit, a left reset control signal generation circuit, a right reset control signal generation circuit, a left side light-emitting control signal generating circuit and a right side light-emitting control signal generating circuit;

The first-stage of left shift register unit L11 included in the first left gate driving circuit, the second-stage of left shift register unit L12 included in the first left gate driving circuit, and the third-stage of left shift register unit L13 included in the first left gate driving circuit and the fourth-stage of left shift register unit L14 included in the first left gate driving circuit are electrically connected to G11, G31, G011, and G031, respectively, provide corresponding gate driving signals for G11, G31, G011 and G031;

A first-stage of right shift register unit L21 included in the first right gate driving circuit, a second-stage of right shift register unit L22 included in the first right gate driving circuit, the third-stage of right shift register unit L23 included in the first right gate driving circuit and the fourth-stage of right shift register unit L24 included in the first right gate driving circuit are electrically connected to G11, G31, G011, and G031, respectively, provide corresponding gate driving signals for G11, G31, G011 and G031;

The first-stage of left shift register unit L31 included in the second left gate driving circuit, the second-stage of left shift register unit L32 included in the second left gate driving circuit, the third-stage of left shift register unit L33 included in the second left gate driving circuit, and the fourth-stage of left shift register unit L34 included in the second left gate driving circuit are electrically connected to G12, G32, G012, and G032, respectively, provide corresponding gate driving signals for G12, G32, G012 and G032;

A first-stage of right shift register unit L41 included in the second right gate driving circuit, a second-stage of right shift register unit L42 included in the second right gate driving circuit, the third-stage of right shift register unit L43 included in the second right gate driving circuit and the fourth-stage of right shift register unit L44 included in the second right gate driving circuit are electrically connected to G12, G32, G012, and G032, respectively, provide corresponding gate driving signals for G12, G32, G012 and G032;

The first-stage of left shift register unit L51 included in the third left gate driving circuit, the second-stage of left shift register unit L52 included in the third left gate driving circuit, the third-stage of left shift register unit L53 included in the third left gate driving circuit and the fourth-stage of left shift register unit L54 included in the third left gate driving circuit are electrically connected to G21, G41, G021, and G041, respectively, provide corresponding gate driving signals for G21, G41, G021 and G041;

The first-stage of right shift register unit L61 included in the third right gate driving circuit, the second-stage of right shift register unit L62 included in the third right gate driving circuit, the third-stage of right shift register unit L63 included in the third right gate driving circuit and the fourth-stage of right shift register unit L64 included in the third right gate driving circuit are electrically connected to G21, G41, G021, and G041, respectively, provide corresponding gate driving signals for G21, G41, G021 and G041;

The first-stage of left shift register unit L71 included in the fourth left gate driving circuit, the second-stage of left shift register unit L72 included in the fourth left gate driving circuit, the third-stage of left shift register unit L73 included in the fourth left gate driving circuit and the fourth-stage of left shift register unit L74 included in the fourth left gate driving circuit are electrically connected to G22, G42, G022, and G042, respectively, provide corresponding gate driving signals for G22, G42, G022 and G042;

The first-stage of right shift register unit L81 included in the fourth right gate driving circuit, the second-stage of right shift register unit L82 included in the fourth right gate driving circuit, the third-stage of right shift register unit L83 included in the fourth right gate driving circuit and the fourth-stage of right shift register unit L84 included in the fourth right gate driving circuit are electrically connected to G22, G42, G022, and G042, respectively, provide corresponding gate driving signals for G22, G42, G022 and G042;

A first stage of left reset control signal generating unit R11 included in the left reset control signal generating circuit, a second stage of left reset control signal generating unit R12 included in the left reset control signal generating circuit, a third stage of left reset control signal generating unit R13 included in the left reset control signal generating circuit, a fourth stage of left reset control signal generating unit R14 included in the left reset control signal generating circuit, a (N−3)th stage of left reset control signal generating unit R011 included in the left reset control signal generating circuit, a (N−2)th stage of left reset control signal generating unit R012 included in the left reset control signal generating circuit, a (N−1)th stage of left reset control signal generating unit R013 included in the left reset control signal generating circuit, a N-th stage of left reset control signal generating unit R014 included in the left reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of right reset control signal generating unit R21 included in the right reset control signal generating circuit, a second stage of right reset control signal generating unit R22 included in the right reset control signal generating circuit, a third stage of right reset control signal generating unit R23 included in the right reset control signal generating circuit, a fourth stage of right reset control signal generating unit R24 included in the right reset control signal generating circuit, a (N−3)th stage of right reset control signal generating unit R021 included in the right reset control signal generating circuit, a (N−2)th stage of right reset control signal generating unit R022 included in the right reset control signal generating circuit, a (N−1)th stage of right reset control signal generating unit R023 included in the right reset control signal generating circuit, a N-th stage of right reset control signal generating unit R024 included in the right reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of left light emitting control signal generating unit E11 included in the left light emitting control signal generating circuit, a second stage of left light emitting control signal generating unit E12 included in the left light emitting control signal generating circuit, a third stage of left light emitting control signal generating unit E13 included in the left light emitting control signal generating circuit, a fourth stage of left light emitting control signal generating unit E14 included in the left light emitting control signal generating circuit, a (N−3)th stage of left light emitting control signal generating unit E011 included in the left light emitting control signal generating circuit, a (N−2)th stage of left light emitting control signal generating unit E012 included in the left light emitting control signal generating circuit, a (N−1)th stage of left light emitting control signal generating unit E013 included in the left light emitting control signal generating circuit, a N-th stage of left light emitting control signal generating unit E014 included in the left light emitting control signal generating circuit are electrically connected to the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively, and is used to provide corresponding light emitting control signals for the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively;

A first stage of right light emitting control signal generating unit E21 included in the right light emitting control signal generating circuit, a second stage of right light emitting control signal generating unit E22 included in the right light emitting control signal generating circuit, a third stage of right light emitting control signal generating unit E23 included in the right light emitting control signal generating circuit, a fourth stage of right light emitting control signal generating unit E24 included in the right light emitting control signal generating circuit, a (N−3)th stage of right light emitting control signal generating unit E021 included in the right light emitting control signal generating circuit, a (N−2)th stage of right light emitting control signal generating unit E022 included in the right light emitting control signal generating circuit, a (N−1)th stage of right light emitting control signal generating unit E023 included in the right light emitting control signal generating circuit, a N-th stage of right light emitting control signal generating unit E024 included in the right light emitting control signal generating circuit are electrically connected to the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively, and is used to provide corresponding light emitting control signals for the first row of light emitting control line E1, the second row of light emitting control line E2, the third row of light emitting control line E3, the fourth row of light emitting control line E4, the (N−3)th row of light emitting control line E01, the (N−2)th row of light emitting control line E02, the (N−1)th row of light emitting control line E03 and N-th row of light emitting control line E04 respectively;

As shown in FIG. 16, the multiplexing control line includes a first multiplexing control line M1, a second multiplexing control line M2, a third reset control line M3, and a fourth reset control line M4;

In FIG. 16, I1 is the first data writing-in terminal, I2 is the second data writing-in terminal, I01 is the (P−1)th data writing-in terminal, and I02 is the P-th data writing-in terminal. P is an integer greater than 3;

In FIG. 16, T71 is the first first multiplexing transistor, T72 is the first second multiplexing transistor, and T73 is the first third multiplexing transistor, and T74 is the first fourth multiplexing transistor; T81 is the second first multiplexing transistor, T82 is the second second multiplexing transistor, T83 is the second third multiplexing transistor, T84 is the second fourth multiplexed transistor;

In FIG. 16, T071 is the (P−1)th first multiplexing transistor, T072 is the (P−1)th second multiplexing transistor, and T073 is the (P−1)th third multiplexing transistor, T074 is the (P−1)th fourth multiplexing transistor; T081 is the P-th first multiplexing transistor, and T082 is the P-th second multiplexing transistor, T083 is the P-th third multiplexing transistor, and T084 is the P-th fourth multiplexing transistor;

In addition, the left light-emitting control signal generation circuit and the right light-emitting control signal generation circuit are connected to the first light-emitting control clock signal and the second light-emitting control clock signal;

The left reset control signal generating circuit and the right reset control signal generating circuit are connected to the first reset control clock signal and the second reset control clock signal;

The first left gate driving circuit and the first right gate driving circuit are connected to the first clock signal and the second clock signal;

The second left gate driving circuit and the second right gate driving circuit are connected to the third clock signal and the fourth clock signal;

The third left gate driving circuit and the third right gate driving circuit are connected to the fifth clock signal and the sixth clock signal;

The fourth left gate driving circuit and the fourth right gate driving circuit are connected to the seventh clock signal and the eighth clock signal.

As shown in FIG. 16, the first left gate driving circuit, the second left gate driving circuit, the third left gate driving circuit, the fourth left gate driving circuit, the left reset control signal generation circuit and the left light emitting control signal generating circuit are arranged on the left side of the display panel;

The first right gate driving circuit, the second right gate driving circuit, the third right gate driving circuit, the fourth right gate driving circuit, the right reset control signal generation circuit, and the right light emitting control signal generation circuit are arranged on the right side of the display panel.

Figure 17:
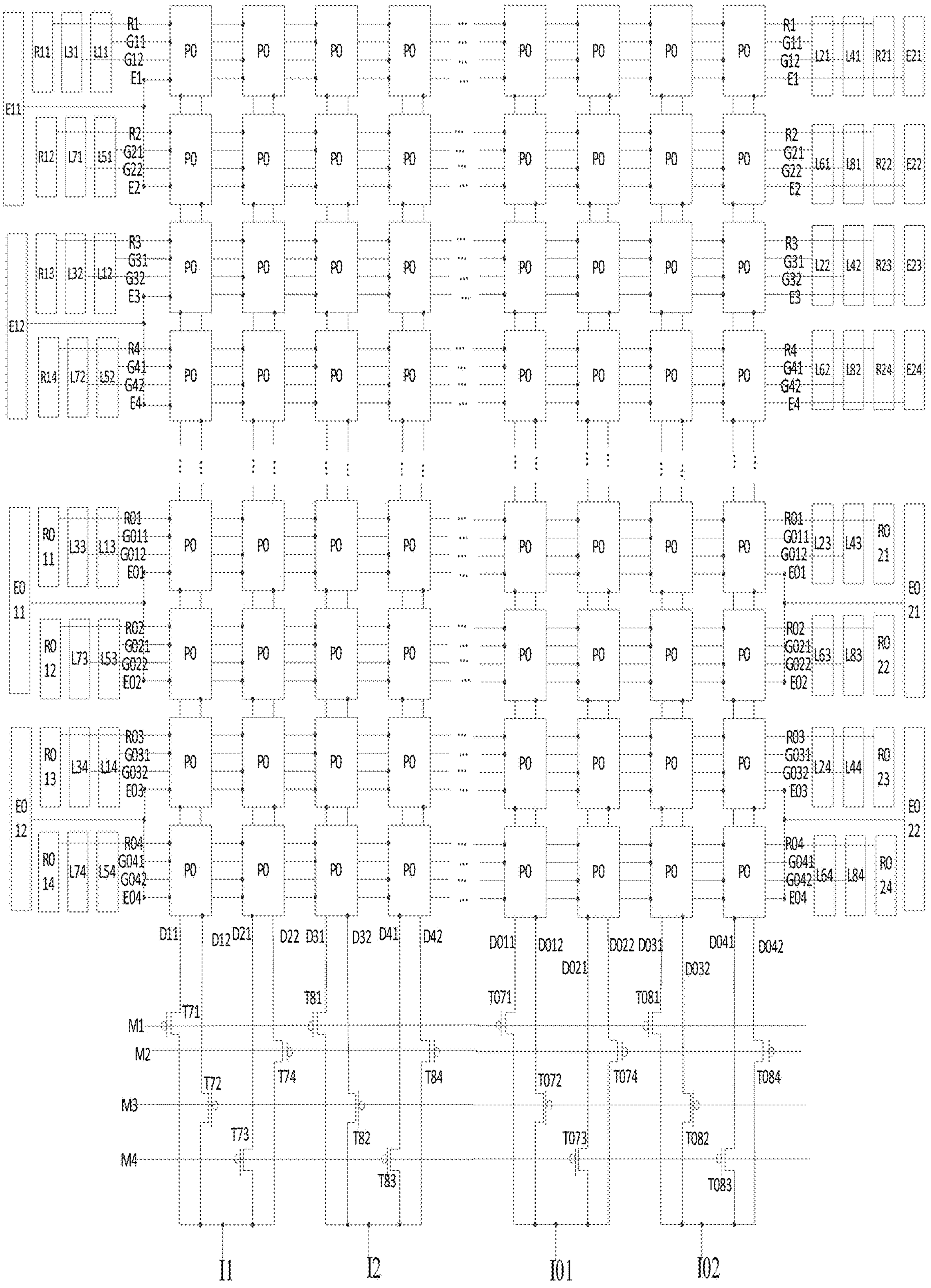

FIG. 17 is an overall configuration diagram based on FIG. 15. In a specific implementation, as shown in FIG. 17, a gate driving circuit, a reset control signal generating circuit, and a light emitting control signal generating circuit may be provided on the left and right sides of the pixel circuit, respectively.

As shown in FIG. 17, the display panel includes multiple rows and multiple columns of pixel circuits P0;

The first row of pixel circuits are electrically connected to the first row of gate line G11 and the second row of gate line G12;

The second row of pixel circuits are electrically connected to the third row of gate line G21 and the fourth row of gate line G22;

The third row of pixel circuits are electrically connected to the fifth row of gate line G31 and the sixth row of gate line G32;

The fourth row of pixel circuits are electrically connected to the seventh row of gate line G41 and the eighth row of gate line G42;

The (N−3)th row of pixel circuits are electrically connected to the (2N−7)th row of gate line G011 and the (2N−6)th row of gate line G012;

The (N−2)th row of pixel circuits are electrically connected to the (2N−5)th row of gate line G021 and the (2N−4)th row of gate line G022;

The (N−1)th row of pixel circuits are electrically connected to the (2N−3)th row of gate line G031 and the (2N−2)th row of gate line G032;

The N-th row of pixel circuits are electrically connected to the (2N−1)th row of gate line G041 and the 2N-th row of gate line G042;

The first column of pixel circuits are electrically connected to the first column of data line D11 and the second column of data line D12;

The second column of pixel circuits are electrically connected to the third column of data line D21 and the fourth column of data line D22;

The third column of pixel circuits are electrically connected to the fifth column of data line D31 and the sixth column of data line D32;

The fourth column of pixel circuits are electrically connected to the seventh column of data line D41 and the eighth column of data line D42;

The (M−3)th column of pixel circuits are electrically connected to the (2M−7)th column of data line D011 and the (2M−6)th column of data line D012;

The (M−2)th column of pixel circuits are electrically connected to the (2M−5)th column of data line D021 and the (2M−4)th column of data line D022;

The (M−1)th column of pixel circuits are electrically connected to the (2M−3)th column of data line D031 and the (2M−2)th column of data line D022;

The M-th column of pixel circuits are electrically connected to the (2M−1)th column of data line D041 and the 2M-th column of data line D042;

The first row of pixel circuits are electrically connected to the first row of reset control line R1 and the first row of light-emitting control line E1 respectively;

The second row of pixel circuits are respectively electrically connected to the second row of reset control line R2 and the second row of light-emitting control line E2;

The third row of pixel circuits are respectively electrically connected to the third row of reset control line R3 and the third row of light-emitting control line E3;

The fourth row of pixel circuits are respectively electrically connected to the fourth row of reset control line R4 and the fourth row of light-emitting control line E4;

The (N−3)th row of pixel circuits are electrically connected to the (N−3)th row of reset control line R01 and the (N−3)th row of the light-emitting control line E01, respectively;

The (N−2)th row of pixel circuits are electrically connected to the (N−2)th row of reset control line R02 and the (N−2)th row of the light-emitting control line E02, respectively;

The (N−1)th row of pixel circuits are electrically connected to the (N−1)th row of reset control line R03 and the (N−1)th row of the light-emitting control line E03, respectively;

The N-th row of pixel circuits are electrically connected to the N-th row of reset control line R04 and the N-th row of the light-emitting control line E04, respectively;

The display device according to at least one embodiment of the present disclosure further includes a first left gate driving circuit, a second left gate driving circuit, a third left gate driving circuit, a fourth left gate driving circuit, a first right gate driving circuit, a second right gate driving circuit, a third right gate driving circuit, a fourth right gate driving circuit, a left reset control signal generation circuit, a right reset control signal generation circuit, a left side light-emitting control signal generating circuit and a right side light-emitting control signal generating circuit;

The first-stage of left shift register unit L11 included in the first left gate driving circuit, the second-stage of left shift register unit L12 included in the first left gate driving circuit, and the third-stage of left shift register unit L13 included in the first left gate driving circuit and the fourth-stage of left shift register unit L14 included in the first left gate driving circuit are electrically connected to G11, G31, G011, and G031, respectively, provide corresponding gate driving signals for G11, G31, G011 and G031;

A first-stage of right shift register unit L21 included in the first right gate driving circuit, a second-stage of right shift register unit L22 included in the first right gate driving circuit, the third-stage of right shift register unit L23 included in the first right gate driving circuit and the fourth-stage of right shift register unit L24 included in the first right gate driving circuit are electrically connected to G11, G31, G011, and G031, respectively, provide corresponding gate driving signals for G11, G31, G011 and G031;

The first-stage of left shift register unit L31 included in the second left gate driving circuit, the second-stage of left shift register unit L32 included in the second left gate driving circuit, the third-stage of left shift register unit L33 included in the second left gate driving circuit, and the fourth-stage of left shift register unit L34 included in the second left gate driving circuit are electrically connected to G12, G32, G012, and G032, respectively, provide corresponding gate driving signals for G12, G32, G012 and G032;

A first-stage of right shift register unit L41 included in the second right gate driving circuit, a second-stage of right shift register unit L42 included in the second right gate driving circuit, the third-stage of right shift register unit L43 included in the second right gate driving circuit and the fourth-stage of right shift register unit L44 included in the second right gate driving circuit are electrically connected to G12, G32, G012, and G032, respectively, provide corresponding gate driving signals for G12, G32, G012 and G032;

The first-stage of left shift register unit L51 included in the third left gate driving circuit, the second-stage of left shift register unit L52 included in the third left gate driving circuit, the third-stage of left shift register unit L53 included in the third left gate driving circuit and the fourth-stage of left shift register unit L54 included in the third left gate driving circuit are electrically connected to G21, G41, G021, and G041, respectively, provide corresponding gate driving signals for G21, G41, G021 and G041;

The first-stage of right shift register unit L61 included in the third right gate driving circuit, the second-stage of right shift register unit L62 included in the third right gate driving circuit, the third-stage of right shift register unit L63 included in the third right gate driving circuit and the fourth-stage of right shift register unit L64 included in the third right gate driving circuit are electrically connected to G21, G41, G021, and G041, respectively, provide corresponding gate driving signals for G21, G41, G021 and G041;

The first-stage of left shift register unit L71 included in the fourth left gate driving circuit, the second-stage of left shift register unit L72 included in the fourth left gate driving circuit, the third-stage of left shift register unit L73 included in the fourth left gate driving circuit and the fourth-stage of left shift register unit L74 included in the fourth left gate driving circuit are electrically connected to G22, G42, G022, and G042, respectively, provide corresponding gate driving signals for G22, G42, G022 and G042;

The first-stage of right shift register unit L81 included in the fourth right gate driving circuit, the second-stage of right shift register unit L82 included in the fourth right gate driving circuit, the third-stage of right shift register unit L83 included in the fourth right gate driving circuit and the fourth-stage of right shift register unit L84 included in the fourth right gate driving circuit are electrically connected to G22, G42, G022, and G042, respectively, provide corresponding gate driving signals for G22, G42, G022 and G042;

A first stage of left reset control signal generating unit R11 included in the left reset control signal generating circuit, a second stage of left reset control signal generating unit R12 included in the left reset control signal generating circuit, a third stage of left reset control signal generating unit R13 included in the left reset control signal generating circuit, a fourth stage of left reset control signal generating unit R14 included in the left reset control signal generating circuit, a (N−3)th stage of left reset control signal generating unit R011 included in the left reset control signal generating circuit, a (N−2)th stage of left reset control signal generating unit R012 included in the left reset control signal generating circuit, a (N−1)th stage of left reset control signal generating unit R013 included in the left reset control signal generating circuit, a N-th stage of left reset control signal generating unit R014 included in the left reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of right reset control signal generating unit R21 included in the right reset control signal generating circuit, a second stage of right reset control signal generating unit R22 included in the right reset control signal generating circuit, a third stage of right reset control signal generating unit R23 included in the right reset control signal generating circuit, a fourth stage of right reset control signal generating unit R24 included in the right reset control signal generating circuit, a (N−3)th stage of right reset control signal generating unit R021 included in the right reset control signal generating circuit, a (N−2)th stage of right reset control signal generating unit R022 included in the right reset control signal generating circuit, a (N−1)th stage of right reset control signal generating unit R023 included in the right reset control signal generating circuit, a N-th stage of right reset control signal generating unit R024 included in the right reset control signal generating circuit are electrically connected to the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively, and is used to provide corresponding reset control signals for the first row of reset control line R1, the second row of reset control line R2, the third row of reset control line R3, the fourth row of reset control line R4, the (N−3)th row of reset control line R01, the (N−2)th row of reset control line R02, the (N−1)th row of reset control line R03 and N-th row of reset control line R04 respectively;

A first stage of left light emitting control signal generating unit E11 included in the left light emitting control signal generating circuit is electrically connected to the first row of light emitting control line E1 and the second row of light emitting control line E2, a second stage of left light emitting control signal generating unit E12 included in the left light emitting control signal generating circuit is electrically connected to the third row of light emitting control line E3 and the fourth row of light emitting control line E4, a (N−1)th stage of left light emitting control signal generating unit E011 included in the left light emitting control signal generating circuit is electrically connected to the (N−3)th row of light emitting control line E01 and the (N−2)th row of light emitting control line E02; a N-th stage of left light emitting control signal generating unit E012 included in the left light emitting control signal generating circuit are electrically connected to the (N−1)th row of light emitting control line E03 and N-th row of light emitting control line E04 respectively, E11 provides a light emitting control signal for E1 and E2, E12 provides a light emitting control signal for E3 and E4, E011 provides a light emitting control signal for E01 and E02, E012 provides a light emitting control signal for E03 and E04.

A first stage of right light emitting control signal generating unit E21 included in the right light emitting control signal generating circuit is electrically connected to the first row of light emitting control line E1 and the second row of light emitting control line E2, a second stage of right light emitting control signal generating unit E22 included in the right light emitting control signal generating circuit is electrically connected to the third row of light emitting control line E3 and the fourth row of light emitting control line E4, a (N−1)th stage of right light emitting control signal generating unit E021 included in the right light emitting control signal generating circuit is electrically connected to the (N−3)th row of light emitting control line E01 and the (N−2)th row of light emitting control line E02; a N-th stage of right light emitting control signal generating unit E022 included in the right light emitting control signal generating circuit are electrically connected to the (N−1)th row of light emitting control line E03 and N-th row of light emitting control line E04 respectively, E21 provides a light emitting control signal for E1 and E2, E22 provides a light emitting control signal for E3 and E4, E021 provides a light emitting control signal for E01 and E02, E022 provides a light emitting control signal for E03 and E04.

As shown in FIG. 17, the multiplexing control line includes a first multiplexing control line M1, a second multiplexing control line M2, a first column gate control line S1, and a second column gate control line S2;

In FIG. 17, I1 is the first data writing-in terminal, I2 is the second data writing-in terminal, I01 is the (P−1)th data writing-in terminal, and I02 is the P-th data writing-in terminal. P is an integer greater than 3;

In FIG. 17, T71 is the first first multiplexing transistor, T72 is the first second multiplexing transistor, and T73 is the first third multiplexing transistor, and T74 is the first fourth multiplexing transistor; T81 is the second first multiplexing transistor, T82 is the second second multiplexing transistor, T83 is the second third multiplexing transistor, T84 is the second fourth multiplexed transistor;

In FIG. 17, T071 is the (P−1)th first multiplexing transistor, T072 is the (P−1)th second multiplexing transistor, and T073 is the (P−1)th third multiplexing transistor, T074 is the (P−1)th fourth multiplexing transistor; T081 is the P-th first multiplexing transistor, and T082 is the P-th second multiplexing transistor, T083 is the P-th third multiplexing transistor, and T084 is the P-th fourth multiplexing transistor;

In addition, the left light-emitting control signal generation circuit and the right light-emitting control signal generation circuit are connected to the first light-emitting control clock signal and the second light-emitting control clock signal;

The left reset control signal generating circuit and the right reset control signal generating circuit are connected to the first reset control clock signal and the second reset control clock signal;

The first left gate driving circuit and the first right gate driving circuit are connected to the first clock signal and the second clock signal;

The second left gate driving circuit and the second right gate driving circuit are connected to the third clock signal and the fourth clock signal;

The third left gate driving circuit and the third right gate driving circuit are connected to the fifth clock signal and the sixth clock signal;

The fourth left gate driving circuit and the fourth right gate driving circuit are connected to the seventh clock signal and the eighth clock signal.

As shown in FIG. 17, the first left gate driving circuit, the second left gate driving circuit, the third left gate driving circuit, the fourth left gate driving circuit, the left reset control signal generation circuit and the left light emitting control signal generating circuit are arranged on the left side of the display panel;

The first right gate driving circuit, the second right gate driving circuit, the third right gate driving circuit, the fourth right gate driving circuit, the right reset control signal generation circuit, and the right light emitting control signal generation circuit are arranged on the right side of the display panel.

The driving method of the display panel according to at least one embodiment of the present disclosure is applied to the above-mentioned display panel, and the driving method of the display panel includes: providing, by a same row of reset control line, a reset control signal for the same row of pixel circuits; providing, by one row of gate line in the two rows of gate lines corresponding to the same row of pixel circuits, corresponding gate driving signals for the odd-numbered column of pixel circuits in the same row of pixel circuits, and providing, by the other row of gate line in the two rows of gate lines corresponding to the same row of pixel circuits, corresponding gate driving signals for the even-numbered column of pixel circuits in the same row of pixel circuits; and providing, by one column of data line in the two columns of data lines corresponding to the same column of pixel circuits, corresponding data voltages for the odd-numbered row of pixel circuits in the same column of pixel circuits, and providing, by the other column of data line in the two columns of data lines corresponding to the same column of pixel circuits, corresponding data voltages for the even-numbered row of pixel circuits in the same column of pixel circuits.

The gate driving signal on the row of gate line is delayed by H/2 from the gate driving signal on the adjacent previous row of gate line, and H is the row period.

In the driving method of the display panel according to at least one embodiment of the present disclosure, two rows of gate lines respectively provide gate driving signals for the same row of odd-numbered column of pixel circuits and the same row of even-numbered column of pixel circuits, two columns of data lines respectively provide gate driving signals for the same column of odd-numbered row of pixel circuits and the same column of even-numbered row of pixel circuits. The compensation time is twice the row period, which can have enough time to compensate the threshold voltage of the driving transistor in the pixel circuit to ensure the display effect and achieve a higher data refresh rate.

In at least one embodiment of the present disclosure, since a multiplexing circuit is used to provide data voltages for data lines in time-division manner, one row of pixel circuits corresponds to two rows of gate lines, and one column of pixel circuits corresponds to two columns of data lines. In order to provide corresponding data voltages for the odd-numbered row and odd-numbered column of pixel circuits, odd-numbered row and even-numbered column of pixel circuits, even-numbered row and odd-numbered column of pixel circuits, even-numbered row and even-numbered column of pixel circuits, and the gate driving signals on adjacent row of gate lines need to be set to be spaced H/2 from each other.

Optionally, the display panel further includes multiple rows of light-emitting control lines; the driving method of the display panel further includes: providing, by the same row of the light-emitting control lines, light-emitting control signals for the same row of pixel circuits.

Optionally, the n-th row display stage includes the n-th reset period, the n-th data writing-in period, and the n-th light-emitting control period that are sequentially set; n is a positive integer;

In the n-th reset period, the n-th row of reset control signal line provides a valid n-th row of reset control signal;

In the (2n−1)th row of writing-in period included in the n-th data writing-in period, the (2n−1)th row of gate line provides a valid gate driving signal;

In the 2n-th row of writing time period included in the n-th data writing-in time period, the 2n-th row of gate line provides a valid gate driving signal;

In the n-th light-emitting control period, the n-th row of light-emitting control signal lines provide a valid gate driving signal;

The 2n-th row of writing-in period is delayed by H/2 from the (2n−1)th row of the writing-in period.

In specific implementation, the display panel further includes a plurality of multiplexing circuits; the driving method of the display panel according to at least one embodiment of the present disclosure further includes: under the control of the multiplexing control signal provided by the multiplexing control line, the multiplexing circuit controlling the data voltage provided by the data input terminal to be input to the four columns of data lines in a time-division manner.

In at least one embodiment of the present disclosure, a multiplexing circuit is used to provide data voltages for four columns of data lines through one data input terminal in a time-division manner, which reduces the number of channels of data drive ICs to be used and reduces the cost of the display panel.

According to a specific embodiment, the multiplexing control line includes a first multiplexing control line, a second multiplexing control line, a first column gate control line, and a second column gate control line; the p-th multiplexing circuit includes the p-th row of multiplexing sub-circuit and the p-th column of multiplexing sub-circuit; the data providing period includes a first data providing period, a second data providing period, a third data providing period, and a fourth data providing period arranged in sequence; p is positive integer.

Under the control of the multiplexing control signal provided by the multiplexing control line, the multiplexing circuit controlling the data voltage provided by the data input terminal to be input to the four columns of data lines in a time-division manner include the followings.

In the first data providing period and the third data providing period, the p-th column of multiplexing sub-circuit controls to connect the p-th data input terminal and the (2p−1)th writing-in node and controls to disconnect the p-th data input terminal from the 2p-th writing-in node under the control of the first column gate control signal provided by the first column gate control line and the second column gate control signal provided by the second column gate control line;

In the second data providing period and the fourth data providing period, the p-th column of multiplexing sub-circuit controls to disconnect the p-th data input terminal from the (2p−1)th writing-in node and controls to connect the p-th data input terminal from the 2p-th writing-in node under the control of the first column gate control signal and the second column gate control signal;

In the first data providing period and the second data providing period, the p-th row of multiplexing sub-circuit controls to connect the (2p−1)th writing-in node and the (4p−3)th column of data line and controls to connect the 2p-th writing-in node and the 4p-th column of data line under the control of the first multiplexing control signal provided by the first multiplexing control line and the second multiplexing control signal provided by the second multiplexing control line;

In the third data providing period and the fourth data providing period, the p-th row multiplexing sub-circuit controls to connect the (2p−1)th writing-in node and the (4p−2)th column of data line and controls to connect the 2p-th writing-in node and the (4p−1)th column of data line under the control of the first multiplexing control signal and the second multiplexing control signal.

In specific implementation, the multiplexing control line may include a first multiplexing control line, a second multiplexing control line, a first column gate control line, and a second column gate control line; the p-th multiplexing circuit includes a p-th row of multiplexing sub-circuit and a p-th column of multiplexing sub-circuit. The p-th column of multiplexing sub-circuit is used to control to connect the p-th data input terminal and the (2p−1)th writing-in node or the 2p-th writing-in node, the p-th row of multiplexing sub-circuit controls to connect the (2p−1)th writing-in node and the (4p−3)th column of data line or the (4p−2)th column of data line, and controls to connect the 2p-th writing-in node and the (4p−1)th column of data line or the 4p-th column of data line, so as to provide the data voltage provided by the p-th data input terminal to the (4p−3)th column of data line and the (4p−2)th column of data line, (4p−1)th column of data line and 4p-th column of data line in a time-division manner.

According to another specific embodiment, the multiplexing control line includes a first multiplexing control line, a second multiplexing control line, a third multiplexing control line, and a fourth multiplexing control line, and the p-th multiplexing circuit includes the p-th first multiplexing sub-circuit, the p-th second multiplexing sub-circuit, the p-th third multiplexing sub-circuit, and the p-th fourth multiplexing sub-circuit; the data providing period includes a first data providing period, a second data providing period, a third data providing period and a fourth data providing period; p is a positive integer;

Under the control of the multiplexing control signal provided by the multiplexing control line, the multiplexing circuit provides the data voltage provided by the data input terminal to the four-column of data lines in a time-division manner.

In the first data providing period, the p-th first multiplexing sub-circuit controls to connect the p-th data input terminal and the (4p−3)th column of data line under the control of the first multiplexing control signal provided by the first multiplexing control line;

In the second data providing period, the p-th fourth multiplexing sub-circuit controls to connect the p-th data input terminal and the 4p-th column of data line under the control of the second multiplexing control signal provided by the second multiplexing control line;

In the third data providing period, the p-th second multiplexing sub-circuit controls to connect the p-th data input terminal and the (4p−2)th column of data line under the control of the third multiplexing control signal provided by the third multiplexing control line;

In the fourth data providing period, the p-th third multiplexing sub-circuit controls to connect the p-th data input terminal and the (4p−1)th column of data line under the control of the fourth multiplexing control signal provided by the fourth multiplexing control line.

In specific implementation, the multiplexing control line may include a first multiplexing control line, a second multiplexing control line, a third multiplexing control line, and a fourth multiplexing control line, and the p-th multiplexing circuit may include the p-th first multiplexing sub-circuit, the p-th second multiplexing sub-circuit, the p-th third multiplexing sub-circuit, and the p-th fourth multiplexing sub-circuit, the p-th first multiplexing sub-circuit, the p-th second multiplexing sub-circuit, the p-th third multiplexing sub-circuit, and the p-th fourth multiplexing sub-circuit control the p-th data input terminal to provide data voltages to the (4p−3)th column of data line, the (4p−2)th column of data line, the (4p−1)th column of data line, the 4p-th column of data line in a time-division manner.

The display device according to at least one embodiment of the present disclosure includes the above-mentioned display panel.

In specific implementation, the display device described in at least one embodiment of the present disclosure further includes a first gate driving circuit, a second gate driving circuit, a third gate driving circuit, and a fourth gate driving circuit;

The first gate driving circuit is used to provide the (4a−3)th row gate driving signal for the (4a−3)th row of gate line;

The second gate driving circuit is used to provide a (4a−2)th row of gate driving signal for the (4a−2)th row of gate line;

The third gate driving circuit is used to provide a (4a−1)th row of gate driving signal for the (4a−1)th row of gate line;

The fourth gate driving circuit is used to provide the 4ath row gate driving signal for the 4ath row of gate line;

a is a positive integer.

Optionally, the first gate driving circuit may include multiple stages of first shift register units.

The gate driving signal output terminal of the ath stage of first shift register unit is electrically connected to the (4a−3)th row of gate line, and the input terminal of the (a+1)th stage of first shift register unit is connected to the (4a−3)th row of gate line. The gate driving signal output terminal of the (a+1)th stage of the first shift register unit is electrically connected to the (4a+1)th row of gate line; the reset terminal of the a-th stage of first shift register unit is electrically connected to the (4a+1) row of gate line.

Figure 18:
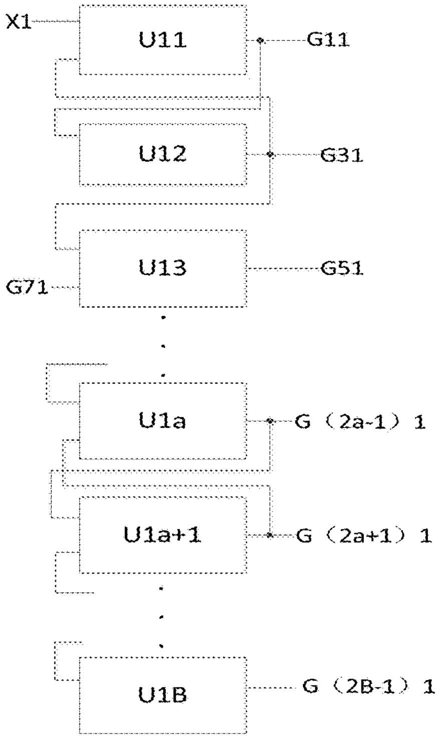
FIG. 18 is a structural diagram of a first gate driving circuit in a display device according to at least one embodiment of the present disclosure.

As shown in FIG. 18, the first gate driving circuit may include B stages of first shift register units; in FIG. 18, U11 is the first stage of first shift register unit, U12 is the second stage of first shift register unit, U13 is the third stage of first shift register unit, U1*a* is the a-th stage of first shift register unit, U1*a*+1 is the (a+1)th stage of first shift register unit, U1B is the B-th stage of first shift register unit, where a is a positive integer, and B is a positive integer greater than 5;

The input terminal of U11 is connected to the first start signal X1, the gate driving signal output terminal of U11 is electrically connected to the first row of gate line G11, the gate driving signal output terminal of U11 is electrically connected to the input terminal of U12; the reset terminal of U11 is electrically connected to the fifth row of gate line G31;

The gate driving signal output terminal of U12 is electrically connected to the fifth row of gate line G31, the gate driving signal output terminal of U12 is electrically connected to the input terminal of U13; the reset terminal of U12 is electrically connected to the ninth row of gate line G51;

The gate driving signal output terminal of U13 is electrically connected to the ninth row of gate line G51, and the gate driving signal output terminal of U13 is electrically connected to the input terminal of the fourth stage of first shift register unit (not shown in FIG. 18); the reset terminal of U13 is electrically connected to of the thirteenth row of gate line G71.

The gate driving signal output terminal of U1*a* is electrically connected to the (4a−3)th row of the gate line G(2a−1)1; the input terminal of U1*a* is electrically connected to the (4a−7)th row of gate line;

The input terminal of U1*a*+1 is electrically connected to the (4a−3)th row of the gate line G(2a−1)1; the gate driving signal output terminal of U1*a*+1 is electrically connected to the (4a+1)th row of gate line; the reset terminal of U1*a* is electrically connected to the (4a+1)th row of the gate line G4(2a+1)1; the reset terminal of U1*a*+1 is electrically connected to in the (4a+5)th row of the gate line;

The gate driving signal output terminal of U1B is electrically connected to the (4B−3)th row of the gate line G(2B−1)1, and the input terminal of U1B is electrically connected to the (4B−7)th row of gate line.

Optionally, the second gate driving circuit includes multiple stages of second shift register units;

The gate driving signal output terminal of the a-th stage of second shift register unit is electrically connected to the (4a−2)th row of gate line, and the input terminal of the (a+1)th stage of the second shift register unit is connected to the (4a−2)th row of gate line. The gate driving signal output terminal of the (a+1)th stage of second shift register unit is electrically connected to the (4a+2)th row of gate line; the reset terminal of the a-th stage of second shift register unit is electrically connected to the (4a+2)th rows of gate line.

Figure 19:
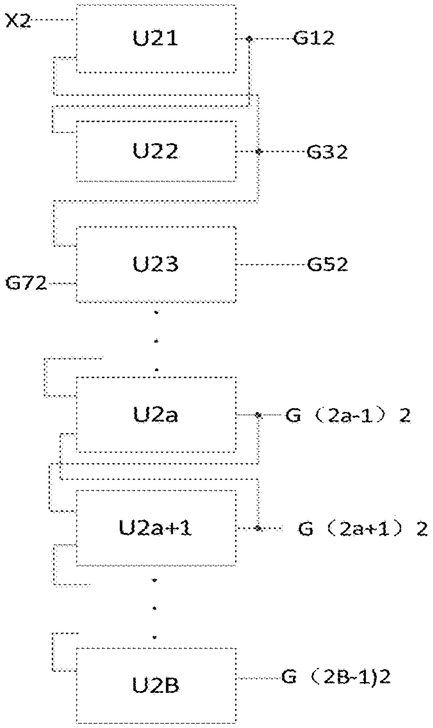
FIG. 19 is a structural diagram of a second gate driving circuit in a display device according to at least one embodiment of the present disclosure.

As shown in FIG. 19, the second gate driving circuit may include B stages of second shift register units; in FIG. 19, U21 is the first stage of second shift register unit, U22 is the second stage of second shift register unit, U23 is the third stage of second shift register unit, U2*a* is the a-th stage of second shift register unit, U2*a*+1 is the (a+1)th stage of second shift register unit, U2B is the B-th stage of second shift register unit, where a is a positive integer, and B is a positive integer greater than 5.

The input terminal of U21 is connected to the second start signal X2, the gate driving signal output terminal of U21 is electrically connected to the second row of gate line G12, the gate driving signal output terminal of U21 is electrically connected to the input terminal of U22; the reset terminal of U21 is electrically connected to the sixth row of gate line G32;

The gate driving signal output terminal of U22 is electrically connected to the sixth row of gate line G32, the gate driving signal output terminal of U22 is electrically connected to the input terminal of U23; the reset terminal of U22 is electrically connected to the tenth row of gate line G52;

The gate driving signal output terminal of U23 is electrically connected to the tenth row of gate line G52, and the gate driving signal output terminal of U23 is electrically connected to the input terminal of the fourth stage of second shift register unit (not shown in FIG. 19); the reset terminal of U23 is electrically connected to the fourteenth row of the gate line G72;

The gate driving signal output terminal of U2*a* is electrically connected to the (4a−2)th row of gate line G(2a−1)2; the input terminal of U2*a* is electrically connected to the (4a−6)th row of gate line;

The input terminal of U2*a*+1 is electrically connected to the (4a−2)th row of gate line G(2a−1)2; the gate driving signal output terminal of U2*a*+1 is electrically connected to the (4a+2)th row of gate line G(2a+1)2; the reset terminal of U2*a* is electrically connected to the (4a+2)th row of gate line G(2a+1)2; the reset terminal of U2*a*+1 is electrically connected to the (4a+6)th row of gate line;

The gate driving signal output terminal of U2B is electrically connected to the (4B−2)th row of gate line G(2B−1)2, and the input terminal of U2B is electrically connected to the (4B−6)th row of gate line.

Optionally, the third gate driving circuit includes multiple stages of third shift register units;

The gate driving signal output terminal of the a-th stage of third shift register unit is electrically connected to the (4a−1)th row of gate line, and the input terminal of the (a+1)th stage of second shift register unit is connected to the (4a−1)th row of gate line. The gate driving signal output terminal of the (a+1)th stage of third shift register unit is electrically connected to the (4a+3)th row of gate line; the reset terminal of the a-th stage of third shift register unit is electrically connected to the (4a+3)th row of gate line.

Figure 20:
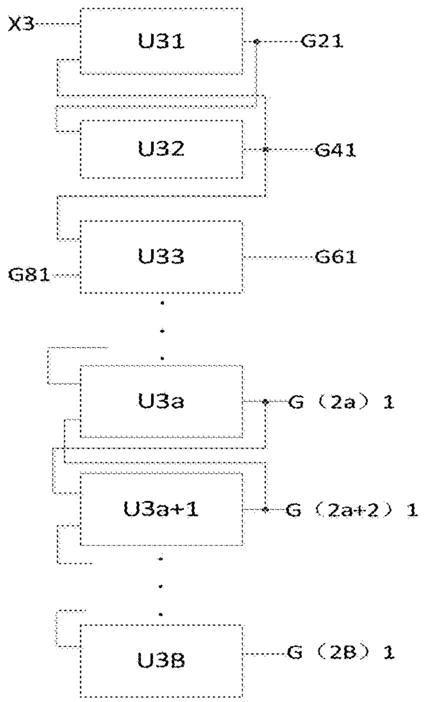
FIG. 20 is a structural diagram of a third gate driving circuit in the display device according to at least one embodiment of the present disclosure.

As shown in FIG. 20, the third gate driving circuit may include B stages of third shift register units; in FIG. 20, U11 is the first stage of third shift register unit, U32 is the second stage of third shift register unit, U33 is the third stage of third shift register unit, U3*a* is the a−th stage of third shift register unit, U3*a*+1 is the (a+1)th stage of third shift register unit, U3B is the B-th stage of third shift register unit, where a is a positive integer, and B is a positive integer greater than 5.

The input terminal of U31 is connected to the third start signal X3, the gate driving signal output terminal of U31 is electrically connected to the third row of gate line G21, the gate driving signal output terminal of U31 is electrically connected to the input terminal of U32; the reset terminal of U31 is electrically connected to the seventh row of gate line G41;

The gate driving signal output terminal of U32 is electrically connected to the seventh row of gate line G41, the gate driving signal output terminal of U32 is electrically connected to the input terminal of U33; the reset terminal of U32 is electrically connected to the eleventh row of gate line G61;

The gate driving signal output terminal of U33 is electrically connected to the eleventh row of gate line G61, and the gate driving signal output terminal of U33 is electrically connected to the input terminal of the fourth stage of third shift register unit (not shown in FIG. 20); the reset terminal of U33 is electrically connected to the fifteenth row of gate line G81;

The gate driving signal output terminal of U3*a* is electrically connected to the (4a−1)th row of gate line G4*a*−1; the input terminal of U3*a* is electrically connected to the (4a−5)th row gate line;

The input terminal of U3*a*+1 is electrically connected to the (4a−1)th row of the gate line G(2a)1; the gate driving signal output terminal of U3*a*+1 is electrically connected to the (4a+3)th row of the gate line G(2a+2)1; the reset terminal of U3*a* is electrically connected to the (4a+3)th row of gate line G(2a+2)1; the reset terminal of U3*a*+1 is electrically connected to the (4a+7)th row of gate line;

The gate driving signal output terminal of U3B is electrically connected to the (4B−1)th row of gate line G(2B)1, and the input terminal of U3B is electrically connected to the (4B−5)th row of gate line. Optionally, the fourth gate driving circuit includes multiple stages of fourth shift register units;

The gate driving signal output terminal of the a-th stage of fourth shift register unit is electrically connected to the 4a-th row of gate line, and the input terminal of the (a+1)th stage of fourth shift register unit is electrically connected to the 4a-th row of gate line; the gate driving signal output terminal of the (a+1)th stage of fourth shift register unit is electrically connected to the (4a+4)th row of gate line; the reset terminal of the a-th stage of fourth shift register unit is electrically connected to the (4a+4)th row of gate line.

Figure 21:
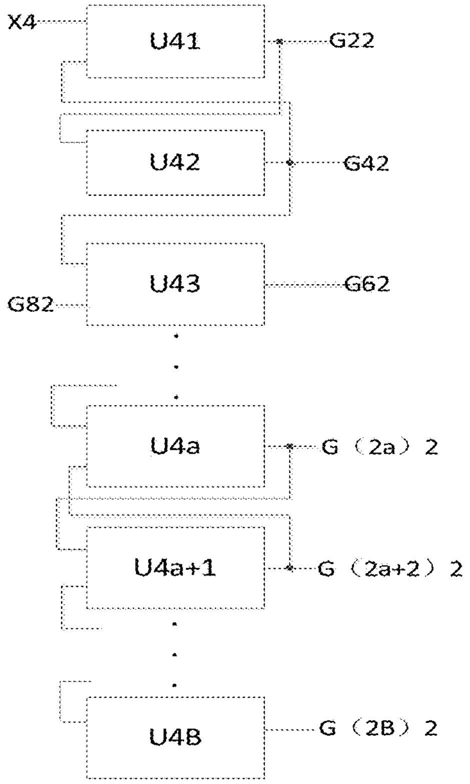
FIG. 21 is a structural diagram of a fourth gate driving circuit in the display device according to at least one embodiment of the present disclosure.

As shown in FIG. 21, the fourth gate driving circuit may include B stages of fourth shift register units; in FIG. 21, U41 is the first stage of fourth shift register unit, U42 is the second stage of fourth shift register unit, U43 is the third stage of fourth shift register unit, U4*a* is the a-th stage of fourth shift register unit, U4*a*+1 is the (a+1)th stage of fourth shift register unit, U4B is the B-th stage of fourth shift register unit, where a is a positive integer, and B is a positive integer greater than 5

The input terminal of U41 is connected to the fourth start signal X4, the gate driving signal output terminal of U41 is electrically connected to the fourth row of gate line G22, the gate driving signal output terminal of U41 is electrically connected to the input terminal of U42; the reset terminal of U41 is electrically connected to the eighth row of gate line G42;

The gate driving signal output terminal of U42 is electrically connected to the eighth row of gate line G42, the gate driving signal output terminal of U42 is electrically connected to the input terminal of U43; the reset terminal of U42 is electrically connected to the twelfth row of gate line G62;

The gate driving signal output terminal of U43 is electrically connected to the twelfth row of gate line G62, and the gate driving signal output terminal of U43 is electrically connected to the input terminal of the fourth stage of fourth shift register unit (not shown in FIG. 21); the reset terminal of U43 is electrically connected to the sixteenth row of gate line G82;

The output terminal of the gate driving signal of U4*a* is electrically connected to the 4a-th row of gate line G(2a)2; the input terminal of U4*a* is electrically connected to the (4a−4)th row of gate line;

The input terminal of U4*a*+1 is electrically connected to the 4a-th row of gate line G(2a)2; the gate driving signal output terminal of U4*a*+1 is electrically connected to the (4a+4)th row of gate line G(2a+2)2; the reset terminal of U4*a* is electrically connected to the (4a+4)th row of gate line G(2a+2)2; the reset terminal of U4*a*+1 is electrically connected to the (4a+8)th row of gate line;

The gate driving signal output terminal of U4B is electrically connected to the 4B−th row of gate line G(2B)2, and the input terminal of U4B is electrically connected to the (4B−4)th row of gate line.

In at least one embodiment of the present disclosure, the display panel further includes multiple rows of reset control lines; the display device further includes a reset control signal generation circuit, and the reset control signal generation circuit is used to provide corresponding reset control signal for each row of reset control line.

In at least one embodiment of the present disclosure, if the reset control signal is provided by the gate driving circuit, since one row of pixel circuits corresponds to two rows of gate driving signals, there are also two reset control signals provided for one row of pixel circuits, in order to save layout space of the display panel, one row of pixel circuits corresponds to only one row of reset control line. Therefore, in at least one embodiment of the present disclosure, a separate reset control signal generating circuit is used to provide corresponding reset control signal for each row of reset control line, the gate driving circuit is not used to provide a reset control signal.

In specific implementation, the display panel further includes multiple rows of light-emitting control lines; the display device further includes a light-emitting control signal generating circuit; the light-emitting control signal generating circuit is used to provide corresponding light-emitting control signal for each row of light-emitting control line.

The display device provided in at least one embodiment of the present disclosure may be any product or component with a display function, such as a mobile phone, a tablet computer, a television, a monitor, a notebook computer, a digital photo frame, and a navigator.

Unless otherwise defined, any technical or scientific term used herein shall have the common meaning understood by a person of ordinary skills. Such words as “first” and “second” used in the specification and claims are merely used to differentiate different components rather than to represent any order, number or importance. Similarly, such words as “one” or “one of” are merely used to represent the existence of at least one member, rather than to limit the number thereof. Such words as “include” or “including” intends to indicate that an element or object before the word contains an element or object or equivalents thereof listed after the word, without excluding any other element or object. Such words as “connect/connected to” or “couple/coupled to” may include electrical connection, direct or indirect, rather than to be limited to physical or mechanical connection. Such words as “on”, “under”, “left” and “right” are merely used to represent relative position relationship, and when an absolute position of the object is changed, the relative position relationship will be changed too.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving method of a display panel, wherein the display panel comprises: a plurality of rows and a plurality of columns of pixel circuits, a plurality of rows of gate lines, a plurality rows of reset control lines, a plurality of rows of light-emitting control lines, and a plurality of columns of data lines, wherein a same row of pixel circuits corresponds to two rows of gate lines, and one row of gate line of the two rows of gate lines is electrically connected to only odd-numbered columns of pixel circuits in the row of pixel circuits, and is configured to provide a corresponding gate driving signal for only the odd-numbered columns of pixel circuits in the row of pixel circuits; the other row of gate line of the two rows of gate lines is electrically connected to only even-numbered columns of pixel circuits in the row of pixel circuits, and is configured to provide a corresponding gate driving signal for only the even-numbered columns of pixel circuits in the row of pixel circuits;

the same row of pixel circuits corresponds to a row of reset control line, and the reset control lines provide a corresponding reset control signal for the row of pixel circuits;

a same column of pixel circuits corresponds to two columns of data lines, and one column of data line of the two columns of data lines is electrically connected to odd-numbered rows of pixel circuits in the column of pixel circuits, and is configured to provide a corresponding data voltage for the odd-numbered rows of pixel circuits in the column of pixel circuits; and the other column of data line of the two columns of data lines is electrically connected to even-numbered rows of pixel circuits in the column of pixel circuits, and is configured to provide a corresponding data voltage for the even-numbered row of pixel circuits in the column of pixel circuits;

wherein the display panel further comprises a plurality of multiplexing circuits, wherein a p-th multiplexing circuit is configured to control a data voltage provided by a p-th data input terminal to be input to four columns of data lines in a time-division manner under the control of a multiplexing control signal provided by a multiplexing control line; p is a positive integer; and wherein the multiplexing control line comprises a first multiplexing control line, a second multiplexing control line, a third multiplexing control line, and a fourth multiplexing control line, and the p-th multiplexing circuit comprises a p-th first multiplexing sub-circuit, a p-th second multiplexing sub-circuit, a p-th third multiplexing sub-circuit, and a p-th fourth multiplexing sub-circuit, wherein, the p-th first multiplexing sub-circuit is electrically connected to the first multiplexing control line, the p-th data input terminal, and the first column of data line, respectively, and controls to connect or disconnect the p-th data input terminal and the first column of data line under the control of a first multiplexing control signal provided on the first multiplexing control line;

the p-th second multiplexing sub-circuit is electrically connected to the third multiplexing control line, the p-th data input terminal, and the second column of data line, respectively, and controls to connect or disconnect the p-th data input terminal and the second column of data line under the control of a third multiplexing control signal provided on the third multiplexing control line;

the p-th third multiplexing sub-circuit is electrically connected to the fourth multiplexing control line, the p-th data input terminal, and the third column of data line, respectively, and controls to connect or disconnect the p-th data input terminal and the third column of data line under the control of a fourth multiplexing control signal provided on the fourth multiplexing control line;

the p-th fourth multiplexing sub-circuit is electrically connected to the second multiplexing control line, the p-th data input terminal, and the fourth column of data line, respectively, and controls to connect or disconnect the p-th data input terminal and the fourth column of data line under the control of a second multiplexing control signal provided on the second multiplexing control line;

wherein the method comprises:

providing, by a same row of reset control line, a reset control signal for the same row of pixel circuits;

providing, by one row of gate line of the two rows of gate lines corresponding to the same row of pixel circuits, a corresponding gate driving signal for the odd-numbered column of pixel circuits in the same row of pixel circuits, and providing, by the other row of gate line of the two rows of gate lines corresponding to the same row of pixel circuits, a corresponding gate driving signal for the even-numbered column of pixel circuits in the same row of pixel circuits; and providing, by one column of data line of the two columns of data lines corresponding to the same column of pixel circuits, a corresponding data voltage for the odd-numbered row of pixel circuits in the same column of pixel circuits, and providing, by the other column of data line of the two columns of data lines corresponding to the same column of pixel circuits, a corresponding data voltage for the even-numbered row of pixel circuits in the same column of pixel circuits, wherein a gate driving signal on a row of gate line is delayed by H/2 from a gate driving signal on an adjacent previous row of gate line, and H is a row period;

wherein an n-th row display period comprises an n-th reset period, an n-th data writing-in period, and an n-th light-emitting control period that are sequentially set; n is a positive integer;

in the n-th reset period, the n-th row of reset control signal line provides a valid n-th row of reset control signal;

in a (2n-1)th row of writing-in period comprised in the n-th data writing-in period, a (2n -1)th row of gate line provides a valid gate driving signal;

in an 2n-th row of writing time period comprised in the n-th data writing-in time period, a 2n-th row of gate line provides a valid gate driving signal;

in the n-th light-emitting control period, the n-th row of light-emitting control line provides a valid light emitting control signal;

the 2n-th row of writing-in period is delayed by H/2 from the (2n-1)th row of the writing-in period.

2. The driving method of the display panel according to claim 1, further comprising:

providing, by a same row of the light-emitting control line, a light-emitting control signal for the same row of pixel circuits.

3. The driving method of the display panel according to claim 1, further comprising:

controlling, by the multiplexing circuit, a data voltage provided by the data input terminal to be input to four columns of data lines in a time-division manner under the control of a multiplexing control signal provided by a multiplexing control line.

4. The driving method of the display panel according to claim 3, wherein a data providing period comprises a first data providing period, a second data providing period, a third data providing period and a fourth data providing period;

the controlling, by the multiplexing circuit, a data voltage provided by the data input terminal to be input to four columns of data lines in a time-division manner under the control of a multiplexing control signal provided by a multiplexing control line comprises:

in the first data providing period, the p-th first multiplexing sub-circuit controlling to connect the p-th data input terminal and the first column of data line under the control of the first multiplexing control signal provided by the first multiplexing control line;

in the second data providing period, the p-th fourth multiplexing sub-circuit controlling to connect the p-th data input terminal and the fourth column of data line under the control of the second multiplexing control signal provided by the second multiplexing control line;

in the third data providing period, the p-th second multiplexing sub-circuit controlling to connect the p-th data input terminal and the second column of data line under the control of the third multiplexing control signal provided by the third multiplexing control line;

in the fourth data providing period, the p-th third multiplexing sub-circuit controlling to connect the p-th data input terminal and the third column of data line under the control of the fourth multiplexing control signal provided by the fourth multiplexing control line.

5. A display device comprising a display panel, wherein the display panel comprises: a plurality of rows and a plurality of columns of pixel circuits, a plurality of rows of gate lines, a plurality rows of reset control lines, and a plurality of columns of data lines, wherein a same row of pixel circuits corresponds to two rows of gate lines, and one row of gate line of the two rows of gate lines is electrically connected to only odd-numbered columns of pixel circuits in the row of pixel circuits, and is configured to provide a corresponding gate driving signal for only the odd-numbered columns of pixel circuits in the row of pixel circuits; the other row of gate line of the two rows of gate lines is electrically connected to only even-numbered columns of pixel circuits in the row of pixel circuits, and is configured to provide a corresponding gate driving signal for only the even-numbered columns of pixel circuits in the row of pixel circuits;

the same row of pixel circuits corresponds to a row of reset control line, and the reset control lines provide a corresponding reset control signal for the row of pixel circuits;

a same column of pixel circuits corresponds to two columns of data lines, and one column of data line of the two columns of data lines is electrically connected to odd-numbered rows of pixel circuits in the column of pixel circuits, and is configured to provide a corresponding data voltage for the odd-numbered rows of pixel circuits in the column of pixel circuits; and the other column of data line of the two columns of data lines is electrically connected to even-numbered rows of pixel circuits in the column of pixel circuits, and is configured to provide a corresponding data voltage for the even-numbered row of pixel circuits in the column of pixel circuits;

wherein the display panel further comprises a plurality of multiplexing circuits, wherein a p-th multiplexing circuit is configured to control a data voltage provided by a p-th data input terminal to be input to four columns of data lines in a time-division manner under the control of a multiplexing control signal provided by a multiplexing control line; p is a positive integer;

wherein the multiplexing control line comprises a first multiplexing control line, a second multiplexing control line, a third multiplexing control line, and a fourth multiplexing control line, and the p-th multiplexing circuit comprises a p-th first multiplexing sub-circuit, a p-th second multiplexing sub-circuit, a p-th third multiplexing sub-circuit, and a p-th fourth multiplexing sub-circuit, wherein, the p-th first multiplexing sub-circuit is electrically connected to the first multiplexing control line, the p-th data input terminal, and the first column of data line, respectively, and controls to connect or disconnect the p-th data input terminal and the first column of data line under the control of a first multiplexing control signal provided on the first multiplexing control line;

the p-th second multiplexing sub-circuit is electrically connected to the third multiplexing control line, the p-th data input terminal, and the second column of data line, respectively, and controls to connect or disconnect the p-th data input terminal and the second column of data line under the control of a third multiplexing control signal provided on the third multiplexing control line;

the p-th third multiplexing sub-circuit is electrically connected to the fourth multiplexing control line, the p-th data input terminal, and the third column of data line, respectively, and controls to connect or disconnect the p-th data input terminal and the third column of data line under the control of a fourth multiplexing control signal provided on the fourth multiplexing control line;

the p-th fourth multiplexing sub-circuit is electrically connected to the second multiplexing control line, the p-th data input terminal, and the fourth column of data line, respectively, and controls to connect or disconnect the p-th data input terminal and the fourth column of data line under the control of a second multiplexing control signal provided on the second multiplexing control line;

wherein display device further comprises: a first gate driving circuit, a second gate driving circuit, a third gate driving circuit, and a fourth gate driving circuit; wherein the first gate driving circuit is configured to provide a first row of gate driving signal for the first row of gate line;

the second gate driving circuit is configured to provide a second row of gate driving signal for the second row of gate line;

the third gate driving circuit is configured to provide a third row of gate driving signal for the third row of gate line;

the fourth gate driving circuit is configured to provide a fourth row of gate driving signal for the fourth row of gate line; and wherein the first gate driving circuit comprises a plurality of stages of first shift register units;

a gate driving signal output terminal of an a-th stage of first shift register unit is electrically connected to the first row of gate line, and an input terminal of a (a+1)th stage of first shift register unit is electrically connected to the first row of gate line, a gate driving signal output terminal of the (a+1)th stage of the first shift register unit is electrically connected to the fifth row of gate line; a reset terminal of the a-th stage of first shift register unit is electrically connected to the fifth row of gate line; a is a positive integer;

the second gate driving circuit comprises a plurality of stages of second shift register units;

a gate driving signal output terminal of an a-th stage of second shift register unit is electrically connected to the second row of gate line, and an input terminal of a (a+1)th stage of the second shift register unit is electrically connected to the second row of gate line, a gate driving signal output terminal of the (a+1)th stage of second shift register unit is electrically connected to the sixth row of gate line; a reset terminal of the a-th stage of second shift register unit is electrically connected to the sixth row of gate line;

the third gate driving circuit comprises a plurality of stages of third shift register units;

a gate driving signal output terminal of an a-th stage of third shift register unit is electrically connected to the third row of gate line, and an input terminal of a (a+1)th stage of second shift register unit is electrically connected to the third row of gate line, a gate driving signal output terminal of the (a+1)th stage of third shift register unit is electrically connected to the seventh row of gate line; a reset terminal of the a-th stage of third shift register unit is electrically connected to the seventh row of gate line, the fourth gate driving circuit comprises a plurality of stages of fourth shift register units;

a gate driving signal output terminal of an a-th stage of fourth shift register unit is electrically connected to the fourth row of gate line, and an input terminal of a (a+1)th stage of fourth shift register unit is electrically connected to the fourth row of gate line; a gate driving signal output terminal of the (a+1)th stage of fourth shift register unit is electrically connected to the eighth row of gate line; a reset terminal of the a-th stage of fourth shift register unit is electrically connected to the eighth row of gate line.

6. The display device according to claim 5, wherein the display device further comprises a reset control signal generating circuit, the reset control signal generating circuit is configured to provide a corresponding reset control signal for each row of reset control line.

7. The display device according to claim 5, wherein the display panel further comprises a plurality of rows of light emitting control lines; the display device further comprises a light emitting control signal generation circuit; the light emitting control signal generation circuit is configured to provide a corresponding light-emitting control signal for each row of light-emitting control line.

8. The display device according to claim 5, wherein a gate driving signal on a row of gate line is delayed by H/2 from a gate driving signal on an adjacent previous row of gate line, and H is a row period.

9. The display device according to claim 5, wherein the p-th first multiplexing sub-circuit comprises a p-th first multiplexing transistor, the p-th second multiplexing sub-circuit comprises a p-th second multiplexing transistor, and the p-th third multiplexing sub-circuit comprises a p-th third multiplexing transistor, and the p-th fourth multiplexing sub-circuit comprises a p-th fourth multiplexing transistor;

a control electrode of the p-th first multiplexing transistor is electrically connected to the first multiplexing control line, and a first electrode of the p-th first multiplexing transistor is electrically connected to the p-th data input terminal, a second electrode of the p-th first multiplexing transistor is electrically connected to the first column of data line;

a control electrode of the p-th second multiplexing transistor is electrically connected to the third multiplexing control line, and a first electrode of the p-th second multiplexing transistor is electrically connected to the p-th data input terminal, a second electrode of the p-th second multiplexing transistor is electrically connected to the second column of data line;

a control electrode of the p-th third multiplexing transistor is electrically connected to the fourth multiplexing control line, and a first electrode of the p-th third multiplexing transistor is electrically connected to the p-th data input terminal, a second electrode of the p-th third multiplexing transistor is electrically connected to the third column of data line;

a control electrode of the p-th fourth multiplexing transistor is electrically connected to the second multiplexing control line, and a first electrode of the p-th fourth multiplexing transistor is electrically connected to the p-th data input terminal, a second electrode of the p-th fourth multiplexing transistor is electrically connected to the fourth column of data line.

* * * * *